US008949316B2

(12) United States Patent
Lauwers et al.

(10) Patent No.: US 8,949,316 B2
(45) Date of Patent: *Feb. 3, 2015

(54) SCALABLE HIGH-PERFORMANCE INTERACTIVE REAL-TIME MEDIA ARCHITECTURES FOR VIRTUAL DESKTOP ENVIRONMENTS

(75) Inventors: Jozef Paul C. Lauwers, Mountain View, CA (US); Sumeet Vohra, San Mateo, CA (US); Vladimir Vysotsky, Fremont, CA (US); Vijayalakshmi Viswanathan, Sunnyvale, CA (US); Alexander Richter, Redwood City, CA (US); Lester Ludwig, Redwood Shores, CA (US); Oleg Zabluda, Redwood City, CA (US)

(73) Assignee: Avistar Communications Corp., San Mateo, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 12/828,252

(22) Filed: Jun. 30, 2010

(65) Prior Publication Data
US 2011/0224811 A1  Sep. 15, 2011

Related U.S. Application Data

(60) Provisional application No. 61/339,834, filed on Mar. 9, 2010.

(51) Int. Cl.
*G06F 15/16* (2006.01)
*G06F 3/16* (2006.01)
(Continued)

(52) U.S. Cl.
CPC .............. *G06F 3/16* (2013.01); *H04L 12/1813* (2013.01); *H04M 7/006* (2013.01); *G06F 9/4445* (2013.01)
USPC ........... 709/203; 709/204; 709/205; 370/260; 725/37

(58) Field of Classification Search
USPC ...................... 709/204, 205; 370/260; 725/37
See application file for complete search history.

(56) References Cited

U.S. PATENT DOCUMENTS 5,617,539 A * 4/1997 Ludwig et al. ................ 709/205
6,760,749 B1 * 7/2004 Dunlap et al. ................ 709/204
(Continued)

OTHER PUBLICATIONS

Wikipedia Search—Virtualization, http://en.wikipedia.org/wiki/Virtualization, retrieved on Sep. 10, 2010.
(Continued)

*Primary Examiner* — Michael Y Won
(74) *Attorney, Agent, or Firm* — TransPacific Law Group; Pavel I. Pogodin, Esq.

(57) ABSTRACT

System for providing interactive two-way audio in desktop virtualization environment, the desktop virtualization environment comprising desktop virtualization server computer and desktop virtualization client endpoint device with associated microphone element. The system incorporates instance of server software executing on the desktop virtualization server and providing interactive user interface functions to associated desktop virtualization client endpoint device; and instance of endpoint software executing on the desktop virtualization client endpoint device including network port, the instance of endpoint software receiving an incoming real-time audio stream from the network port and providing real-time and audio playback functions on the desktop virtualization client endpoint device. In the system, the desktop virtualization client endpoint is configured to: accept real-time audio input from a microphone element associated with the desktop virtualization client endpoint; and provide an outgoing real-time compressed audio stream to the network port responsive to the real-time audio input from the microphone element.

16 Claims, 60 Drawing Sheets

(51) Int. Cl.
*G06F 9/44* (2006.01)
*H04L 12/18* (2006.01)
*H04M 7/00* (2006.01)

(56) References Cited

U.S. PATENT DOCUMENTS

| | | | |
|---|---|---|---|
| 7,006,881 B1* | 2/2006 | Hoffberg et al. | 700/83 |
| 8,141,090 B1* | 3/2012 | Graupner et al. | 718/104 |
| 2007/0283349 A1* | 12/2007 | Creamer et al. | 718/100 |
| 2010/0191859 A1* | 7/2010 | Raveendran | 709/231 |

OTHER PUBLICATIONS

Vmware—Virtual Desktop Infrastructure, http://www.vmware.com/pdf/virtual_desktop_infrastructure_wp.pdf, retrieved on Sep. 10, 2010.

Wikipedia Search—Desktop Virtualization, http://en.wikipedia.org/wiki/Desktop_virtualization, retrieved on Sep. 10, 2010.

Wikipedia Search—X terminal, http://en.wikipedia.org/wiki/X_terminal, retrieved on Sep. 10, 2010.

* cited by examiner

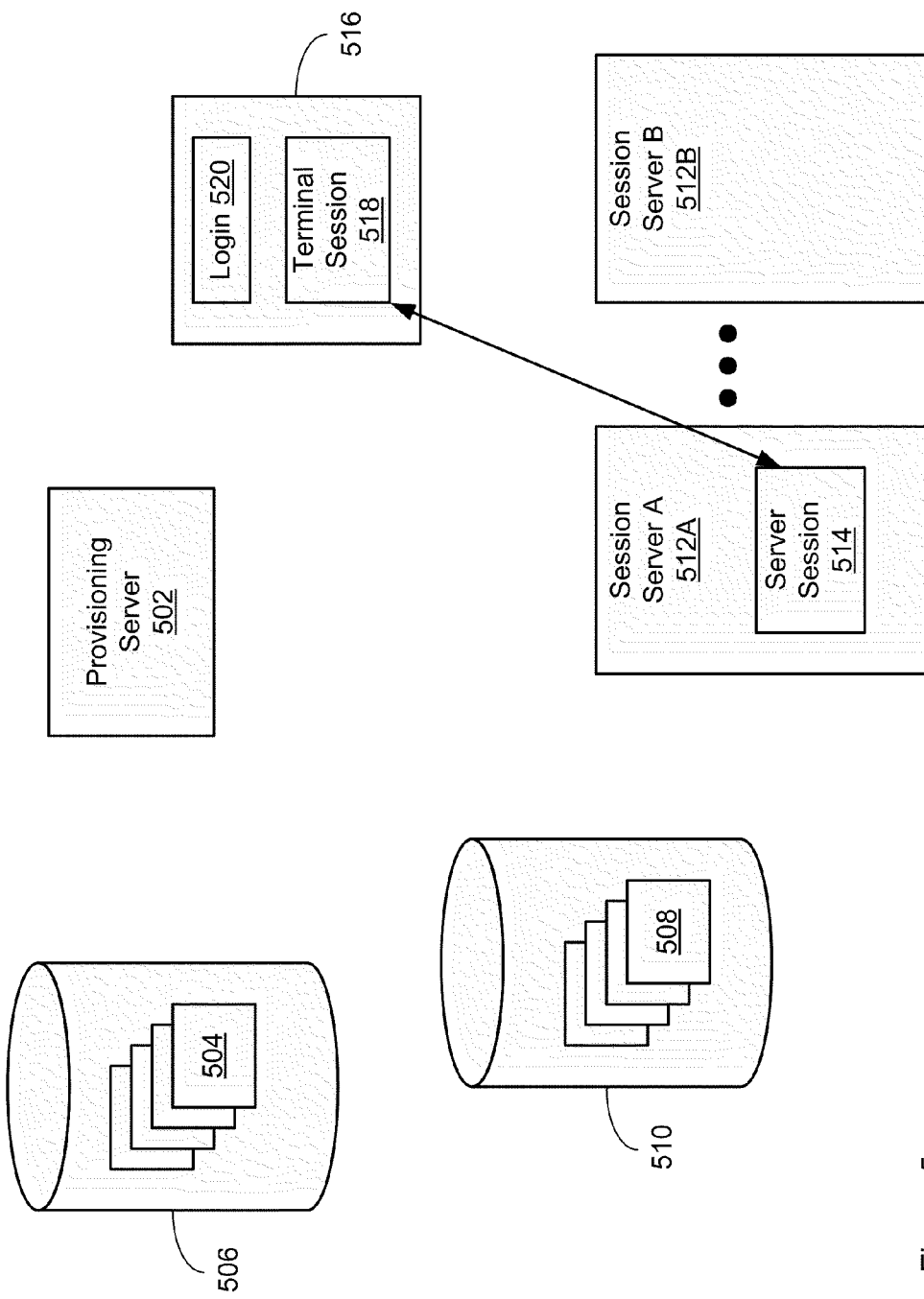

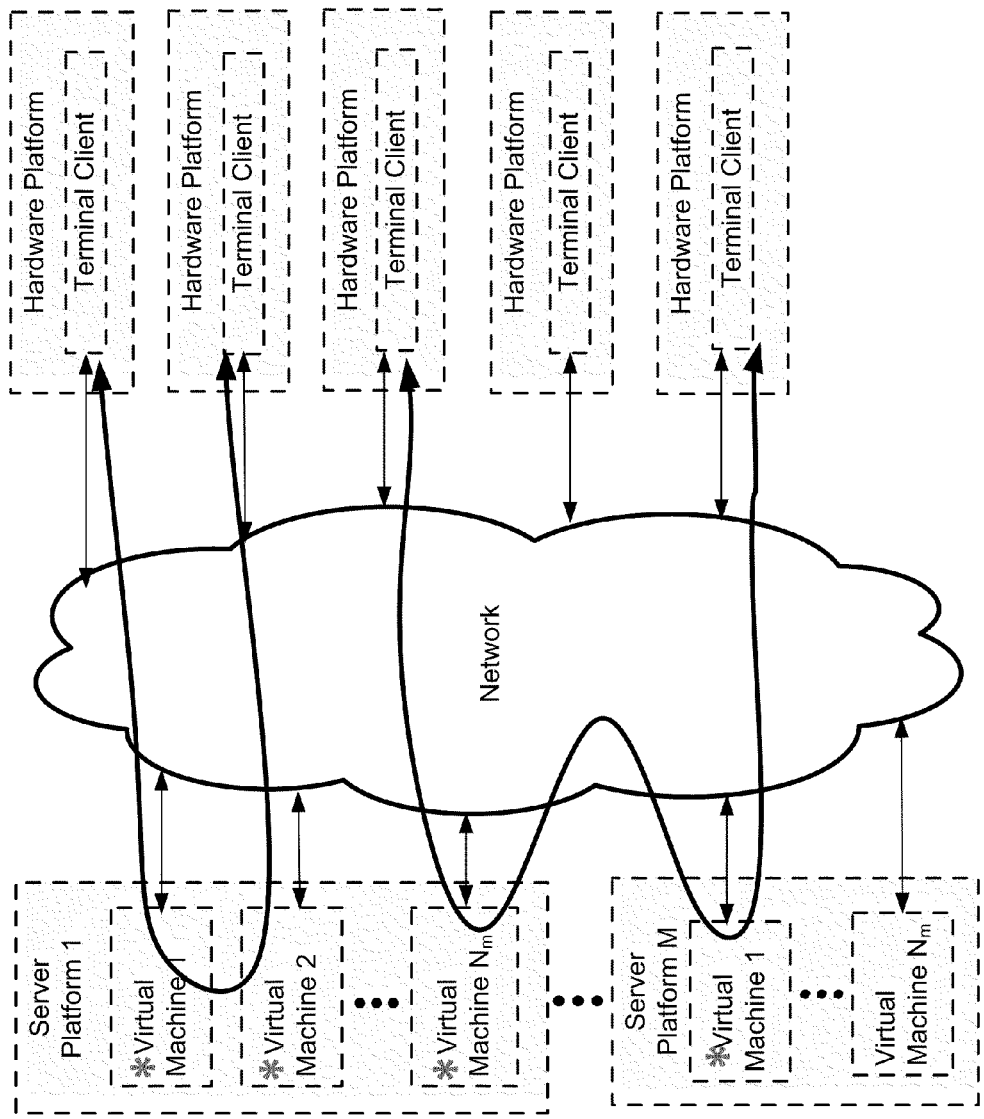
Figure 6 – High bandwidth uncompressed streams (↔) and computation loads (✱)

(Stand-Alone)

(Traditional VDI Server)

(VDI Terminal)

(SE Server)

(Simplified VDI Server)

(configured by platform information)

(configured by set-up information)

(configured by both platform and set-up information)

SCALABLE HIGH-PERFORMANCE INTERACTIVE REAL-TIME MEDIA ARCHITECTURES FOR VIRTUAL DESKTOP ENVIRONMENTS

CROSS-REFERENCE TO RELATED PATENT APPLICATIONS

The present application relies on and claims benefit of priority under 35 U.S.C. 119 from U.S. provisional patent application Ser. No. 61/339,834, filed Mar. 9, 2010, and is related to commonly owned U.S. patent application Ser Nos. 12/828,249, 12/828,253, 12/828,257 and 12/828,260, all entitled "SCALABLE HIGH-PERFORMANCE INTERACTIVE REAL-TIME MEDIA ARCHITECTURES FOR VIRTUAL DESKTOP ENVIRONMENTS", filed on the same day, which are all incorporated by reference herein in their entirety.

BACKGROUND OF THE INVENTION

1. Field of the Invention

The present application pertains to Virtual Desktop Infrastructure ("VDI") and Virtual Application Infrastructure ("VAI"), and more specifically to real-time communication among thin-terminals, and in particular their operation and use in virtualization, remote terminal, and mobile device environments.

2. Description of the Related Art

Many organizations are moving away from traditional PC-based desktop architectures in favor of Virtual Desktop Infrastructure (VDI) and Virtual Application Infrastructure (VAI). These enable knowledge workers to access software applications and desktops located in data centers from anywhere that is reachable over a network using various types of computers, mobile devices, and low-power terminals.

Virtual Desktop Infrastructure (VDI) is an adaptation of the currently predominant commercial technology trend of platform virtualization (commercially referred to as "machine virtualization"). Abstractly, platform virtualization allows an operating system to run with a degree of separation (often over a network) from the underlying physical computing platform. In practical terms, a software implementation or emulation of a computer is used to execute programs in the same way programs would execute on a hardware computer and its operating system. The software implementation or emulation of a computer in such a context is referred to as a "virtual machine" (VM). There are many adaptations, extensions, and usage nuances of the virtualization concept in computing; for example, see the wiki page on the topic (http://en.wikipedia.org/wiki/Virtualization). Many of these have commercial implementations that can provide (or claim to provide) substantially improved efficiency, maintenance, reliability, and access to computer users within an enterprise.

Among the trends in the vast contemporary virtualization marketplace is the notion of Virtual Desktop Infrastructure (VDI), wherein desktop operating systems and applications execute on virtual machines (VMS) residing on a server or group of servers, computing cloud, etc. In the commercial enterprise computing industry, a desktop operating system executing in this fashion has been termed a "virtual desktop" (http://www.vmware.com/pdf/virtual_desktop_infrastructure_wp.pdf, for example). A related concept is that of desktop virtualization. Accepted definitions can be readily found, for example in Wikipedia entries such as these:

Desktop virtualization is the concept of separating a personal computer desktop environment from the physical machine through a client-server computing model. The resulting "virtualized" desktop is stored on a remote central server, instead of on the local storage of a remote client; thus, when users work from their remote desktop client, all of the programs, applications, processes, and data used are kept and run centrally, allowing users to access their desktops on any capable device, such as a traditional personal computer, notebook computer, smartphone, or thin client. (from http://en.wikipedia.org/wiki/Desktop_virtualization, visited Mar. 1, 2010.)

Virtual desktop infrastructure (VDI) is the server computing model enabling desktop virtualization, encompassing the hardware and software systems required to support the virtualized environment. (from http://en.wikipedia.org/wiki/Desktop_virtualization, visited Mar. 1, 2010.)

VDI arrangements employ a client/server model in the sense that endpoint software and devices render graphical display as instructed by software applications running on one or more other computers (such as servers), and further in which endpoint software and devices collect and forward input events and data from users and provide these to those software applications running on the one or more other computers. In many ways, VDI resembles the X Window System architecture from the mid 1980's through mid 1990's.

Among the advantages provided by desktop virtualization and VDI are that significant portions of the software environment can be centrally operated, maintained, patched, upgraded, backed-up, protected, and managed. Subsequently, the staffing hours required by IT organizations can be considerably reduced, and higher levels of performance and availability and reliability can be obtained. Additionally, the administration and management tasks at the desktop reduce considerably. Further, remaining at the desktop are far fewer functions needing far less computing power. The resulting amount of software needed at the endpoint shrinks considerably.

With this established, some brief remarks on terminology are now provided to prevent confusion between traditional long-standing concepts and conventions in computer science and increasingly commonplace VDI terminology:

1. The far-smaller article or instance of software executing at the endpoint would historically be referred to as a "thin client." However, this previously established terminology has now become superseded as prominent VDI terminal manufacturers use the term "thin client" as a functional and product name for associated types of end terminal hardware. As a result, those new to computing accordingly interpret the term "thin client" as hardware rather than software as it would be historically. In place of the historical terminology, the new terminology "terminal client" has become the VDI terminology for user-side software executing strictly on a remote terminal. Accordingly, herein the VDI terminology "terminal client" will be employed.

2. Adding to the potential confusion, what would otherwise be the associated complementary term of "terminal server" has come into usage as the term for server hardware and background server operating system executing on server hardware or other higher-performance and/or centralized computing system. In VDI terminology, the complementary instance of software running at a server or other type of computer and associated (in a client-server sense) with a given "terminal client" is called a "virtual machine." Although the term "virtual machine" has its own historical usage and in other types of virtualization technology, herein the aforementioned VDI terminology will be employed.

Of key importance in the mass-acceptance of VDI is that fact that the performance of most applications operating in a VDI environment is nearly at parity with, if not exceeding, that of the tradition desktop computing world. These and many other economic and operational advantages motivate a strong drive towards VDI inside the modern enterprise computing environment.

However, no degradation in performance is actually not an accurate or complete story. Although most desktop computing applications do well or better operating in a VDI environment, in fact some applications are functionally and structurally not suited for even adequate performance in a standard VDI environment. Among these, and perhaps the most important among them, are real-time communications applications such as VoIP, video conferencing, and some types of high-performance telemetry (for example as in remote medical monitoring). Another type of exception is that of advanced data visualization. In each of these exceptions, the volume of data communications between the computational portion of applications executing at the server and rendering portion of applications executing at the endpoint can be exceedingly high and/or significantly adversely affected by delay and jitter effect inherent in the networking provided by VDI environments.

Thus, it would be desirable to have novel methods and systems for handling and implementation of real-time communications applications and other network-performance sensitive applications in a VDI environment.

SUMMARY OF THE INVENTION

The inventive methodology is directed to methods and systems that substantially obviate one or more of the above and other problems associated with conventional techniques for handling and implementation of real-time communications applications and other network-performance sensitive applications in a VDI environment.

In accordance with one aspect of the inventive concept, there is provided a system for providing interactive two-way audio in a desktop virtualization environment, the desktop virtualization environment comprising at least one desktop virtualization server computer and at least one desktop virtualization client endpoint device with an associated microphone element. The inventive system incorporates: at least one instance of server software executing on the desktop virtualization server and providing at least interactive user interface functions to an associated desktop virtualization client endpoint device; and at least one instance of endpoint software executing on the desktop virtualization client endpoint device comprising a network port, the at least one instance of endpoint software receiving an incoming real-time audio stream from the network port and providing at least real-time and audio playback functions on the desktop virtualization client endpoint device. In the inventive system, the at least one desktop virtualization client endpoint is configured to: accept real-time audio input from a microphone element associated with the desktop virtualization client endpoint; and provide an outgoing real-time compressed audio stream to the network port responsive to the real-time audio input from the microphone element.

In accordance with another aspect of the inventive concept, there is provided a method for providing interactive two-way audio in a desktop virtualization environment, the desktop virtualization environment comprising at least one desktop virtualization server computer and at least one desktop virtualization client endpoint device with an associated microphone element. The inventive method involves: providing, using at least one instance of server software executing on the desktop virtualization server, at least interactive user interface functions to an associated desktop virtualization client endpoint device; receiving, using at least one instance of endpoint software executing on the desktop virtualization client endpoint device comprising a network port, an incoming real-time audio stream from the network port and providing at least real-time and audio playback functions on the desktop virtualization client endpoint device; accepting, using the at least one desktop virtualization client endpoint, real-time audio input from a microphone element associated with the desktop virtualization client endpoint; and providing, using the at least one desktop virtualization client endpoint, an outgoing real-time compressed audio stream to the network port responsive to the real-time audio input from the microphone element.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 5a-5e depict a second exemplary illustration of the wide range of topological variations viable within the applicable VDI framework and an exemplary event sequence among the entities to show exemplary roles and functions.

FIG. 6 illustrates concerns of high-bandwidth uncompressed streams flowing between virtual machine server sessions within and among server platforms as well as large full duty-cycle computation loads virtual machine server sessions on server platforms when attempting to employ traditional VDI and VAI architectures with real-time interactive media applications involving audio, video, high-performance graphics, etc.

DETAILED DESCRIPTION

Figure 1:
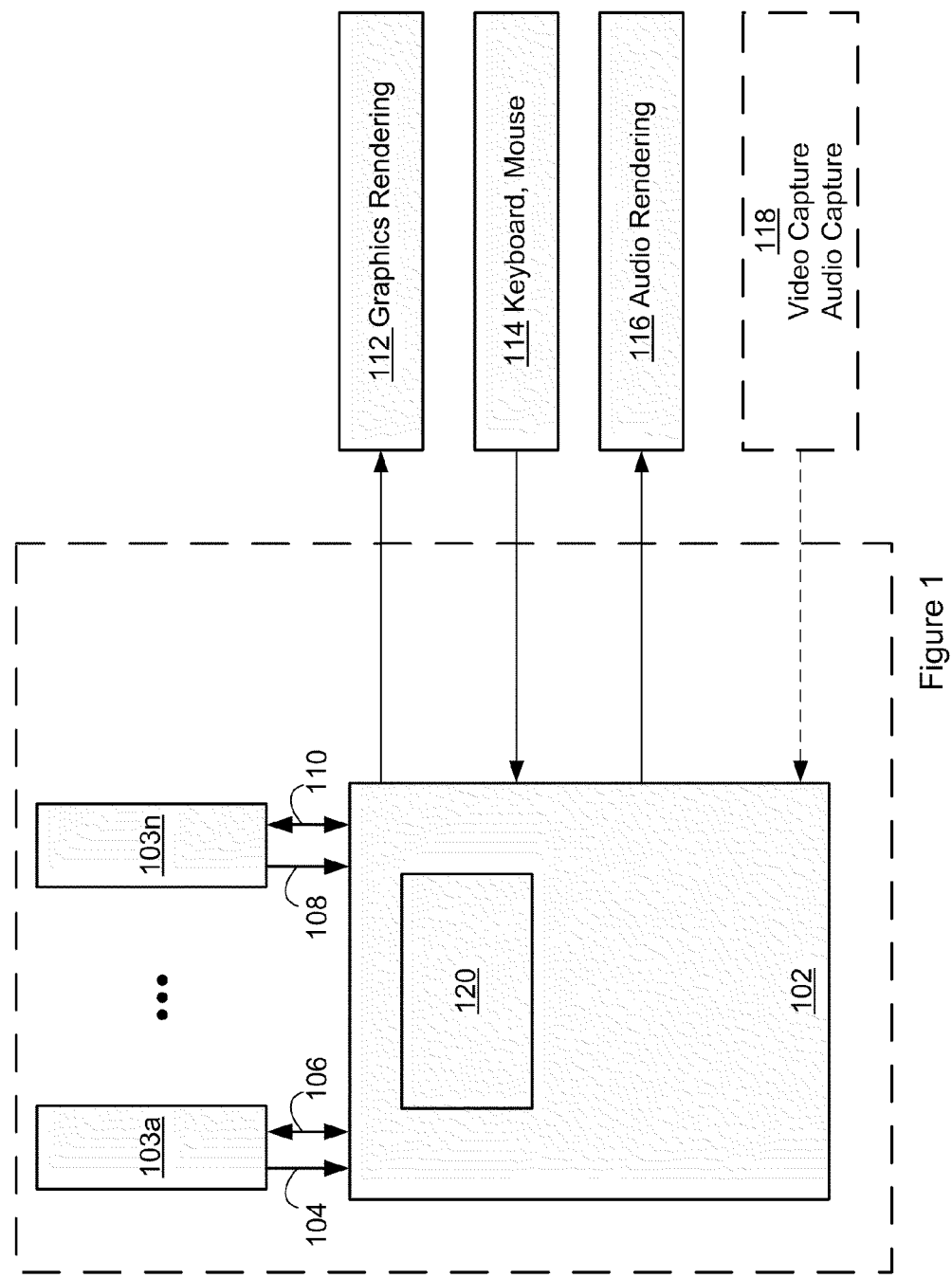
FIG. 1 depicts an exemplary conventional desktop computing environment.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. Review of exemplary computer systems and similar electronic computing devices is presented in Section 16.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Upon reading this disclosure, those of skill in the art will appreciate still additional alternative structural and functional designs for a system and a process for data replication in a distributed database in a telephony system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

1. Classical and Contemporary Desktop Computing Environments

Although familiarity with details of computer systems and similar electronic computing devices is assumed for the description of the invention (Sections 1-15), for completeness review of exemplary computer systems and similar electronic computing devices is provided in Section 16.

FIG. 1 illustrates an exemplary implementation of a conventional desktop computing.

Specifically, FIG. 1 illustrates a single operating system 102 executing on a hardware platform (not shown) associated with the specific desktop computing environment. Under the control and in communications with the operating system 102, one or more applications 103a-103n execute along side the operating system. Each of these one or more applications 103a-103n interface directly with the operating system 102, making OS calls and exchanging events and data via signal lines 104, 106, 108, and 110. The operating system 102 receives user interface events from the keyboard 114, pointing devices (such as a mouse), etc. In the embodiment illustrated in FIG. 1, these devices are shown as external to the Computing Hardware Platform, but in other implementations they may also be integrated into the Computing Hardware Platform (for example, as in the case of a laptop/tablet computer used as a desktop resource or surrogate).

The operating system 102 additionally integrates or in other ways interacts with a window system 120. The window system 120 in turn receives user interface events from the keyboard 114, pointing devices (such as a mouse), etc., and additionally directs graphics operation commands, via the operating system 120, to graphics rendering hardware and software 112. In the embodiment illustrated in FIG. 1, such graphics rendering hardware and software reside in a graphics card, but in other implementations they may also be integrated into the Computing Hardware Platform (for example, as in the case of a laptop/tablet computer used as a desktop resource or surrogate).

The aforementioned graphics operations may comprise text and graphics as used in typical applications, but may also include other higher-performance media types and/or high media update rates as may be needed for the rendering of animations or video.

The operating system 102 also provides one or more audio streams to audio rendering hardware (and in some implementations, audio software) 116 for audio to be provided to the user, etc. This audio may comprise sonic indication of events as directed by the operating system, but may also comprise audio file playback (for example MP3 files), Voice-over-IP, rendered MIDI file playback, etc. In the exemplary arrangement of FIG. 1, such audio rendering hardware reside in an audio card and/or external device (such as powered speakers or headphones), but in other implementations they may also be integrated into the Computing Hardware Platform (for example, as in the case of a laptop/tablet computer used as a desktop resource or surrogate).

In many contemporary computers, the operating system 102 also receives streams from one or more audio and/or video capture devices 118. In the embodiment illustrated in FIG. 1, such audio and/or video capture devices 118 are implemented as one or more external devices (such as "webcam" component and/or or headphones), but in other implementations they may also be integrated into the Computing Hardware Platform (for example, as in the case of a laptop/tablet computer used as a desktop resource or surrogate).

2. Overview of Virtualized Desktop Computing Environments

VDI arrangements of various types "divide" the conventional desktop computing environment into a client/server arrangement in the sense that endpoint software and devices render visual display as instructed by software applications running on one or more other computers (typically server computers located at data centers), and further in which endpoint software and devices collect and forward input events and data from users and provide these to those software applications running on the one or more other "endpoint computers" (such as conventional PCs, stripped down PC, low performance PCs, specialized terminals such as those manufactured by WYSE®/HEWLETT-PACKARD®, and various types of handheld devices with communications provided over carrier services). Increasingly adopted terminology includes:

Use of "remote terminal" as the term for the hardware and internal operating system executing on the reduced functionality "endpoint computer";

Use of "terminal server" as the term for the hardware and operating system executing on the server or other higher-performance and/or centralized computing system; and Use of "terminal client" as the term for software executing strictly on a remote terminal.

Typically, VDI implementations transmit graphical output from application programs executing at the terminal server from the terminal server to the terminal client, and user input from the terminal client to the terminal server. This basic architecture works well for most data-based office applications such as word processing, spreadsheets, database queries, standard web page browsing, etc.

In many ways, VDI in at least a high-level view, resembles the X Window System architecture from the mid 1980's (and still used today as a windowing system on Linux desktops), not only architecturally (where in many ways the X window Server acts as the remote terminal software environment) but also in regard the products and marketplace for X terminals made by WYSE® and HP®, among others (see for example http://en.wikipedia.org/wiki/X_terminal).

Figure 2:
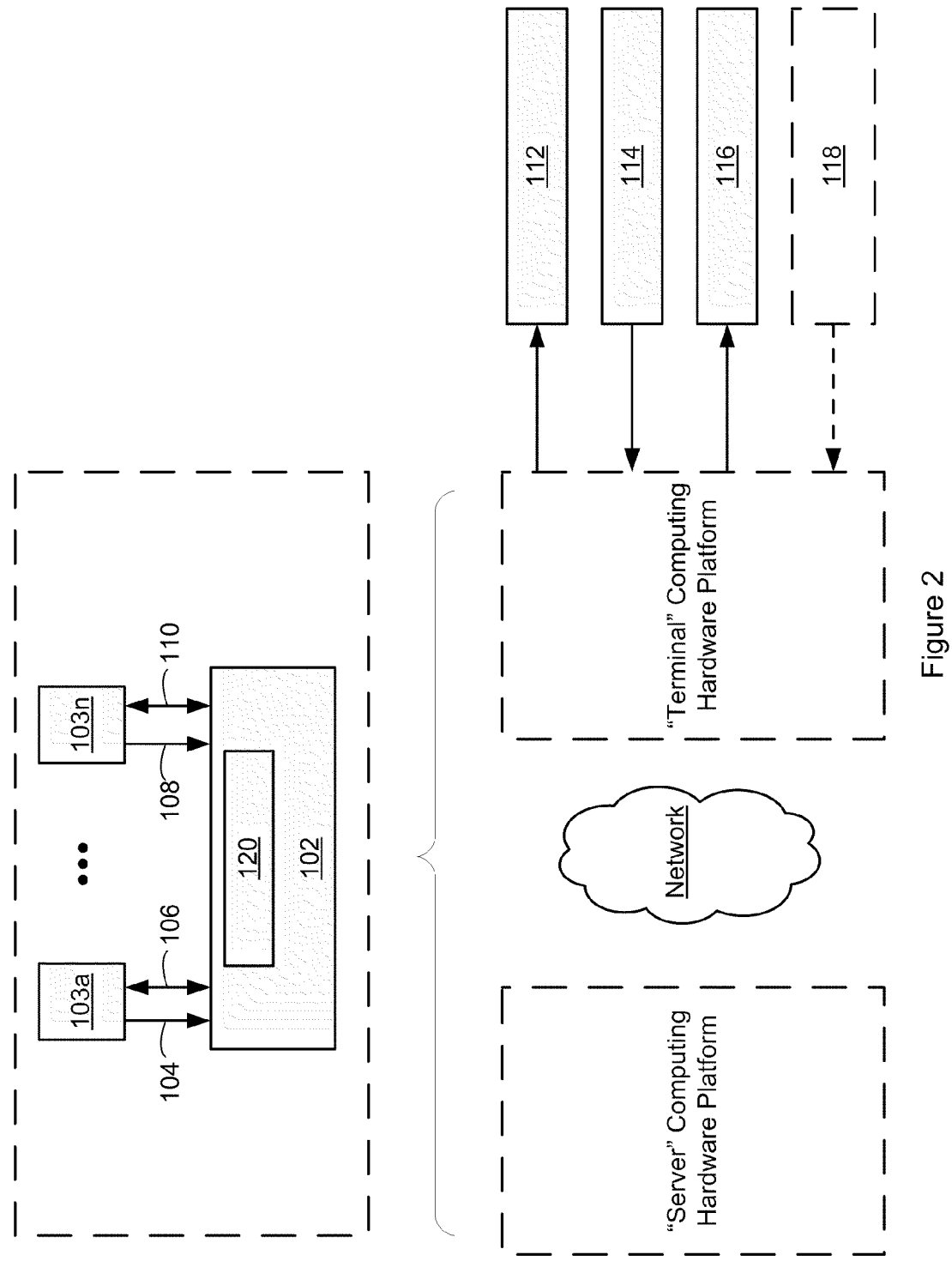
FIG. 2 depicts an exemplary abstracted VDI decomposition of the exemplary conventional desktop computing environment of FIG. 1.

At a more detailed level, there is a range of implementations, variations, and ongoing evolutions in VDI realizations and product architectures. Rather than run through every possible detailed approach, FIG. 2 depicts an abstracted high-level overview of the decomposition of the exemplary conventional desktop computing environment of FIG. 1, showing at the top of the figure a conceptual instance of the software (operating system, window system, and applications) comprised by the exemplary desktop computing environment of FIG. 1, and in the bottom of the FIG. 2 showing a generalized split of that conceptual instance across a "Server" computing hardware platform and a "Terminal" computing hardware platform.

Note that it is also possible for multiple terminal clients to share the same terminal server instances. In that case, applications and possibly desktops from a plurality of users all share the same operating system executing on the terminal server hardware. Each user's applications are accessed from a separate instance of the terminal client, one for each user. We refer to this type of environment as Virtual Application Infrastructure rather than Virtual Desktop Infrastructure, since remote clients will access specific applications running on the terminal server rather than that terminal server's entire operating environment.

The portion of software (operating system, window system, and applications) that runs on the "Server" computing hardware platform can in principle run on any kind of computing environment. In certain circumstances, it may run on a dedicated computer. However, in industry, this portion of software runs as one of many other instances of such software on a server computer, for example as provided by a data center. In this situation, the server runs these instances as "virtual machines" that execute on a server, each virtual machine acting as if it were (i.e. emulating) a hardware computer platform running the aforementioned software. By running a plurality of virtual machines a single server computer, that single server computer not only may host a plurality of active users but further the software running on the virtual machine can be positioned to provide a number of administrative and user advantages. The number of advantages, but general and specific to specific implementations, is large, but a representative list includes:

Virtual desktop and application infrastructure allows enterprises to centralize the management and delivery of applications and desktops, thereby significantly reducing the cost of desktop management;

Virtual desktops support mobility by making it easy for users to work productively from anywhere with the best application performance and security regardless of location. The resultant "virtual desktops" are tied to user identities rather than specific devices. A user may have one or more desktops which are able to be accessed by the user as the user moves from device to device, providing robust freedom and mobility; and Thin client infrastructure provides "green IT" that is aimed at lowering power consumption, lowering heat generation which reduces the need for cooling, and saving energy (e.g. through the absence of servers in the building).

Figure 3A:
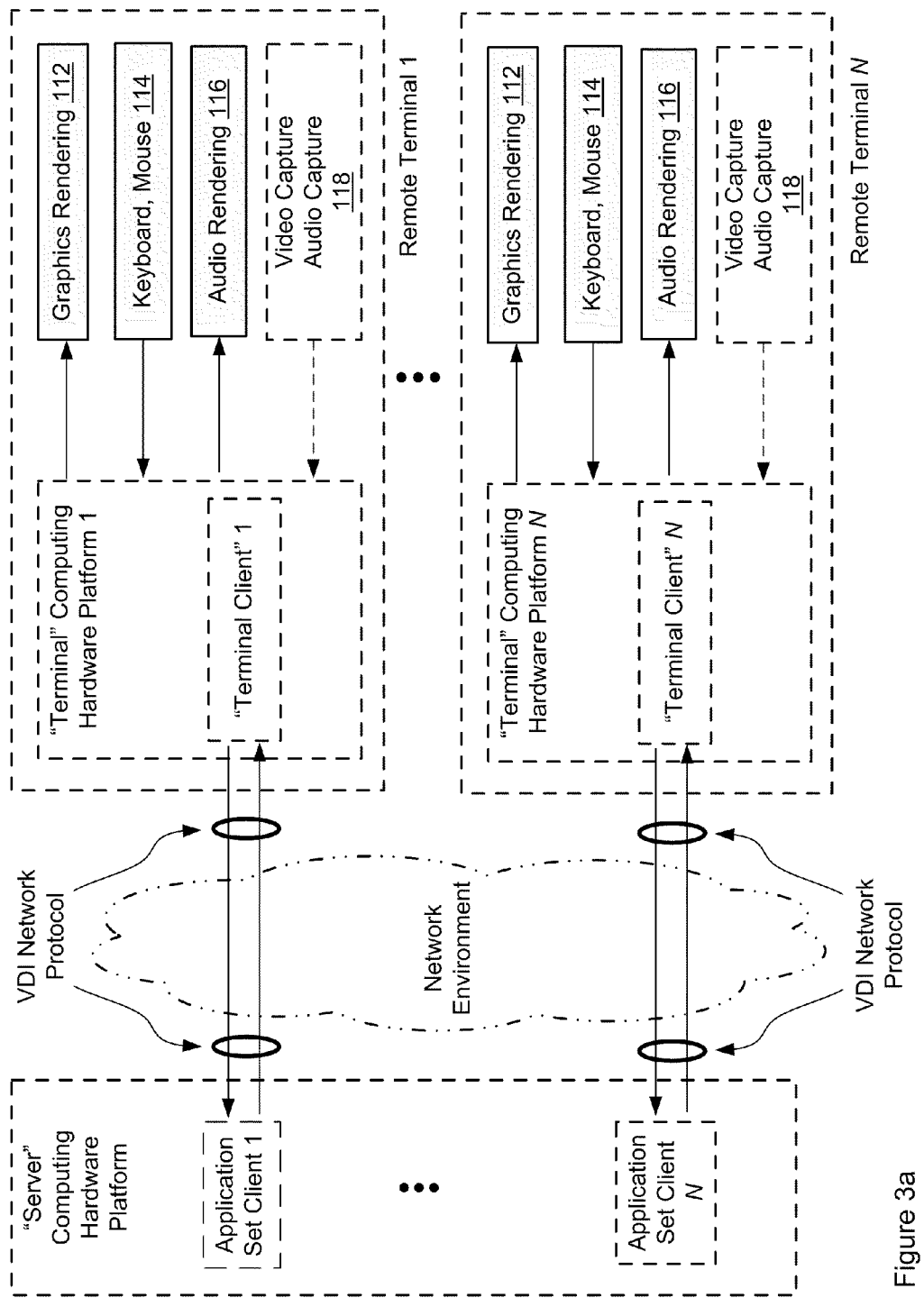
FIG. 3a depicts an exemplary abstracted multiuser VAI computing environment.

FIG. 3a depicts an exemplary abstracted multiuser VAI computing environment. Here, a server computing hardware platform hosts the execution of a plurality of application sets (here N instances), each of which connect over a networked environment via a VAI network Protocol with associated "terminal client" software executing on an associated terminal computing hardware platform serving as a remote terminal. One or more of the remote terminals may include audio and/or video capabilities.

Figure 3B:
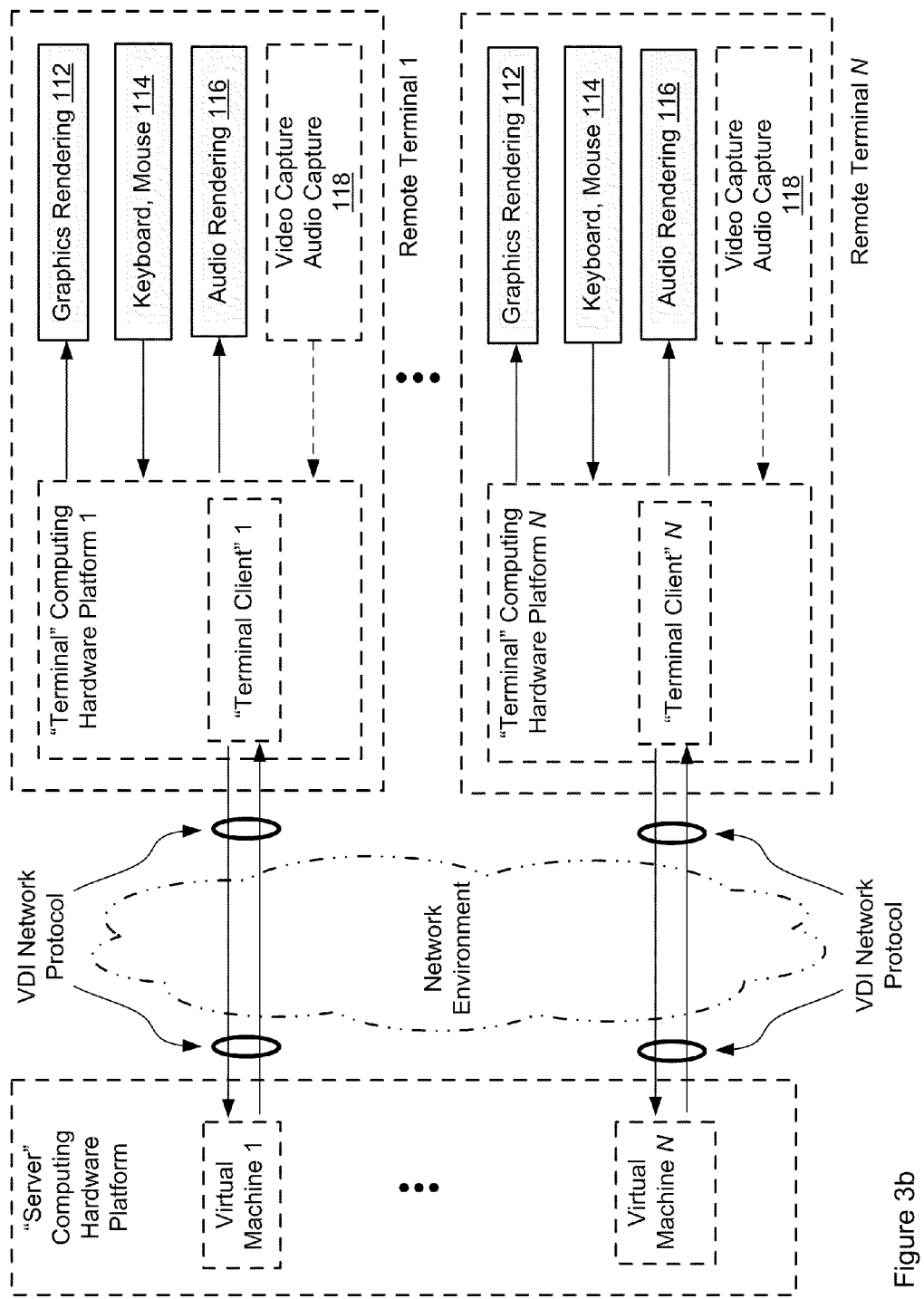
FIG. 3b depicts an exemplary abstracted multiuser VDI computing environment.

FIG. 3b depicts an exemplary abstracted multiuser VDI computing environment. Here, a server computing hardware platform hosts the execution of a plurality of instances (here, N instances) of virtual machines, each of which connect over a networked environment via a VDI network Protocol with associated "terminal client" software executing on an associated terminal computing hardware platform serving as a remote terminal. One or more of the remote terminals may include audio and/or video capture capabilities.

Figure 3C:
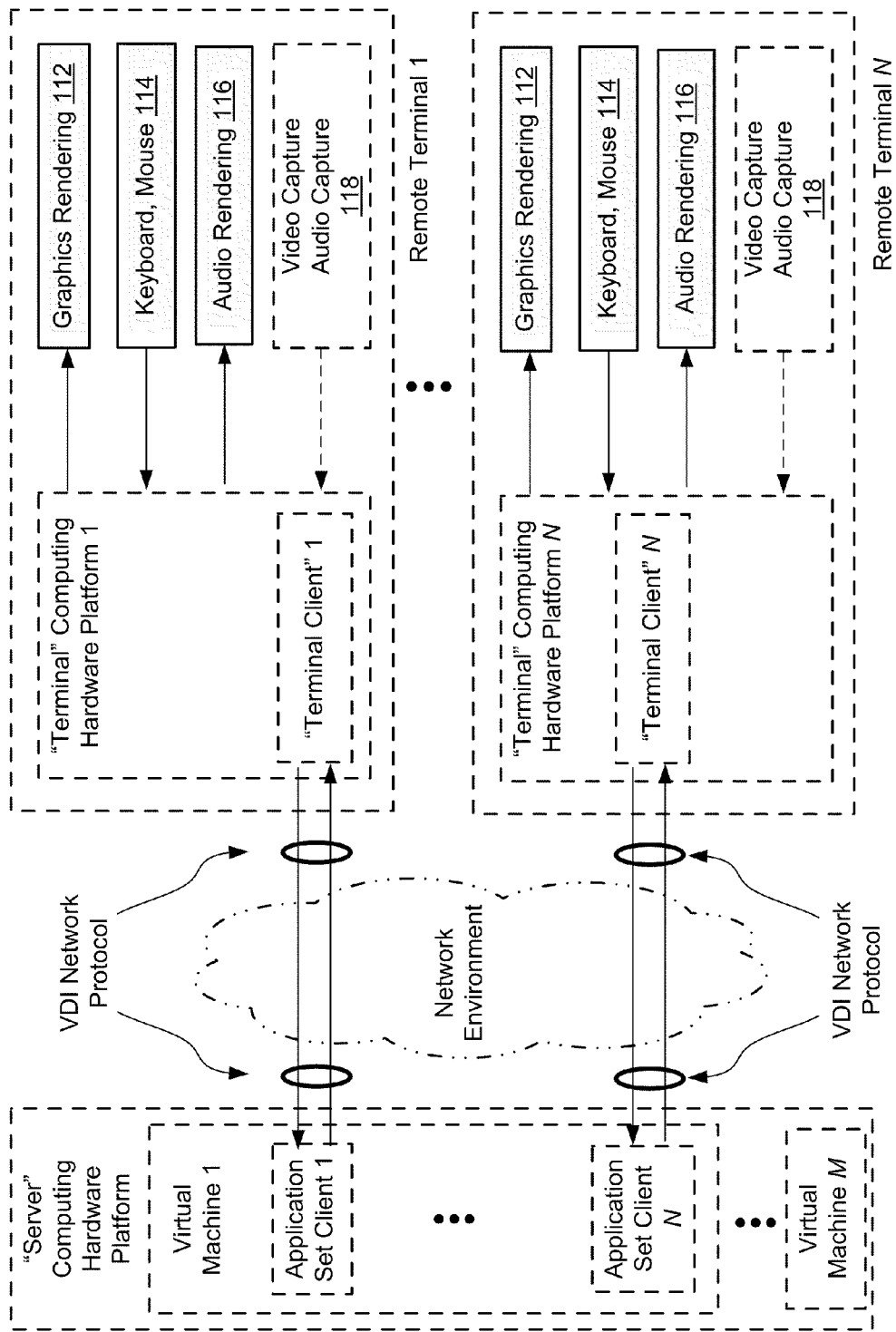
FIG. 3c depicts an exemplary abstracted computing environment that combines VAI and VDI approaches.

FIG. 3c depicts an exemplary abstracted computing environment that combines VAI and VDI. Here, a server computing hardware platform hosts the execution of a plurality of instances (here, M instances) of virtual machines. Each virtual machine in turn hosts the execution of a plurality of applications sets (here N instances), each of which connect via a VAI/VDI network Protocol with associated "terminal client" software executing on an associated terminal computing hardware platform. As before, one or more of the remote terminals may include audio and/or video capabilities.

Figure 4A:
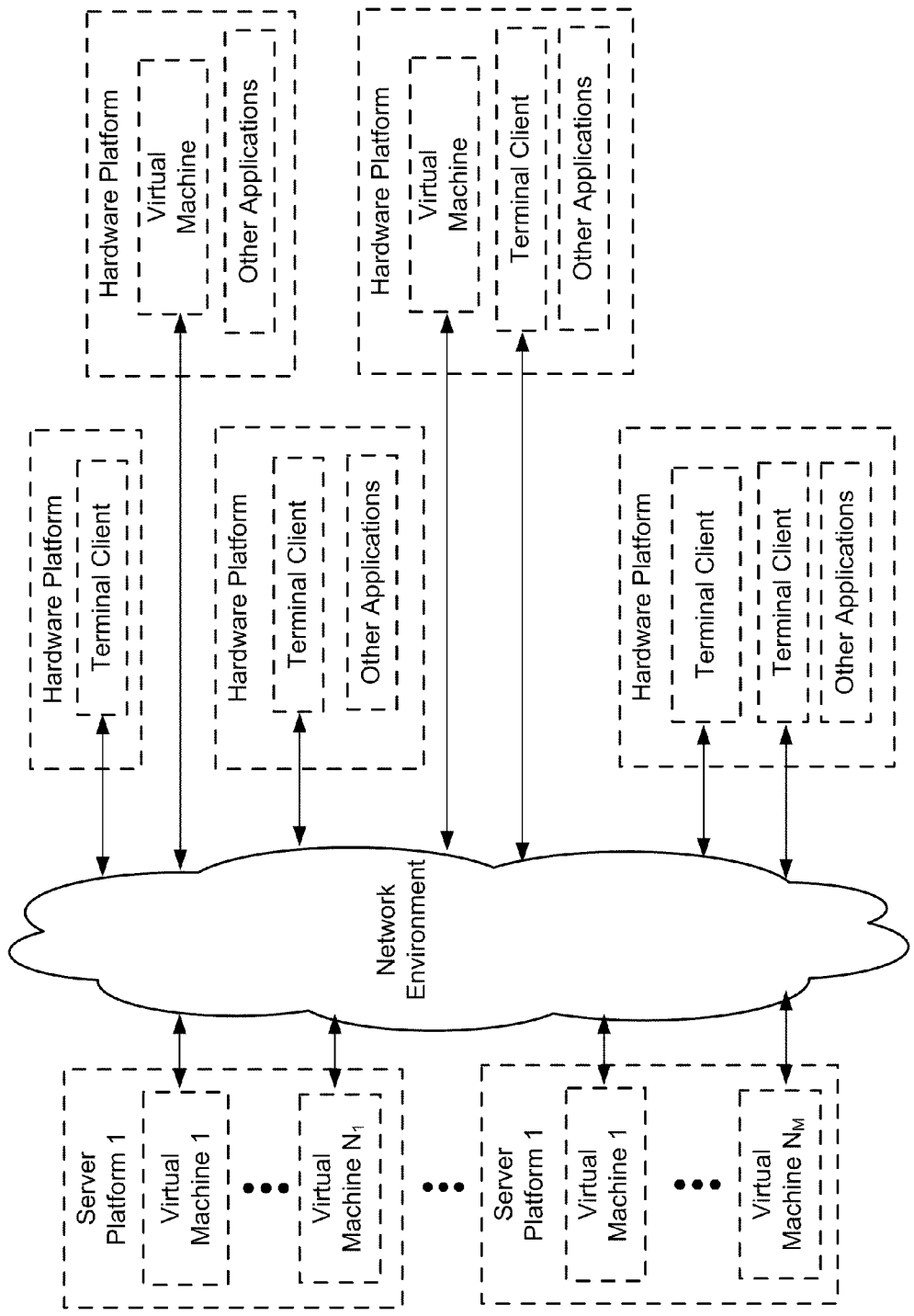
FIG. 4a depicts a first exemplary illustration of the wide range of topological variations viable within the applicable VDI framework.

The exemplary arrangements of FIGS. 3a-3c, however, are to be further viewed in an even more widely abstractable way as there are many possible variations of, on, and within the exemplary depicted topological examples. For example, FIG. 4a illustrates topological variations viable within the applicable VDI framework in accordance with one embodiment. In one embodiment, a plurality of servers is available for executing one or more instances of virtual machines. The data files defining virtual machines resides on the server it executes on or, as described shortly, is recalled from a database associated with that server, or is allocated to a one or another among a plurality of servers in response to on-demand logins or other forms of authorized or trusted requests. In an alternate embodiment, a virtual machine executes on a user platform, such as a desktop PC, laptop PC, etc., which is also able to run other applications. As shown in FIG. 4a, a plurality of virtual machines are executed on hardware platforms. In some implementations the hardware platforms can also run other applications.

In one embodiment, a single terminal client software instance runs on a user platform, which runs only the terminal client. In another embodiment, a single terminal client software instance runs on a user platform, which runs one or more other applications in addition to the terminal client. In a third embodiment, two or more terminal client software instances run on a user platform, which runs other applications. In yet another embodiment, one or more terminal client software instances run on a user platform, which runs an instance of a virtual machine, and which additionally (although this variation not shown) also executes one or more other applications.

Figure 4B:
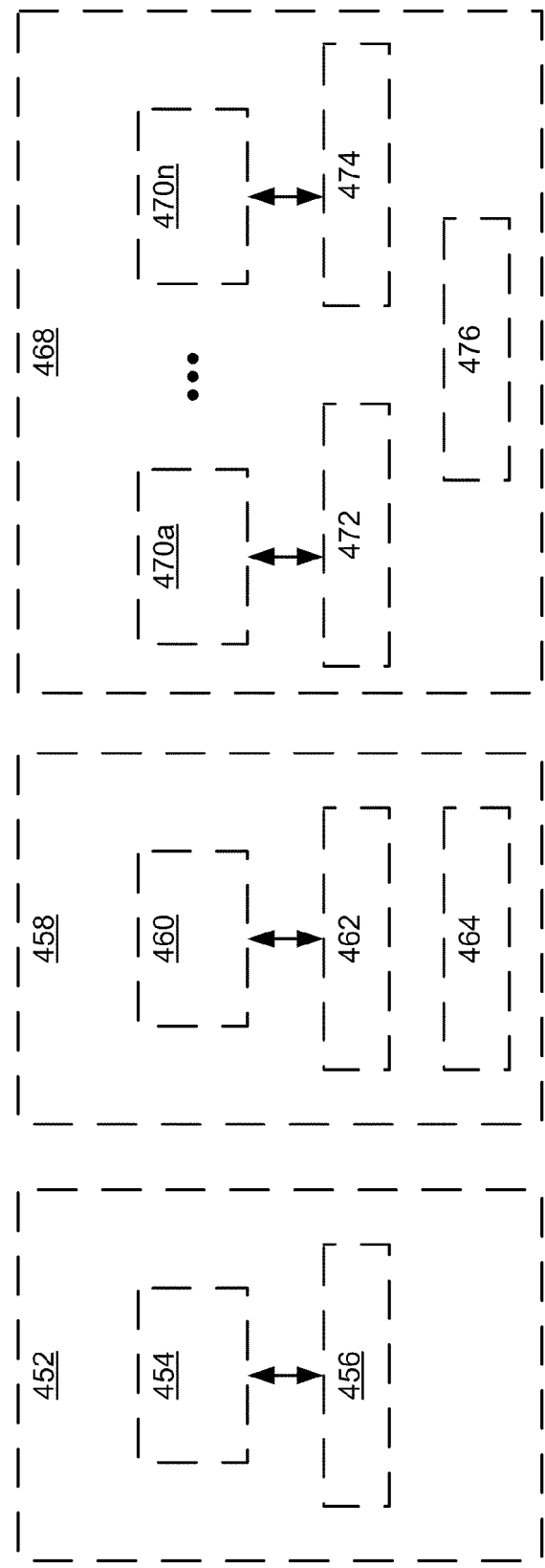
FIG. 4b depicts various exemplary arrangements for employing and/or incorporating aspects of VDI architecture solely within a user platform.

As an additional group of illustrative examples, FIG. 4b depicts various embodiments for employing and/or incorporating aspects of VDI architecture within a common user platform. The advantages of this can include using the same software entities in either stand-alone computers or networked VDI environments. In a first embodiment, an associated virtual machine 454 and terminal client 456 reside and execute solely within a common user platform 452. In a second embodiment, an associated virtual machine 460 and terminal client 462 reside and execute along with other applications 464 within a common user platform 452. In a third embodiment, a plurality of associated virtual machine 470a-470n and terminal client "pairs" 472/474 commonly resided and sequentially and/or concurrently execute within a common user platform 468, which additionally also executes one or more other applications 464. Additional aspects of such arrangements are discussed below.

As further group of illustrative examples, FIGS. 5a-5e provide both (a) a third exemplary illustration of the wide range of topological variations viable within the applicable VDI framework and (b) an exemplary event sequence among the entities to show exemplary roles and functions. Many variations of this are possible as is apparent to one skilled in the art.

Figure 5A:
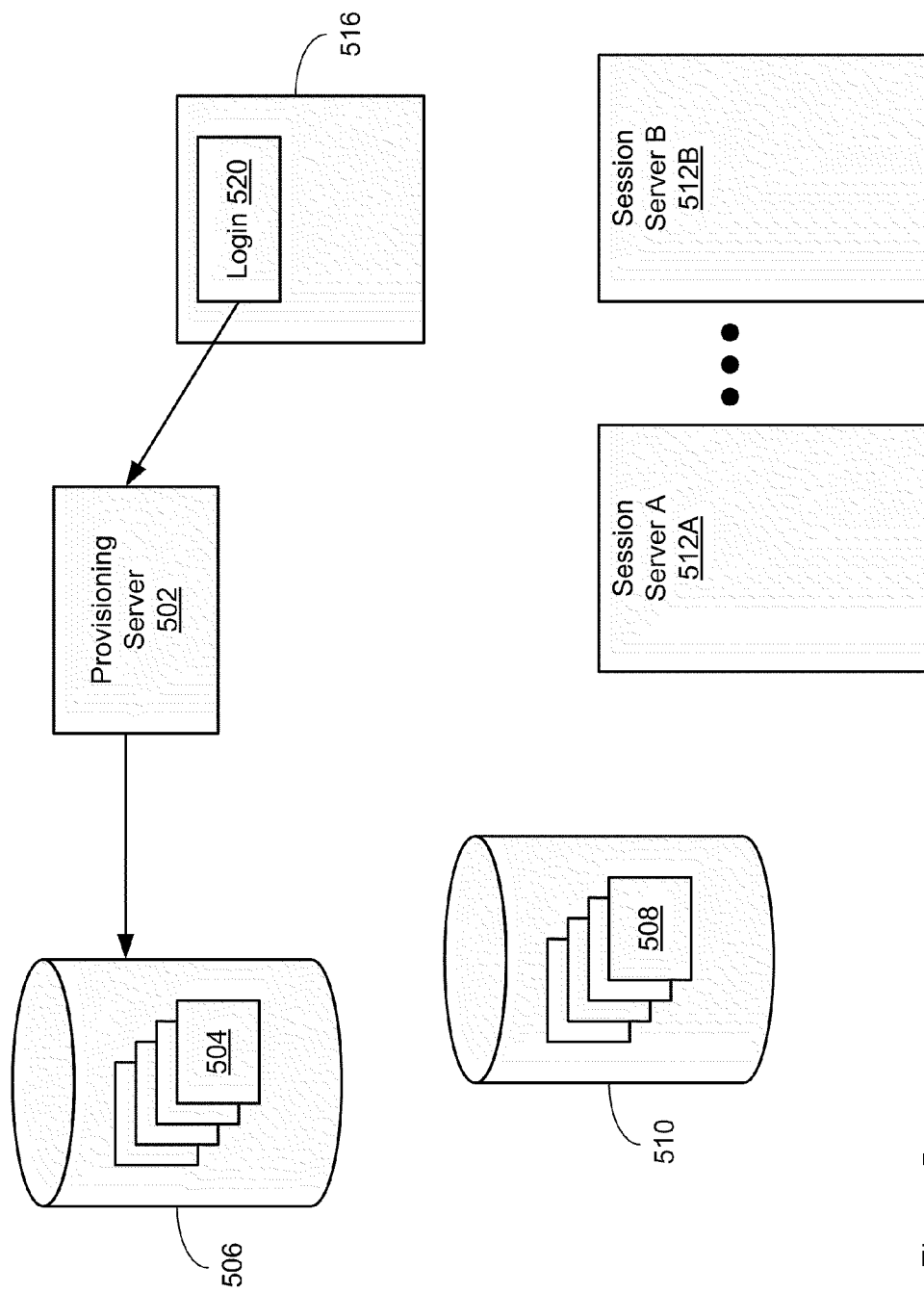

In the exemplary arrangement of FIG. 5a, a user or automated process running on a terminal computer or equivalent may use a VDI login utility to contact a provisioning server 502 with a provisioning request. The provisioning server 502 seeks a user record 504 to authenticate the user or automated process and identify how and/or where to find a copy of the software used to implement an instance of the particular virtual machine and terminal client associated with the provisioning request. In one embodiment, the user record 504 resides in some type of user record database 506. In another embodiment, the user record 504 is part of the provisioning server 502 (not depicted). In yet another embodiment, the user record 504 is provided by some other arrangement (not depicted). Further, as shown in embodiment illustrated in FIG. 5a, the user record database 506 may be centralized (as depicted) In another embodiment, the user record database 506 is a decentralized database with full or partial replication. The latter arrangement can advantageously allow for individual database instances to act as a cloud server for servicing large fluxes of provisioning requests and/or widely geographically dispersed implementations of the VDI environment.

Figure 5B:
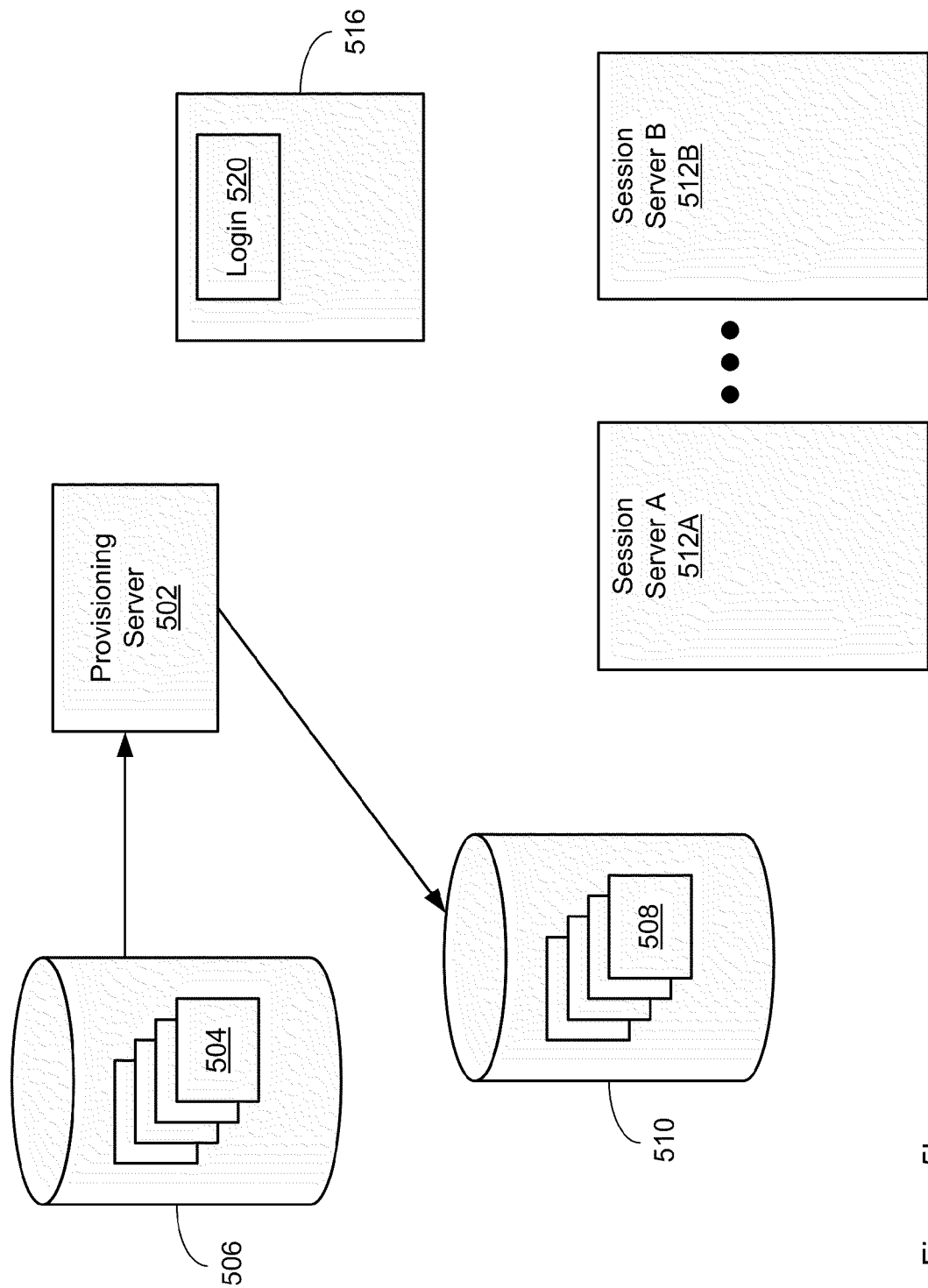

In the embodiment shown in FIG. 5b, the information regarding how and/or where to find a copy of the software used to implement an instance of the particular virtual machine and terminal client associated with the provisioning request 502 is retrieved and used to retrieve a "user image" 508 comprising, for example, particular virtual machine and terminal client associated with the user in turn associated with the provisioning request. In one embodiment, the user image 508 resides in some type of user image database 510 (as depicted). In another embodiment, the user image 508 is part of the provisioning server 502 (not depicted). In yet another embodiment, the user image 508 is provided by some other arrangement (not depicted). Further, as shown in embodiment illustrated in FIG. 5b, the user image database 510 may be centralized (as depicted). In another embodiment, the user image database is a decentralized database with full or partial replication. The latter arrangement can advantageously allow for individual database instances to act as a cloud server for servicing large fluxes of provisioning requests and/or widely geographically dispersed implementations of the VDI environment.

In another embodiment (not depicted) of the arrangements of FIGS. 5a and 5b, the user record and user image resides in the same database. In yet another embodiment (not depicted) of the arrangements of FIGS. 5a and 5b, the user record and user image is the same file or group of associated files. In yet another embodiment (not depicted) of the arrangements of FIGS. 5a and 5b, the user record and user image resides on the provisioning server. Other exemplary embodiments regarding aggregations of these functions with other functions are described in more detail below.

Figure 5C:
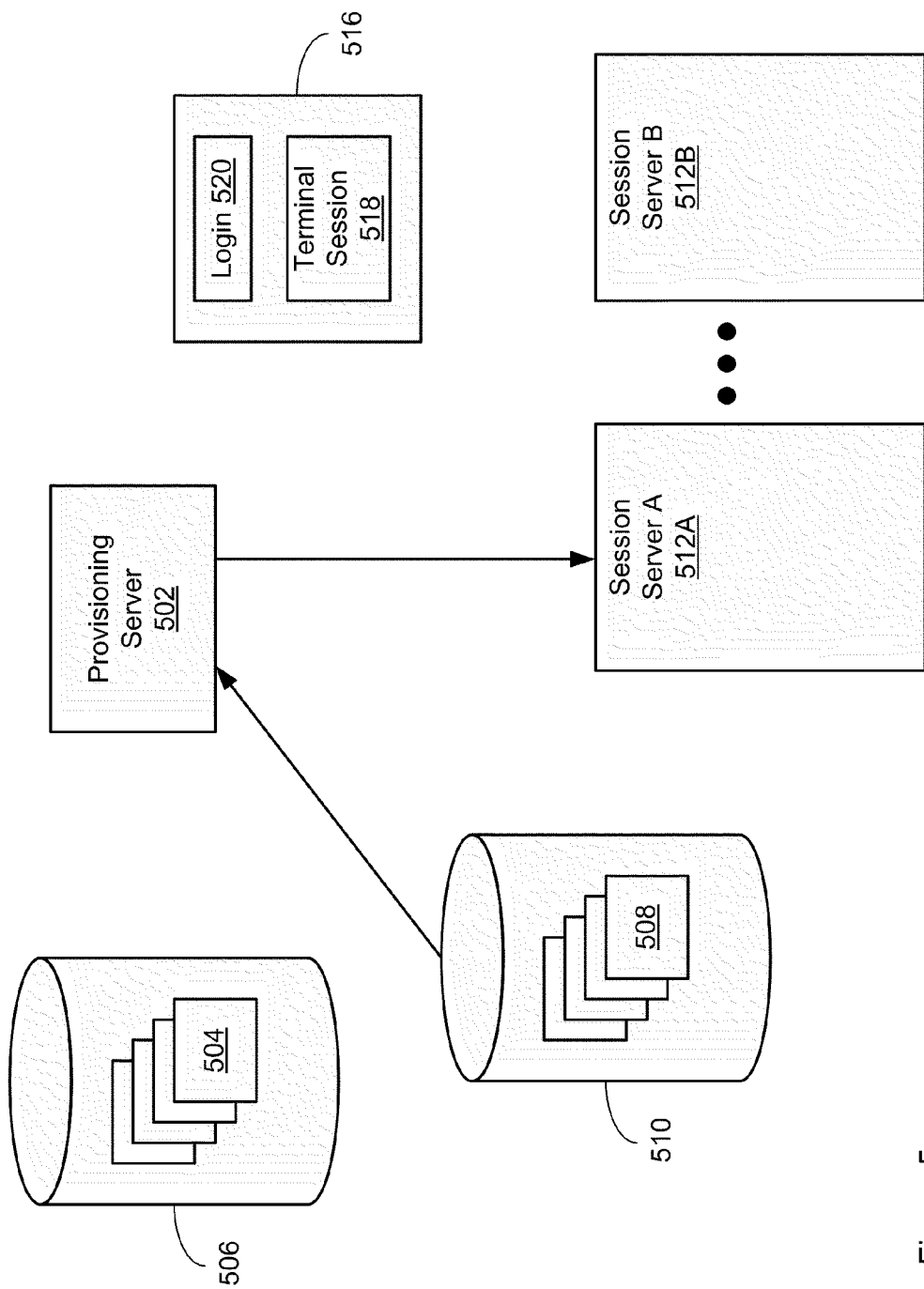

In the embodiment as illustrated in FIG. 5c, the successful location of user image 508 results in notification of this event (or failure) to the provisioning server 502. In one embodiment, the provisioning server 502 then allocates a particular session server 512A from one or more available session servers 512A, 512B. The session server 512A, if the allocation is successful, will subsequently execute an instance of the virtual machine associated with the user record 504. In one embodiment, the system hosting the located user image 508 allocates a particular session server 512A from one or more available session servers 512A/512B. In some embodiments where there are more than one session servers 512A/512B, allocations are made according to various load balance, geographic, logical partitioning, hashing, or other allocation schemes. In another embodiment, the plurality of session servers 512A/512B depicted in FIG. 5c are collectively coordinated in a cloud-computing or other equivalent arrangement so as to act as a single server.

In yet another embodiment (not depicted) of the arrangements of FIGS. 5a, 5b and 5c, the user record 504 and user image 508 resides on a combined server that provides the functionality of the aforementioned provisioning server 502 and the session server 512A.

Figure 5D:
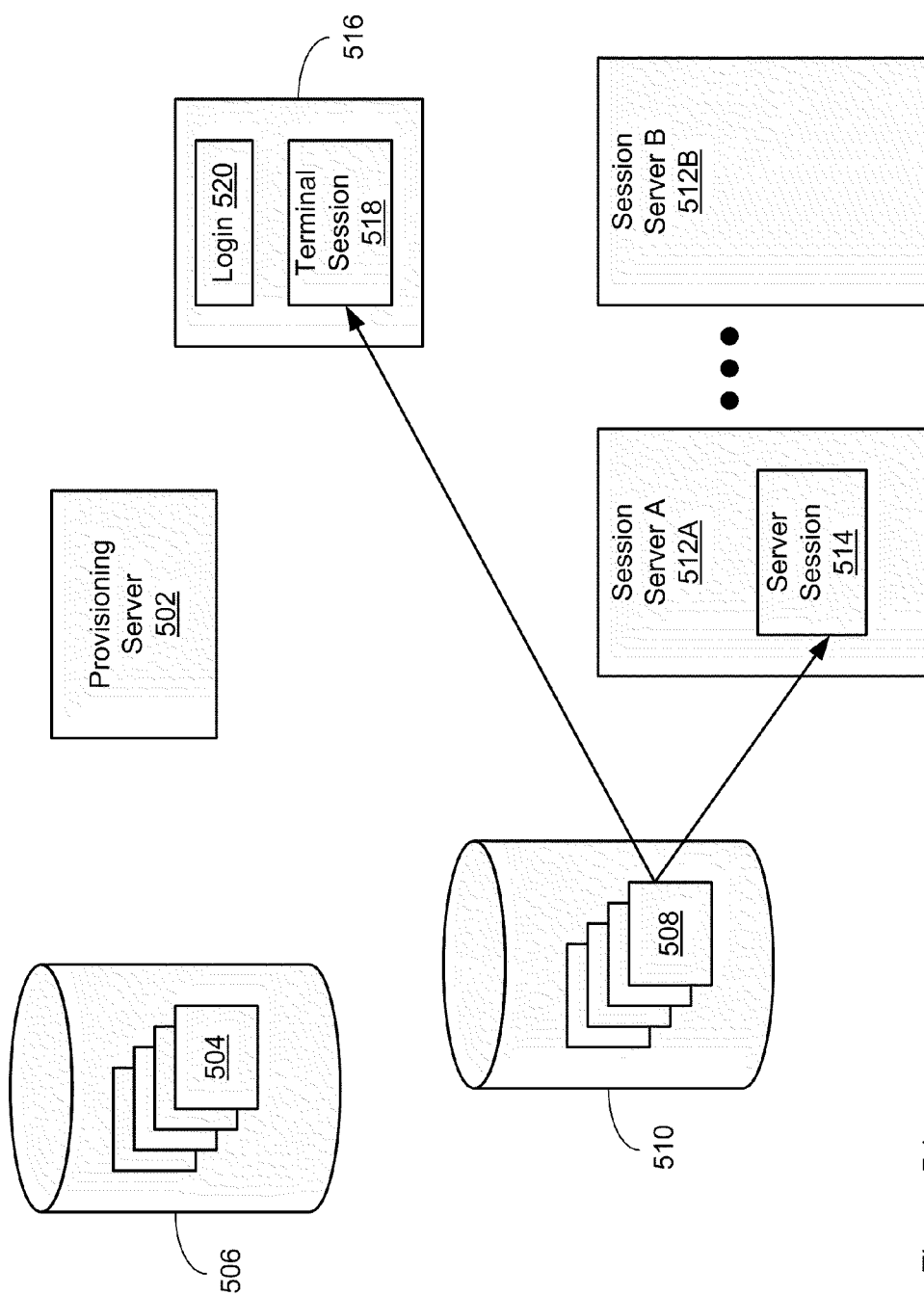

As shown in an embodiment illustrated in FIG. 5d, the located user image 508 is retrieved and used to (1) send a server file to the session server 512A to be executed as a server session 514 on the allocated session server 512A and act as a virtual machine, and (2) send a terminal file to the terminal computer 516 or equivalent to be executed as a terminal session 518 on the terminal computer 516 or equivalent and act as a terminal client. In one embodiment, the terminal file resides on the terminal computer 516 or equivalent. In another embodiment, the terminal session and login utility 520 are the same program or group of programs. In yet another embodiment, the terminal file is sent to the terminal computer 516 or equivalent by the session server 512A, particularly if the session server 512A is integrated with the user image database 510 and/or provisioning server 502 as in some of the aforementioned embodiments.

As shown in an embodiment illustrated in FIG. 5e, the terminal session 518 (executing on the terminal computer 516 or equivalent and acting as a terminal client) and server session 512A (executing on the allocated session server and acting as the corresponding virtual machine) communicate with a VDI network protocol and collective emulate and/or implement the user computer environment as if it were a traditional unitary computer arrangement like that of FIG. 1.

It is understood that there are a wide range of possible variations on the embodiments provided above as is clear to one skilled in the art. Further, VDI technology is rapidly evolving and differentiating so further variations and improvements are expected. These are provided for by the invention to be described. Prior to description of the invention, however, problems with the performance and scalable support of real-time media—including interactive real-time audio, video, animation, instrumentation, visualization, and/or other media types are described in the next section.

3. Problems of Supporting Real-Time Interactive Media in the Established VDI Architecture In the traditional VDI architectural framework, terminal servers transmit graphical output of programs from to the terminal client, and user input captured at the terminal client is sent from to the terminal client to the terminal server. There can be significant scaling and performance problems when using the aforementioned VDI architectural framework to support real-time media such as audio, video, animations, high-performance graphics, etc. The VDI architectural framework would force the transmission of real-time media streams for the audio, animations, high-performance graphics, video, etc. over the network environment first between each paired terminal client and terminal server (and in the case of two-way collaboration applications, additionally between the terminal server session instances for the users involved). Of key concern is that the VDI model of hosting the portion of applications creating raw graphics, image, and audio at the server results in the streams between the terminal client and terminal server to be raw uncompressed data. Even if a wideband connection and network adapters could handle the resultant massive flow of such an exchange for one terminal client/terminal server pair, more than a few active users of the this type would choke the network carrying capacity and/or server I/O capacity. These concerns are illustrated in FIG. 6. For media types such as video, animations, high-performance graphics, and the like, the result would be poor quality from erratic updating and often high latency. Similarly, real-time audio would suffer from dropouts and often high latency. The result is completely impractical with regards to scalability and thus flies directly against the principle goal of VDI technology.

Some VDI product manufacturers have addressed the fraction of these concerns relaying to 1-way streaming media applications (where bulk-delay is not an issue) by implementing Flash Players and other such media-file player utilities locally at the terminal hardware platform. However, such approaches do not address interactive applications involving real-time media. This has remained an important and growing problem as applications increasing employ interactive real-time media such as audio, animations, high-performance graphics, video, and the like.

In summary, key remaining problems include:
Protocols used by VDI and VAI are typically based on TCP. However, delivery of real-time audio, video, high performance graphics, etc. over TCP is not practical due to the inherent TCP methods of handling of packet loss;
Performing audio/video compression and decompression at the server consumes extensive computation power with a full duty-cycle and forces uncompressed streams through the network ports; these impose significant limits to practical scalability of VDI and VAI servers in actual VDI and VAI deployments;
Server-based audio/video compression requires excessive network bandwidth to allow uncompressed audio/video to be sent over the network. For example, a simple uncompressed video CIF stream running at 30 fps uses approximately 50 Mb/s. This imposes significant limits to practical network-loading scalability of VDI and VAI deployments and in reality makes video over VDI impractical at best in local area deployments and essentially impossible in wide-area deployments.

Figure 7:
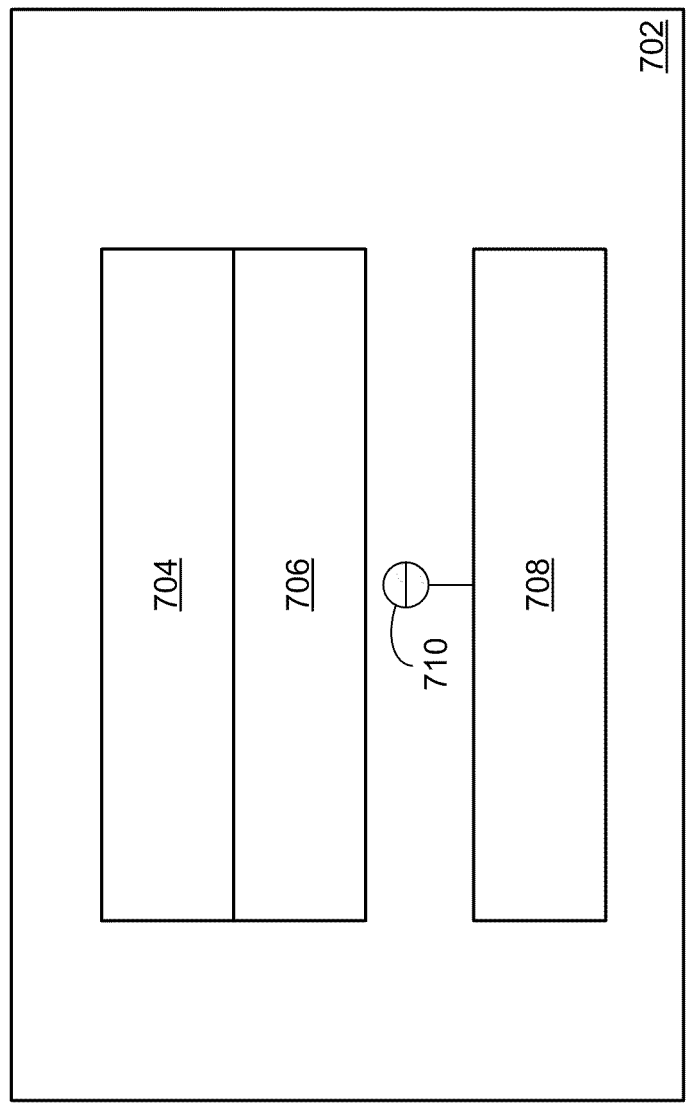
FIG. 7 shows an exemplary implementation of a software application that uses a Media Engine for incorporating audio and video communications functionality.

4. Approaches to Adapting Real-Time Media Engines (for Audio, Video, Animation, Instrumentation, Visualization and/or Other Media Types) to VDI Architecture Although some implementations of applications including interactive real-time media such as audio, animations, high-performance graphics, video, and the like are implemented without regard to special execution and networking performance requirements, it has become relatively common in modern software engineering practices for real-time media encoders and decoders (usually together with related stream handling and control) to be implemented in the form of self-contained modules that encapsulate audio/video processing, call management, and related functionality and expose well-defined abstract interfaces to the functionality they implement. These modules are typically bundled together into a complete software package that can be used by application software developers to incorporate audio/video functionality into their systems without having to concern themselves with the details of managing audio and video communications. For the purposes of illustration, such a packaging arrangement will be assumed and this package will be called a "media engine" and will in places be abbreviated as "ME" in diagrams. FIG. 7 shows an exemplary implementation of a software application that uses a Media Engine for incorporating audio and video communications functionality. In the diagram, the software application runs on a traditional PC or laptop 702. The application comprises a graphical user interface 704 that provides user with access to the application logic module 706. The application module 706 in turn provides voice and video communications functionality by accessing a media engine 708 through the media engine interface 710.

The problems identified in the preceding section can be readily addressed by an appropriately partitioned media engine implementation. The resultant partitioned media engine implementation also provides a number of architectural flexibilities making it very useful in a variety of settings.

The first structural feature of the partitioned media engine is to eliminate the need to transmit high-bandwidth media streams through terminal-server/terminal-client network connection(s). This is accomplished by partitioning the media engine so that media processing, including capture, encoding, sending, receiving, decoding, and playback, is performing on the terminal client.

A second structural feature, in accordance with one embodiment, is to avoid sending any media streams across the VDI protocol (through terminal-server/terminal-client network connection(s), which then allows voice and video traffic to take advantage of network support (e.g. QoS, packet prioritization, bandwidth management) designed to optimize the delivery of voice and video. This is accomplished by partitioning the media engine so that media transmission, including sending, receiving, jitter compensation, packet loss concealment, is performing on the terminal client.

A third structural feature, in accordance with one embodiment, is to offload CPU intensive media compression and decompression functions from the terminal server. This is accomplished by partitioning the media engine so that media encoding and decoding is performing on the terminal client.

A fourth structural feature, in accordance with one embodiment, is to shield the client application as much as possible from the complexities within VDI implementations.

A fifth desirable structural feature, in accordance with one embodiment, is to shield the system administrator from instillation and maintenance complexities when implementing the partitioned media engine in a real-world VDI environment.

Figure 8:
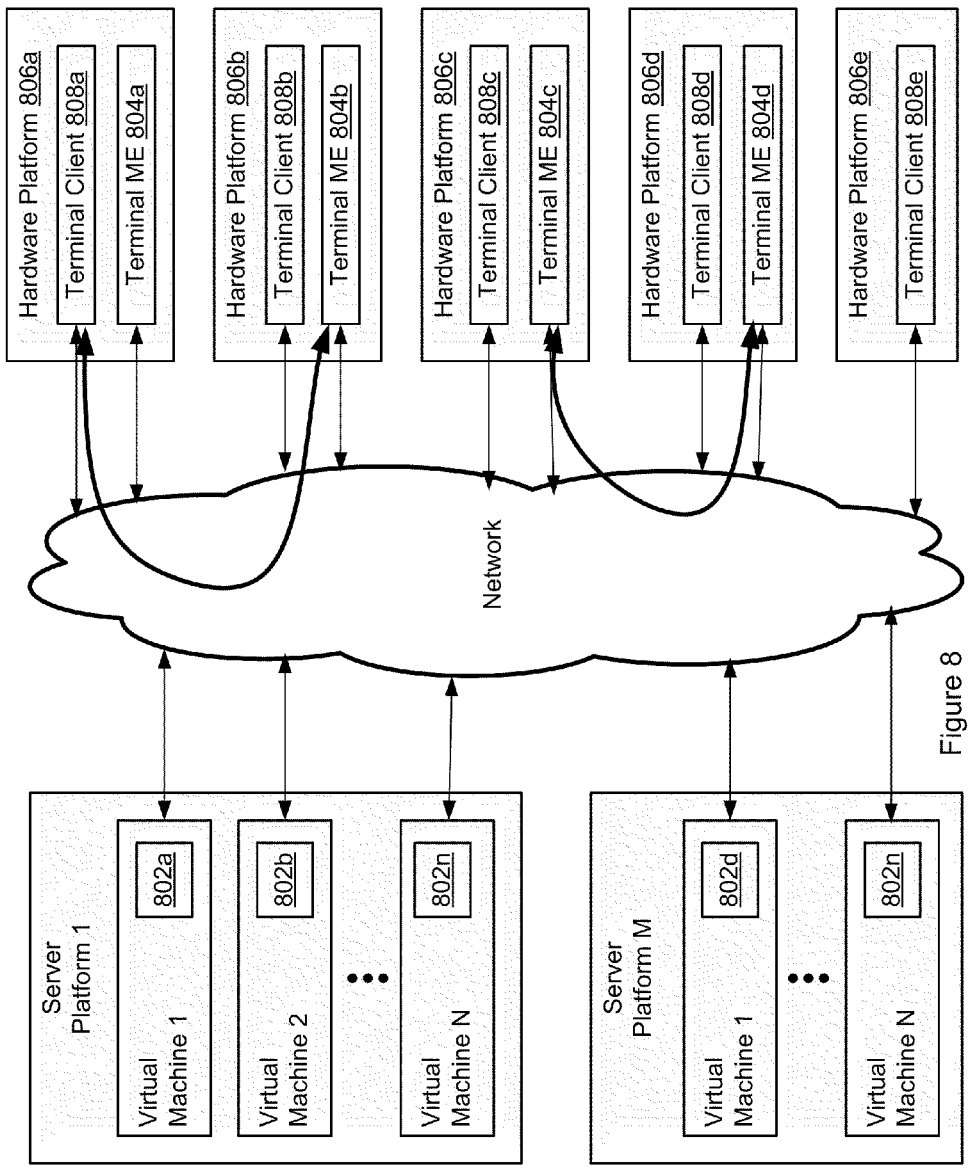
FIG. 8 illustrates an exemplary arrangement demonstrating the first structural feature of the partitioned media engine (i.e., eliminating the need to transmit high-bandwidth media streams through terminal-server/terminal-client network connections).

FIG. 8 illustrates an arrangement demonstrating the first structural feature of the partitioned media engine in accordance with one embodiment (i.e., eliminating the need to transmit high-bandwidth media streams through terminal-server/terminal-client network connections). In this arrangement, each VDI session wherein one or more applications employing interactive audio, animations, high-performance graphics, video, and the like are invoked causes:
a server ME 802*a*-802*n* portion of a media engine to execute within the virtual machine server session; and
a corresponding terminal ME 804*a*-804*d* portion of a media engine executing on the corresponding terminal platform 806*a*-806*e*.

In such an exemplary arrangement, full duty-cycle computations advantageously employed or required for media encoding and/or decoding (and related stream handling and control) run within the terminal ME 804a-804d executing at the terminal platform 806a-806e and compressed media streams are sent directly between the terminal ME and the other party in a call. This prevents:

(1) transmission of uncompressed real-time media though the VDI infrastructure, server, network ports, and general network environment, and (2) virtual machines hosted at the server having to execute full duty-cycle computations for media encoding, decoding, stream handling, etc.

Further, in such an arrangement, all usual (non-real-time) application matters such as general program execution, GUI interactions, window hierarchy, display hierarchy, window resizing, etc., together with naturally VDI-inherited data-oriented operations such as directories, presence, interactions with utilities such as OCS, etc., are naturally handled by the server ME executing in the corresponding virtual machine executing as a server session on a VDI server.

The fine result of this approach is that high performance is delivered, no loading is provided on servers, and only compressed streams are carried by the network. The only requirement is that terminal platforms have the ability to successfully operate the terminal ME 804a-804d in addition to the terminal client 808a-808e.

Figure 9:
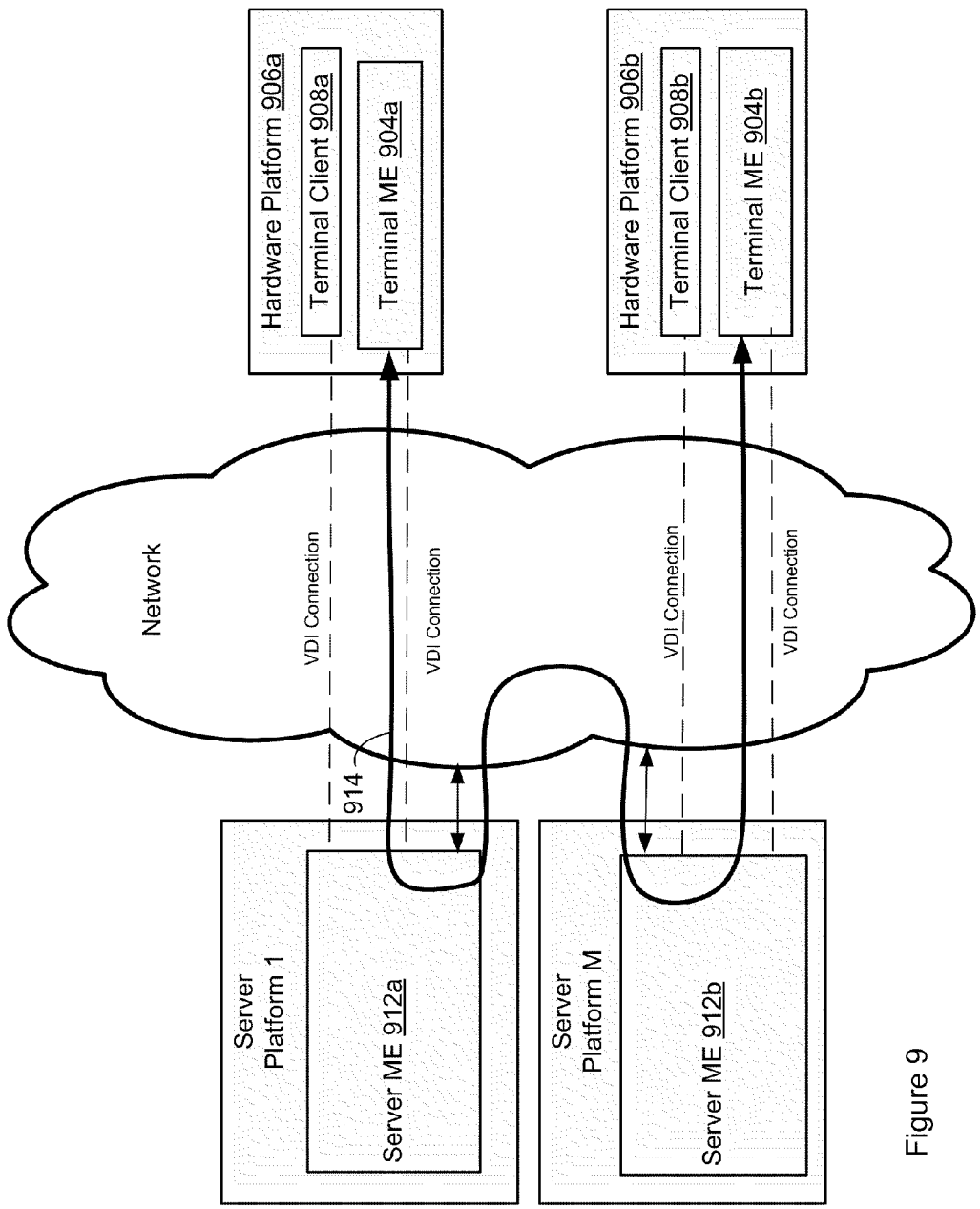
FIG. 9 shows an arrangement in accordance with another embodiment. This arrangement demonstrates a subset of the structural features of the partitioned media engine.

FIG. 9 shows an arrangement in accordance with another embodiment. This arrangement demonstrates a subset of the structural features of the partitioned media engine. In this embodiment, transmission of high-bandwidth media streams is avoided by performing audio and video compression on the terminal client 908a/908b rather than on the terminal server. However, compressed media streams are transmitted through the VDI connection (i.e., terminal-server/terminal-client network connection), that is "in-band" in the VDI connection, and connected to their associated call endpoint by the server ME 912a/912b via the media stream signal path 914. (It is noted that although FIG. 9 shows the associated call endpoint to be a similar server/terminal pair, in other settings, applications, or call examples the associated call endpoint could alternatively be a computer running an interactive audio/video application, a terminal implementing the same architecture as discussed later on (FIG. 28) in Section 12, etc.)

In an arrangement such as that of FIG. 9, server ME 904a/904b instances can optionally, or as advantageous, transcode media streams into different formats to provide for a different set of capabilities than those provided by the terminal ME 904a/904b.

Figure 10:
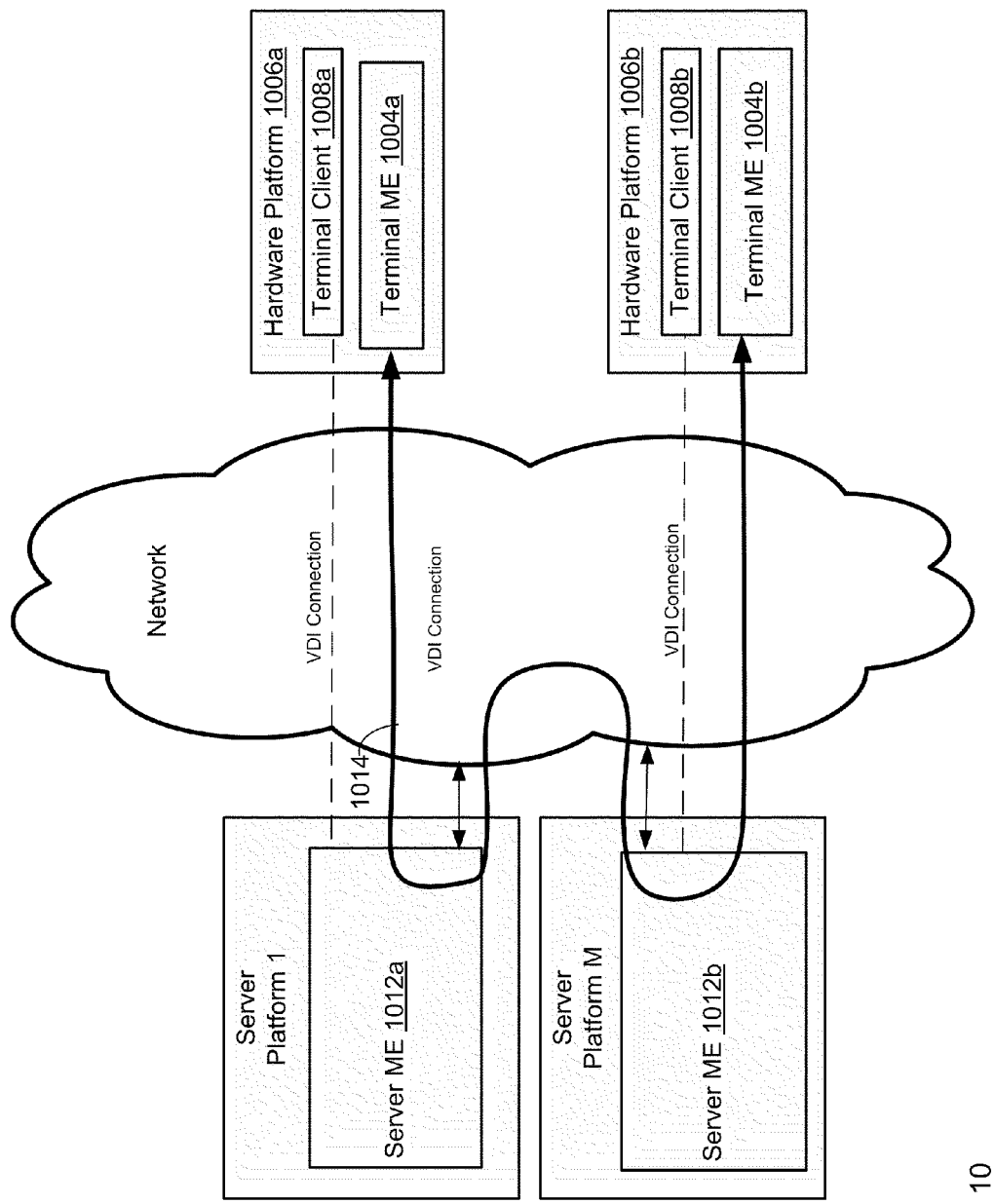
FIG. 10 shows an arrangement in accordance with another embodiment similar to that described in FIG. 9.

FIG. 10 shows an arrangement in accordance with another embodiment similar to that described in FIG. 9. In this embodiment, compressed media streams are relayed by the terminal ME 1004a/1004b, but rather than transmitting media through the terminal-server/terminal-client network connection as described in FIG. 9, compressed media streams are sent between the terminal ME 1004a/1004b and the server ME 1012a/1012b using a communications path other than and external (i.e., "out-of-band") to the VDI connection (i.e., terminal-server/terminal-client network connection) between the terminal and its associated server.

In the exemplary arrangements of FIG. 9 and FIG. 10, as well as variations and combinations of them, the invention provides for media streams traveling between servers to employ non-VDI mechanisms for audio and video (e.g. encapsulating audio/video streams inside UDP/RTP packets or other approaches). This is in keeping with classical VDI architecture as in VDI environments there is usually no server-to-server VDI channel.

The invention provides for variation and combinations of the arrangements described. For example, the invention covers implementations wherein media streams and VDI channels are carried via a combination of TCP and UDP channels.

Figure 11:
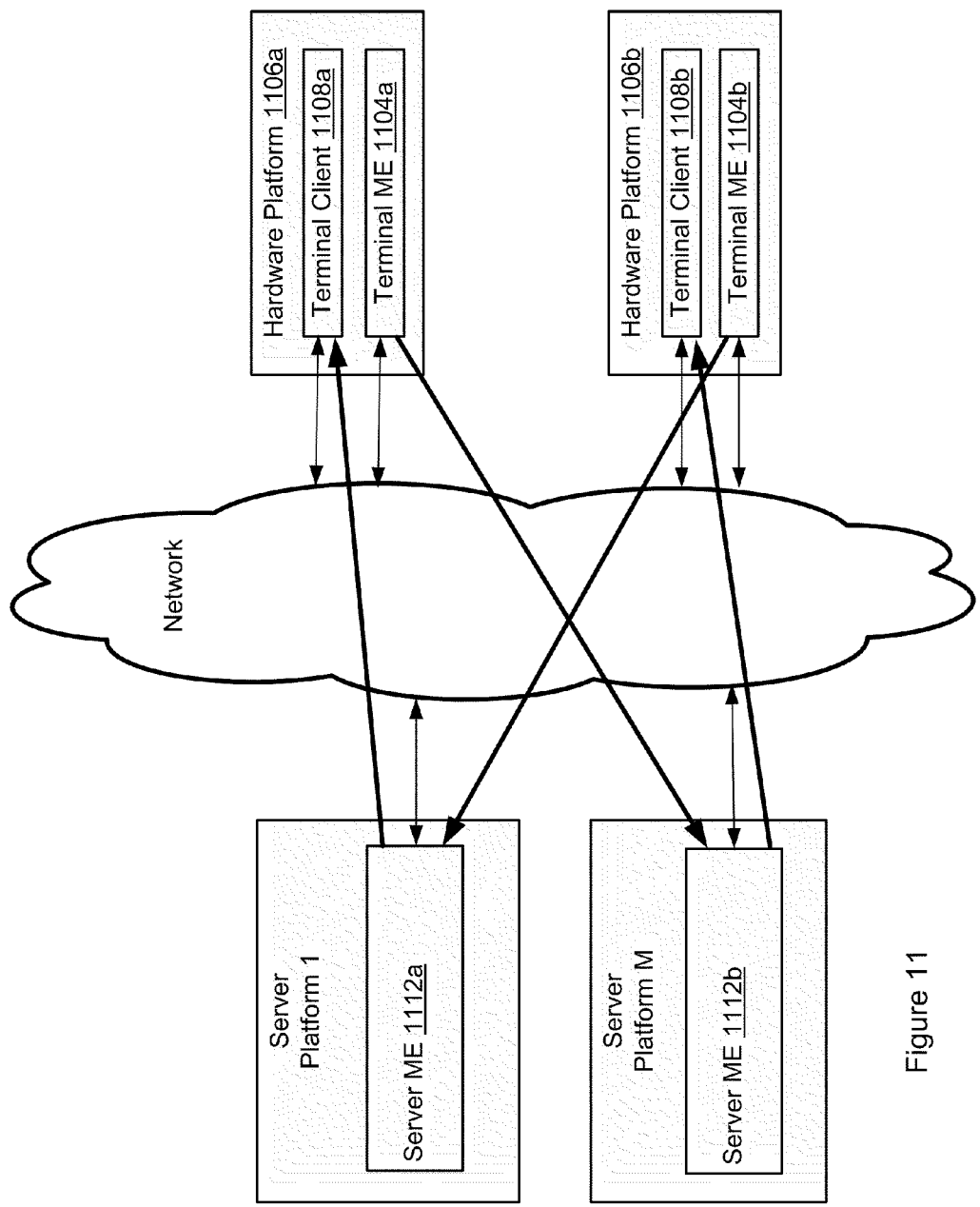
FIG. 11 shows yet another embodiment demonstrating a subset of the structural features.

FIG. 11 shows yet another embodiment demonstrating a subset of the structural features. In this embodiment, media capture, encoding, and transmission is done by the terminal ME 1104a/1104b, but media receiving, decoding, and rendering continues to be performed by the server ME 1112a/1112b.

In an embodiment, the terminal ME itself may rely on yet further computational offloading, for example via an audio card, echo cancelling microphones, the video compression capabilities within a webcam, video decoding hardware support embedded in CPUs or GPUs, etc.

It is additionally noted that the principles displayed here for a two-component partition of a media engine can be used to devise partitions with three or more components. These will be called "multi-component partitions" and will be considered later, although it is noted that the three or more resulting components may have organizations that may be organized in peer, hierarchical, or mixed arrangements as will be discussed.

5. Approaches to Two-Component Partitioned Media Engine Software Implementation

Figure 12:
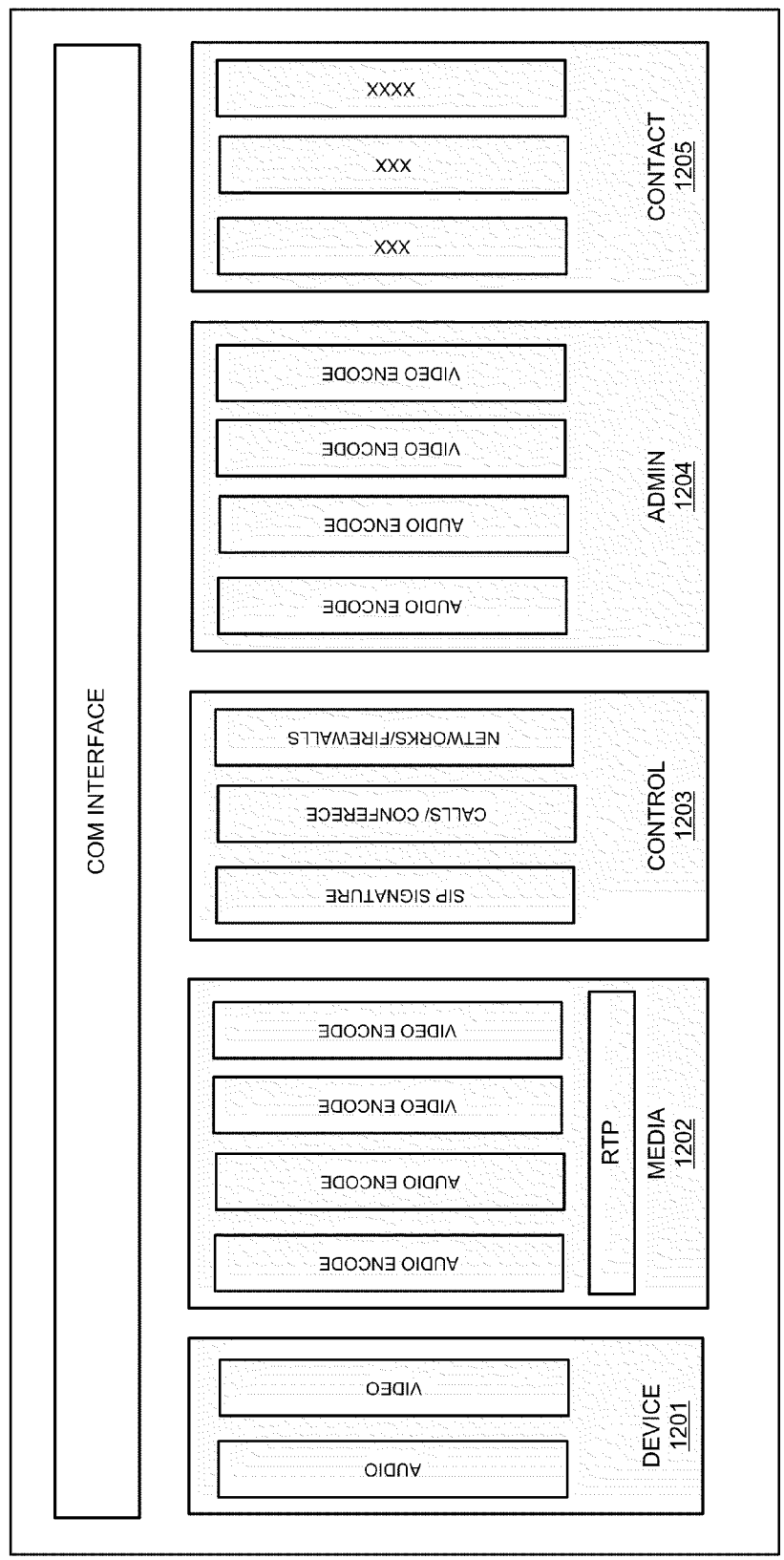
FIG. 12 depicts an exemplary architecture of a contemporary high-functionality real-time interactive collaboration application whose implementation comprises a media engine providing two-way audio and video.

FIG. 12 depicts the architecture of a contemporary high-functionality real-time interactive collaboration application in accordance with one embodiment. The interactive collaboration application includes a media engine 1202 providing two-way audio and video functionality. Other embodiments with alternate, fewer, or additional features, structures, and functionalities are of course possible. For example:

In one embodiment, an interactive remote-medicine application adds to or replaces video and/or audio streams with real-time medical telemetry, real-time medical imaging (such as live sonogram feeds), etc. of similar bandwidths and performance constraints;

In another embodiment, incoming interactive graphics mixed with video and outgoing live video are combined in virtual-reality environments, which may be used in professional training, hazardous robotics control, online interactive multi-user games, GIS systems, social networking page mash-ups, etc.

However, the exemplary high-functionality real-time interactive collaboration application architecture depicted in FIG. 12 can be used to illustrate approaches to software implementation a two-component partitioned media engine.

In further detail, the exemplary application architecture depicted in FIG. 12 employs a GUI component connecting to a media engine component though the set of Application Programming Interfaces (APIs) exposed by the Media Engine. In an embodiment, various technologies can be used to implement these APIs. For example, Media Engine implementations can be packaged as dynamically linked libraries (DLLs) and expose their interfaces using native function calls in programming languages such as C or C++, Java, or C#. Other implementations may take advantage of frameworks such as COM (Component Object Model), ActiveX, or HTTP/REST that are provided by the underlying operating system and provide a programming-language neutral way of implementing object interfaces. Many of the examples used in this document show COM interfaces, but the examples apply equally well to other interface technologies.

In an embodiment, a layered implementation may be used to shield the Media Engine objects from the specific interface technology being used. For example, the lowest layer Media Engine implementation may contain a C++ object called Endpoint that provides a high-level interface to various aspects of Media Engine functionality. This interface may include a Call( ) method that allows Media Engine clients to initiate audio/video calls. In response to a successful call attempt, Media Engine creates a Call object that provides an interface that allows Media Engine clients to manage the various aspects of the resulting call. After the call has been terminated, information about call details and call statistics may be available through the interface provided by a CallLog object.

When using COM, Media Engine clients use a COM interface layer to access Media Engine objects. For example, Media Engine may include an IEndpoint COM interface that provides access to Endpoint functionality. Similarly, Media Engine may contain an ICall COM interface to provide access to Call functionality and an ICallLog interface for call statistics.

The Media Engine implementation may contain a Proxy layer that sits between COM and the low-level Media Engine objects and that translates COM interfaces to low-level C++ interfaces. This proxy layer may include an EndpointComProxy object that implements the COM functionality and translates COM calls into the corresponding C++ calls on the Endpoint object. In addition, the Proxy layer may include a CallComProxy object that translates ICall COM calls to low-level Call object interfaces and ICallLogComProxy object that translates ICallLog COM calls to low-level CallLog object interfaces.

Figure 13:
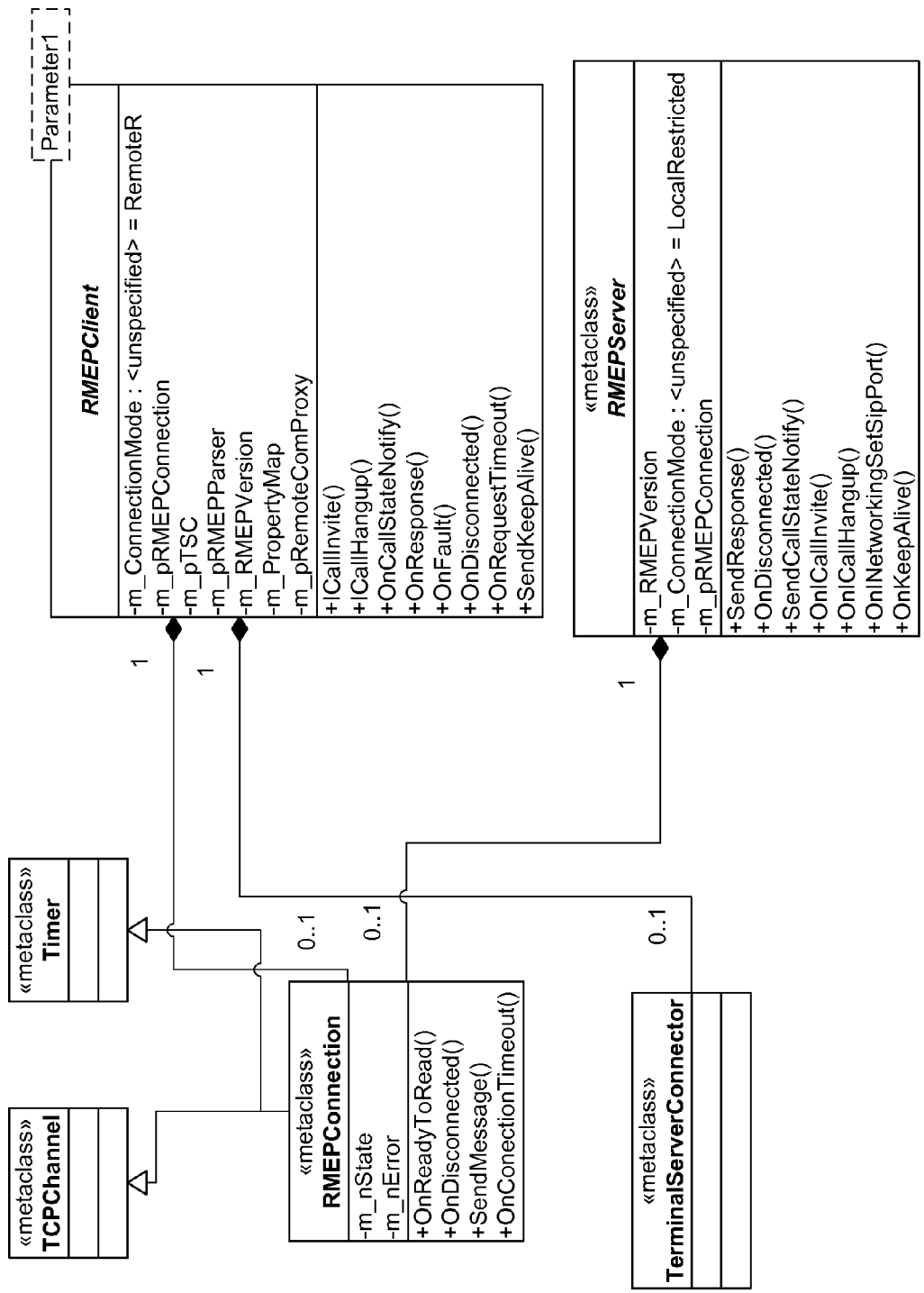
FIG. 13 illustrates an exemplary class diagram showing an aggregation association between the RMEPClient object and the RMEPConnection object.
Figure 14:
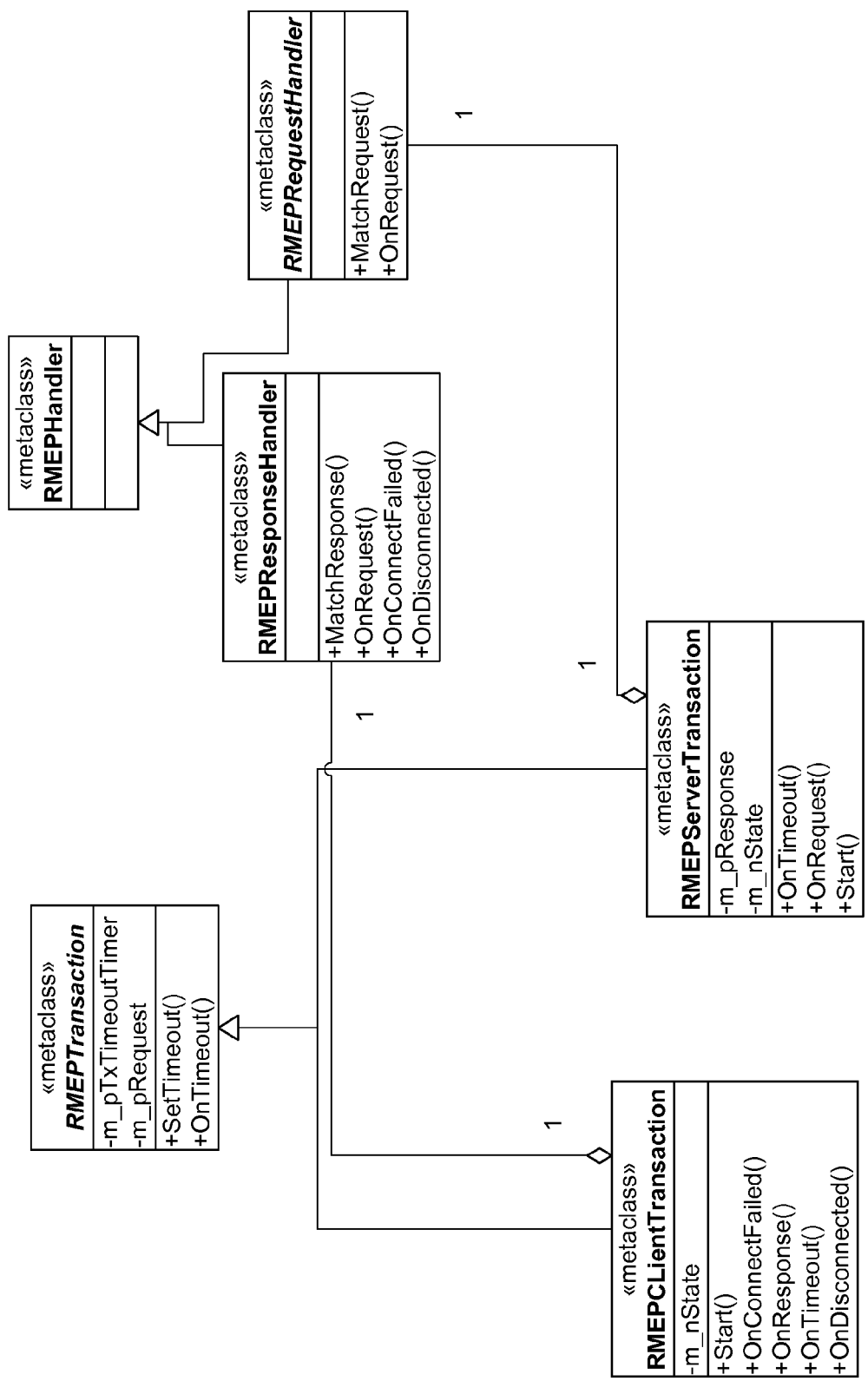
FIG. 14 illustrates an exemplary class diagram showing the RMEP Client maintaining a list of ongoing transactions to track the status of each sending request and receiving response, and the RMEP server keeping a list of incoming transactions.

As an example, FIGS. 13 and 14 depict an exemplary class embodiment. FIG. 13 illustrates an exemplary class diagram showing an aggregation association between the RMEPClient object and the RMEPConnection object. FIG. 14 illustrates an exemplary class diagram showing the RMEP Client maintaining a list of ongoing transactions to track the status of each sending request and receiving response, and the RMEP server keeping a list of incoming transactions. It is clear to one skilled in the art that such class definitions and organization may be implemented in a wide manner of ways other than that described here, and such alternate embodiments of the classes are anticipated and provided for by the invention. It is noted that the exemplary embodiments depicted in FIGS. 13 and 14 will be considered later on in Sections 10-11.

Figure 15:
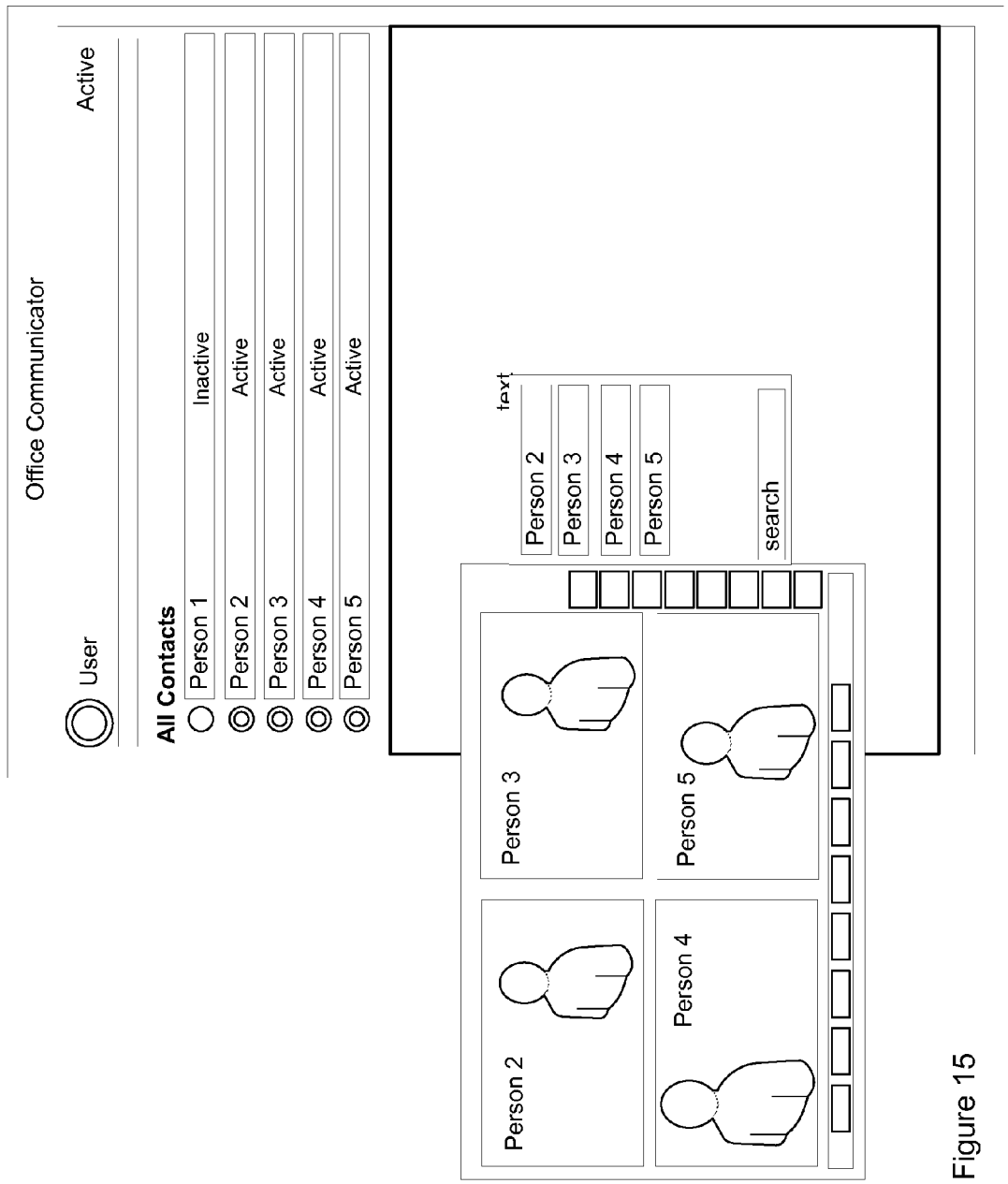
FIG. 15 depicts an exemplary user experience presented by a GUI for a the exemplary contemporary high-functionality real-time interactive collaboration application architecture of FIG. 12.
Figure 16:
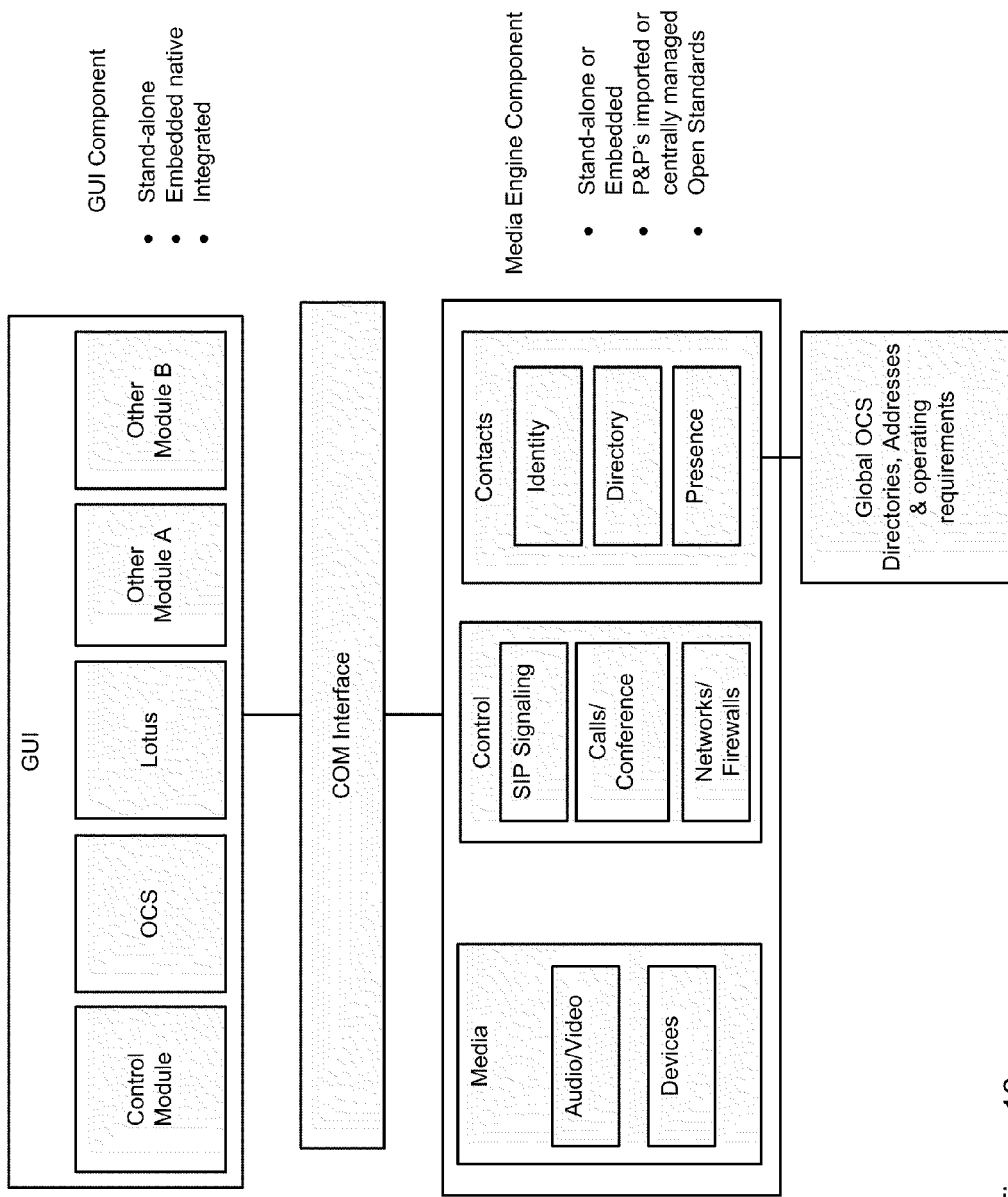
FIG. 16 depicts an exemplary implementation of the general arrangement depicted in FIG. 12.

The GUI component comprises not only control module but also intertwined other functions. For example, in the context of a contemporary high-functionality real-time interactive collaboration application, in accordance with some embodiments, the user experience includes aspects and information exchanges with collaboration environments such as LOTUS SAMETIME® and/or MICROSOFT® OCS as well as other software utilities. In the context of a contemporary high-functionality real-time interactive collaboration application, the resultant user experience as presented by such a GUI component shows the great utility and sophistication suggested in FIG. 15. In other types of applications of other embodiments, LOTUS SAMETIME® and/or MICROSOFT® OCS is replaced by database display utilities, controls, and/or other GUI features. Again, the application architecture depicted in FIG. 12 and associated user experience represented by FIG. 15 are not limiting but rather serve as a representative and sufficiently rich example that can really be scaled-up, scaled-down, and/or altered for a wide range of real-time-interactive two-way applications. As an exemplary arrangement for further discussion, FIG. 16 depicts an exemplary implementation of the general arrangement depicted in FIG. 12.

Further as to the exemplary application architecture depicted in FIG. 12, the media engine component may employ an exemplary internal structure comprising devices element, a media element, control element, administration element and contacts element.

The Devices element 1201 provides interfaces to manage and manipulate the audio/video devices used for interactive communications. A typical Devices module can provide functionality to select which devices are used to capture and render audio and video, to change audio gain on speakers and microphones, to set video parameters such as brightness, contrast, saturation, etc. and to manipulate pan/tilt/zoom controls on cameras.

The Media element 1202 is responsible for capturing, encoding, sending, receiving, decoding, and rendering media. A typical Media module manages audio streams, video streams, or both. In some cases, multiple audio and/or video streams are used (e.g. for stereo audio, 3D video, presentation video as well as live video, etc.). Media modules can implement several encoders for audio and video. For example, audio support may include one or more of G.711, G.722, G.722.1, and AAC-LC for audio calls from 3 kHz to 14 kHz (ultra-wideband). Video support may include one or more of H.264, H.263+, and H.263 for video with rates ranging from 128 kb/s to 2048 kb/s. Video may be encoded at up to 30 fps (depending on the webcam used). In most cases, media are encapsulated using RTP and sent over UDP, although other transmission media can be used as well.

The Control element 1203 is responsible for call setup and teardown, call management (providing features such as call hold, resume, and transfer), and conference management. This module can also include registration support to interact with call processing servers, and can implement support for NAT and firewall traversal. Control modules typically implement industry-standards protocols such as SIP and H.323 for basic call signaling and call processing functionality, as well as special-purpose protocols such as STUN, TURN, and ICE for firewall traversal.

The Admin element 1204 provides administrative functionality such as configuration of system settings, user preferences, and administrator policies, storage and retrieval of call detailed records (CDRs), managing and enforcing software licensing restrictions, and logging of all system activity including debug logs, performance histories, etc.

The Contacts element 1205 manages user credentials and logins, stores address book information, interacts with corporate directories and presence systems. In this exemplary arrangement, the contacts element may also link to outside utilities, parameter sets, etc.

Again, the application architecture depicted in FIG. 16 is not limiting but rather serve as a representative and sufficiently rich example that can really be scaled-up, scaled-down, and/or altered for a wide range of real-time-interactive two-way applications.

Figure 17:
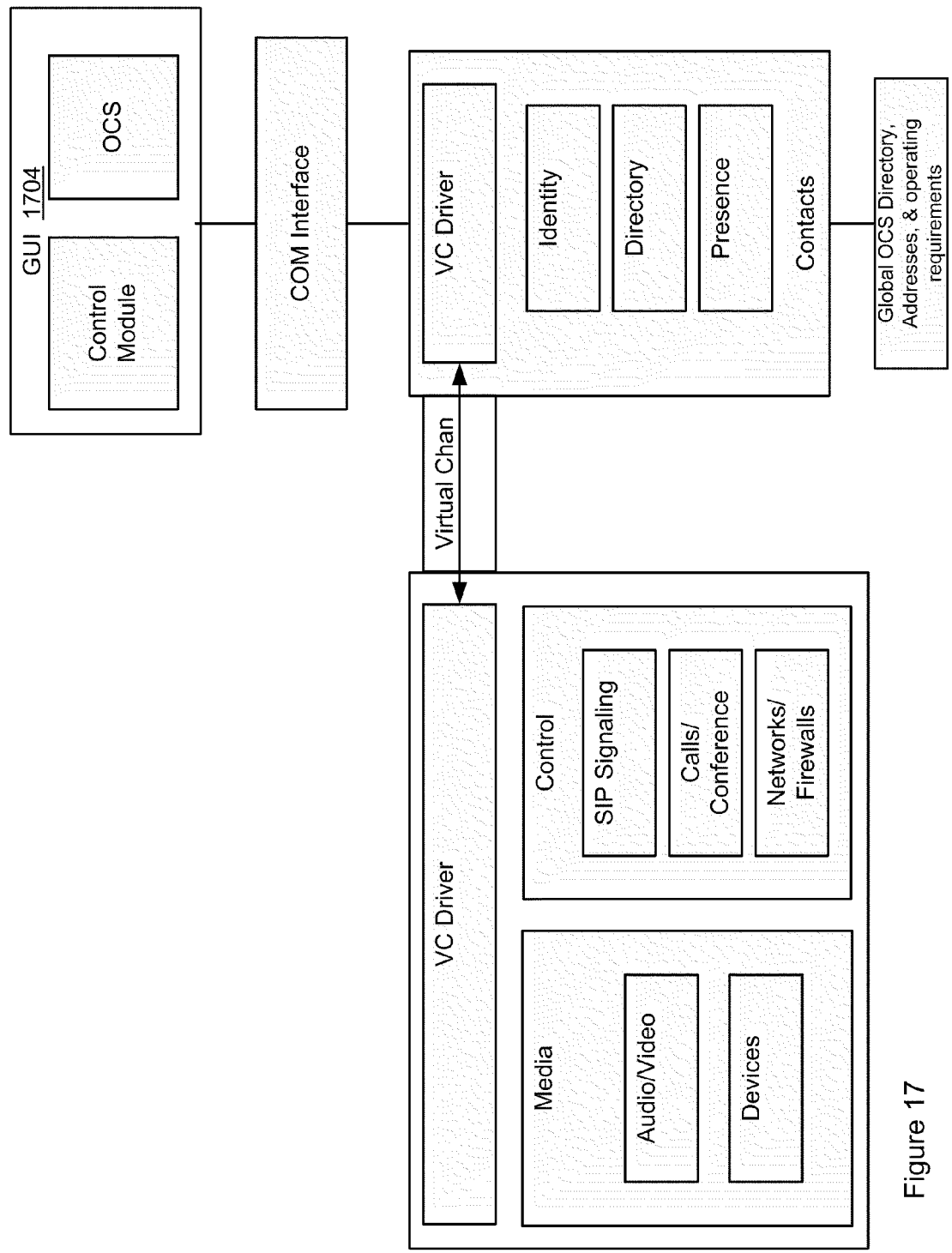
FIG. 17 shows an exemplary partition of the exemplary application of FIGS. 15-16 which includes an exemplary partition of the media engine elements and the introduction of an exemplary virtual channel between them.

FIG. 17 shows an exemplary partition of the exemplary application of FIGS. 15-16 which includes an exemplary partition of the media engine elements and the introduction of an exemplary control channel between them. In this embodiment, the contact and administration elements of the media engine are coupled to the GUI component and the application logic, executing on a virtual machine or other server session on a server platform, all in full keeping with traditional VDI technology. What deviates from traditional VDI technology is:

The high-bandwidth, high CPU usage (media, devices, and control) elements of the media engine do not run on the virtual machine in a server session on a VDI server platform. Instead, a completely separate software program of set of software programs executes separately on the terminal platform; and The portion of the media engine executing on the server platform and portion of the media engine executing on the terminal platform are each supplemented with a respective virtual channel driver, and these two respective virtual channel drivers establish an active virtual channel between the two portions of the media engine.

In this embodiment, the following parts of Media Engine functionality run on the terminal client:

The entire media processing chain, including device selection, capture, playback, encoding and decoding, and RTP network I/O;

Functions and operations for video window overlay and/or clipping;

Signaling protocol SIP, H.323, etc. endpoint software (including registration functions); and Additional networking code in support of signaling protocols (SIP, H.323, etc.), transport protocols (for example, RTP), etc.

The rest of Media Engine functionality runs on the terminal server. This includes:

Licensing;

Persistent configuration storage;

Debug logging;

Call history logging; and

Address Book functionality.

Figure 18:
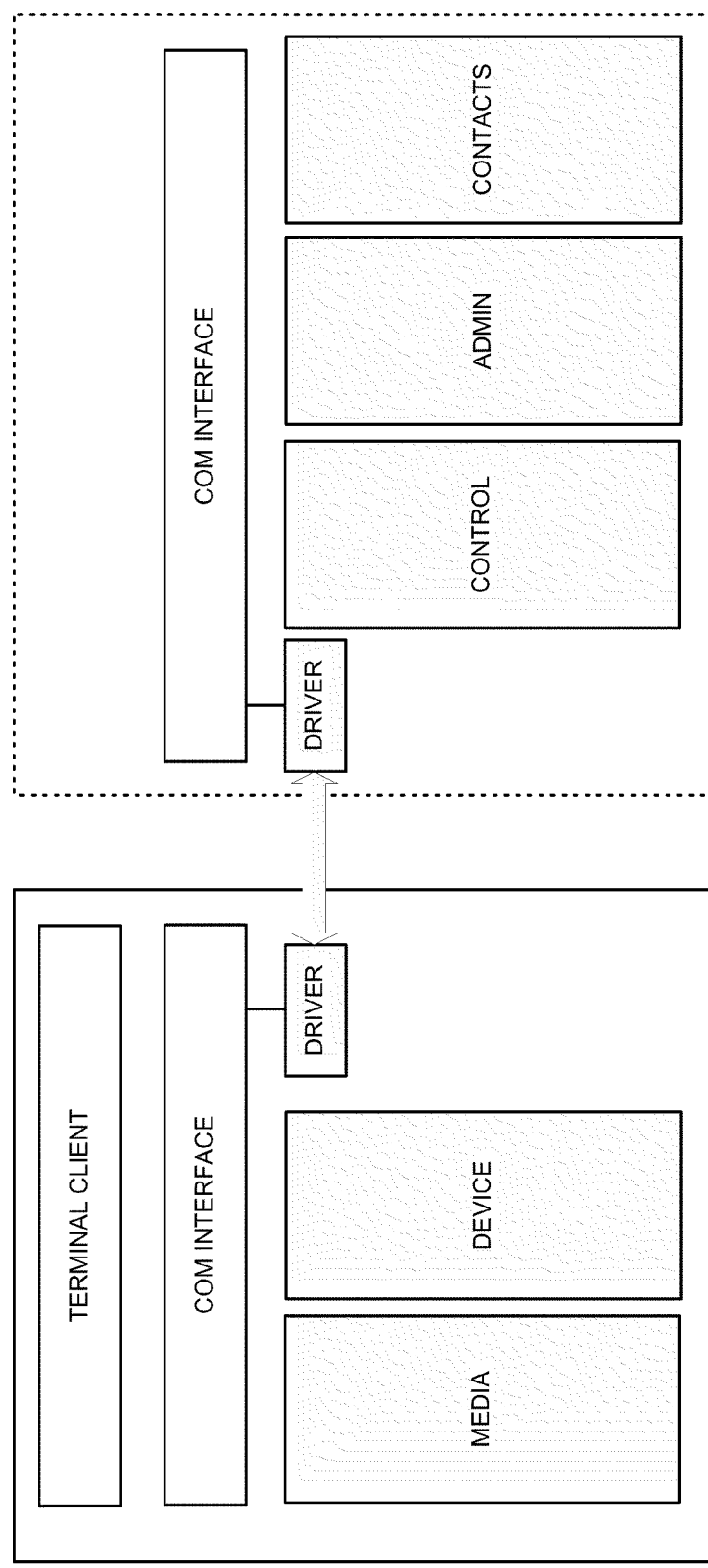
FIG. 18 illustrates an alternate exemplary partition where the control element is arranged to execute at the server platform.

FIG. 18 illustrates an alternate exemplary partition where the control element is arranged to execute at the server platform. The decision whether to execute the control element (containing call signaling, call and conference management, and networking code) on the terminal client or on the terminal server is affected by the amount of interaction between the control and media elements. For example, in an embodiment, firewall traversal functionality can be provided by a self-contained module that acts as a SIP and RTP proxy capable of firewall traversal on the outward-facing side. In this embodiment, interactions between the media element and the control element can be minimized by keeping these elements local on the same terminal client since they share the same firewall traversal module.

If firewall traversal functionality in Media Engine is provided through mechanisms that do not include a separate SIP/RTP proxy module, other media engine partitioning may be possible or preferred.

It is explicitly noted the exemplary partitions above are only two examples, and a wide range of alternate partitions are possible.

Further, it is explicitly noted that although the exemplary partitions above are provided in terms of audio/video collaboration, the same general principles apply to a wide range of alternate applications and media types including high-performance graphics, telemetry display, etc.

6. Approaches for Providing Interfaces to Two-Component Partitioned Media Engines Media Engines provide Application Programming Interfaces (APIs) to expose their functionality and to enable interaction between the GUI portion of application software and the Media Engine component. In an embodiment, the API implemented by the media engine will provide a simple and comprehensive object-oriented audio/video software endpoint. Support for remote terminals will be based on extending this object model across the network between the terminal server and the terminal client to support interaction between the Terminal Media Engine and the GUI portion of the application. Various such interactions are useful or may be advantageous. For example:

Audio input and output volume adjustment, tone control, equalization control, and/or other similar information known to the GUI portion of the application can be passed to the TE for proper control of audio capabilities;

Compression and decompression setting information known to the GUI portion of the application can be passed to the TE for proper control of compression and decompression functions;

A/V device attachment/detachment events,

A/V device plug and play events,

A/V device properties and settings etc., and/or

Error conditions for A/V devices, compression and decompression software, incoming media streams, etc., can be passed from the TE to the GUI portion of the application for display to the user.

In an embodiment, the classes and interfaces exposed by the media engine will be separated into "local" and "remote" based on where the corresponding code will executed in the remote terminal scenario. In the example embodiment considered earlier, described later on in Sections 10-11, and depicted in FIGS. 13 and 14, "remote" interfaces, covering terminal client functionality as defined above, will include IEndpoint, ICall and any interfaces accessible through it, but not ICallLog.

Some arrangements may define a well-defined set of interfaces to be Remote. Other arrangements may define interfaces to be "Remotable" by providing for a selectably optional incorporation or implementation of a remote interface. In an embodiment, the remote interface option may be selected by one or more of:

automatically selected under software control at installation or at runtime;

selected by administrator personnel at installation;

selected by administrator personnel at other times;

selectable by a user at other times and/or under other conditions; and/or automatically selected by software control at other times and/or under other conditions.

The "remotable" approach allows for the same Media Engine software to be used in VDI as well as non-VDI environments.

The instance of the media engine used by the client application on the terminal server will implement the "local" interfaces in the normal manner (e.g., the address book interfaces will continue to work with the local address book storage). For "remote" interfaces, the implementation of the interface must rely on a control channel to the Terminal Media Engine and translate commands across the Media Engine Interface into messages sent across the control channel. Similarly, messages received from the control channel must be translated into replies or events communicated to the application using the Media Engine Interface. We will refer to the network protocol used to carry these messages as the Remote Media Engine Protocol (RMEP).

In an embodiment, the first media engine instance will implement proxy code that will forward API requests to, and receive responses and notifications from, the second instance of Media Engine running on the terminal client. The second media engine instance will use the current, concrete implementations of the "remote" interfaces. It will not need to provide any functionality for "local" interfaces, and in fact, access to such interfaces will be disabled.

In an embodiment, remote interfaces may be provided by Remote COM Proxy classes in the COM Proxy layer that provide alternative implementations of existing COM interfaces (see FIG. 16). For example, with remote terminal support in place, there will be two distinct implementations of the ICallComProxy object in media engine: the pre-existing implementation using the C++ EndpointCall class, and a new implementation forwarding COM calls to a remote media engine instance using RMEP. Depending on the low-level design, these classes may be realized either as independent implementations of ICall, or derived from a common abstract ancestor class.

In addition to providing support for remote interfaces, a Remote Media Engine Protocol can also be used to provide various behind-the-scenes coordinations between the Terminal Media Engine and the GUI portion or Server Media Engine portions of the application. The following coordinations may be useful or advantageous:

§Window location, window size, window relocating, window resizing, window coverage hierarchies and window coverage geometry information known to the GUI portion of the application can be passed to the TE for proper rendering of the video window;

In an embodiment, a separate Window Monitoring Module may be added to the Server Media Engine to track video window position, size, and visibility and propagate this information using a RMEP protocol to a Window Positioning Module that is part of the Terminal Media Engine. The Windows Positioning Module ensures that video is rendered in the correct location on the remote terminal as determined by the Application GUI running on the terminal server.

Figure 19:
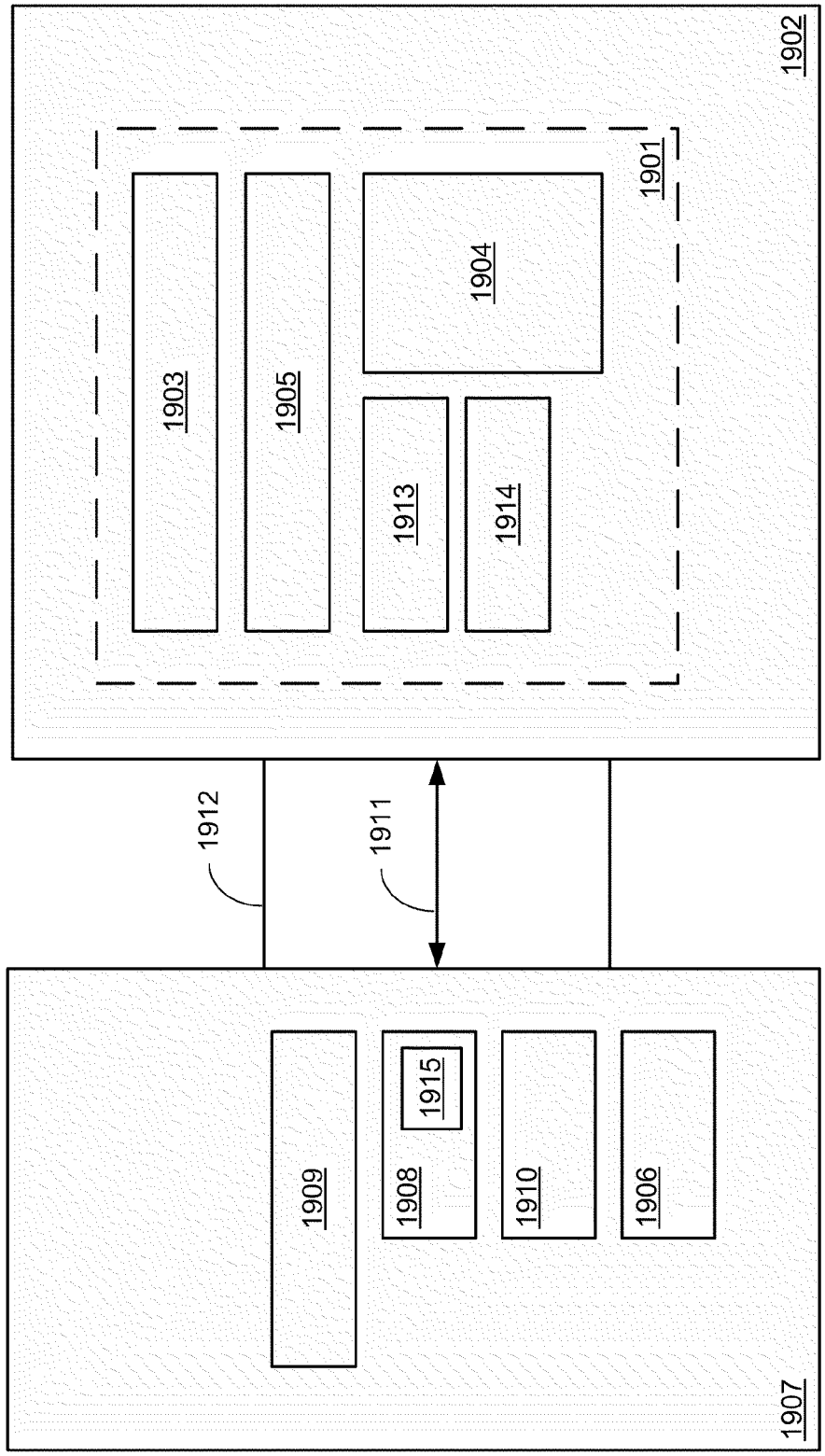
FIG. 19 depicts an exemplary architecture of partitioned media engine modules integrated with Virtual Desktop Infrastructure and using that VDI infrastructure in order to establish a control channel between them.

7. Approaches to Establishing Control Channels Between Partitioned Media Engine Modules FIG. 19 depicts an exemplary architecture of partitioned media engine modules integrated with Virtual Desktop Infrastructure and using that VDI infrastructure in order to establish a control channel between them. In the discussion to follow, the term "Virtual Channel" always implies "carried over the VDI connection;" further, in the context of FIG. 19, it is implied that control data are sent across a Virtual Channel over the VDI connection. Note that FIG. 19 does not depict media channels, only control channels. With these points established, the exemplary architecture depicted in FIG. 19 has the following elements and characteristics:

An audio/video software application 1901 runs on a terminal server 1902. The software application uses VDI server software 5100 to communicate with a VDI client 1909 running on a terminal 1907.

The software application consists of application logic 1903 that accesses a server media engine 1904 using the media engine's interface 1905 (e.g. a COM interface). In this case the local portion of the interface 1905 will be used to access the server media engine 1904.

The software application 1903 uses the same interface 1905 to access a terminal media engine 1906 running on a terminal 1907. In this case, the remote portion of the interface 1905 will be used to access the terminal media engine 1906.

The terminal media engine 1906 is deployed using a plug-in 1908 into the VDI client 1909 running on the terminal 1907. The plug in 1908 accesses the terminal media engine 1906 using the media engine's interface 1910 (e.g. a COM interface). In this case, the remote portion of the interface 1910 is used.

The control channel between the terminal media engine and the server media engine uses a Virtual Channel 1911 through the VDI connection 1912 between the VDI client 1909 and the VDI server. Calls across the remote portion of the server media engine interface 1905 are translated by a proxy module 1913 into protocol messages that are transmitted across the Virtual Channel 1911 using a Virtual Channel driver 1914.

On the terminal 1907, protocol messages are received from the virtual channel 1911 by a virtual channel driver 1915 and translated back into calls across the remote portion of the terminal media interface 1910. These calls are then executed by the terminal media engine 1906.

Conversely, events and/or errors generated by the terminal media engine 1906 are sent across the interface 1910 to the VC driver 1915. This drives translates these events into protocol messages to be sent across the Virtual Channel 1911 and received by the Virtual Channel driver 1914, where they are sent to the proxy module 1913 that translates these protocol messages back into events and/or errors to be sent to the application 1903 across the interface 1905.

Figure 20:
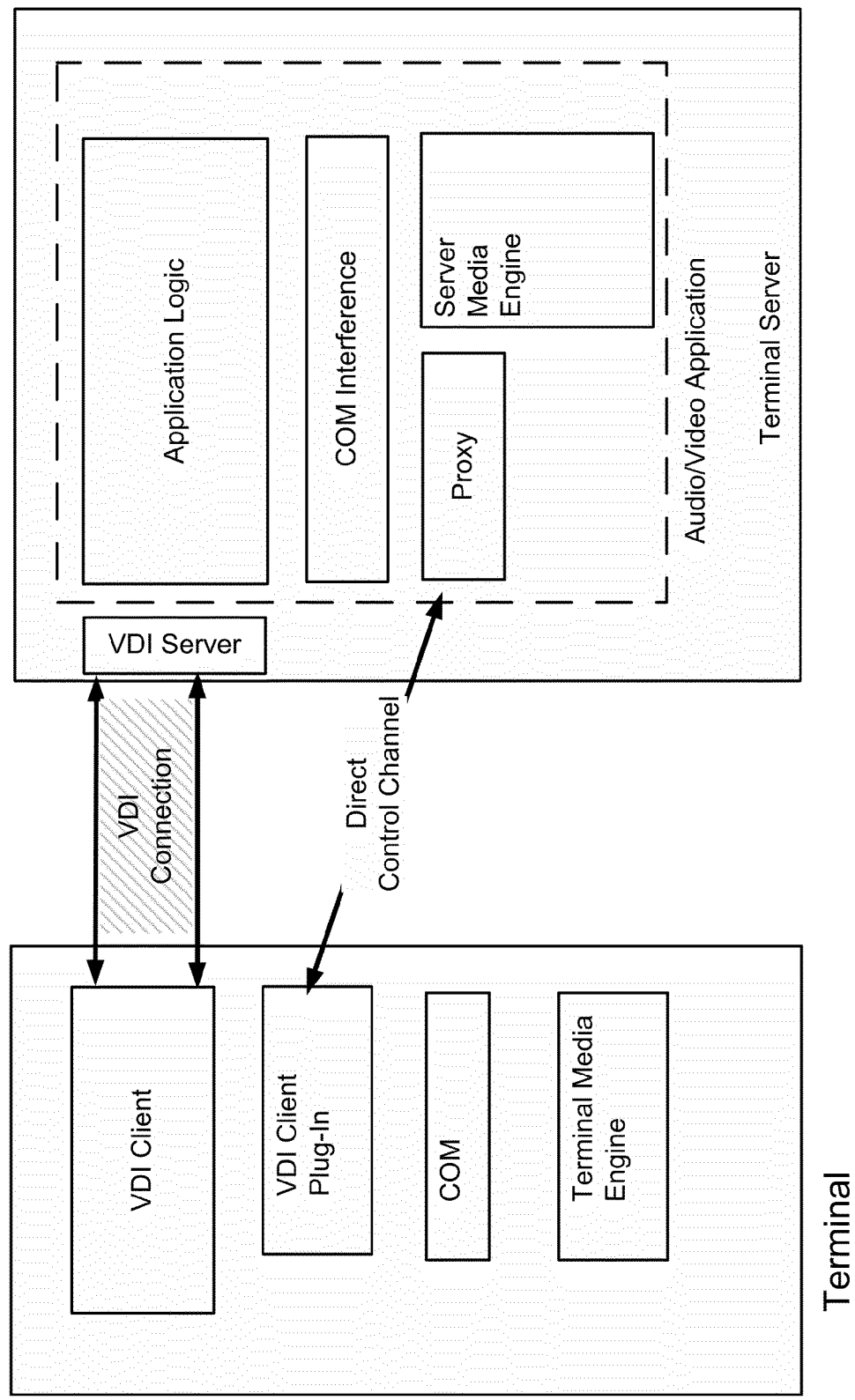
FIG. 20 depicts an alternative exemplary architecture of partitioned media engine modules integrated with Virtual Desktop Infrastructure.

FIG. 20 depicts an alternative exemplary architecture of partitioned media engine modules integrated with Virtual Desktop Infrastructure. This exemplary architecture is very similar to the architecture depicted in FIG. 19 with the following difference: rather than using a Virtual Channel across the VDI connection for establishing a control channel, the Proxy module on the terminal server uses a direct connection (e.g. using TCP) to the VDI client plug-in on the terminal. This architecture is advantageous for VDI technologies that do not have support for virtual channels.

Figure 21:
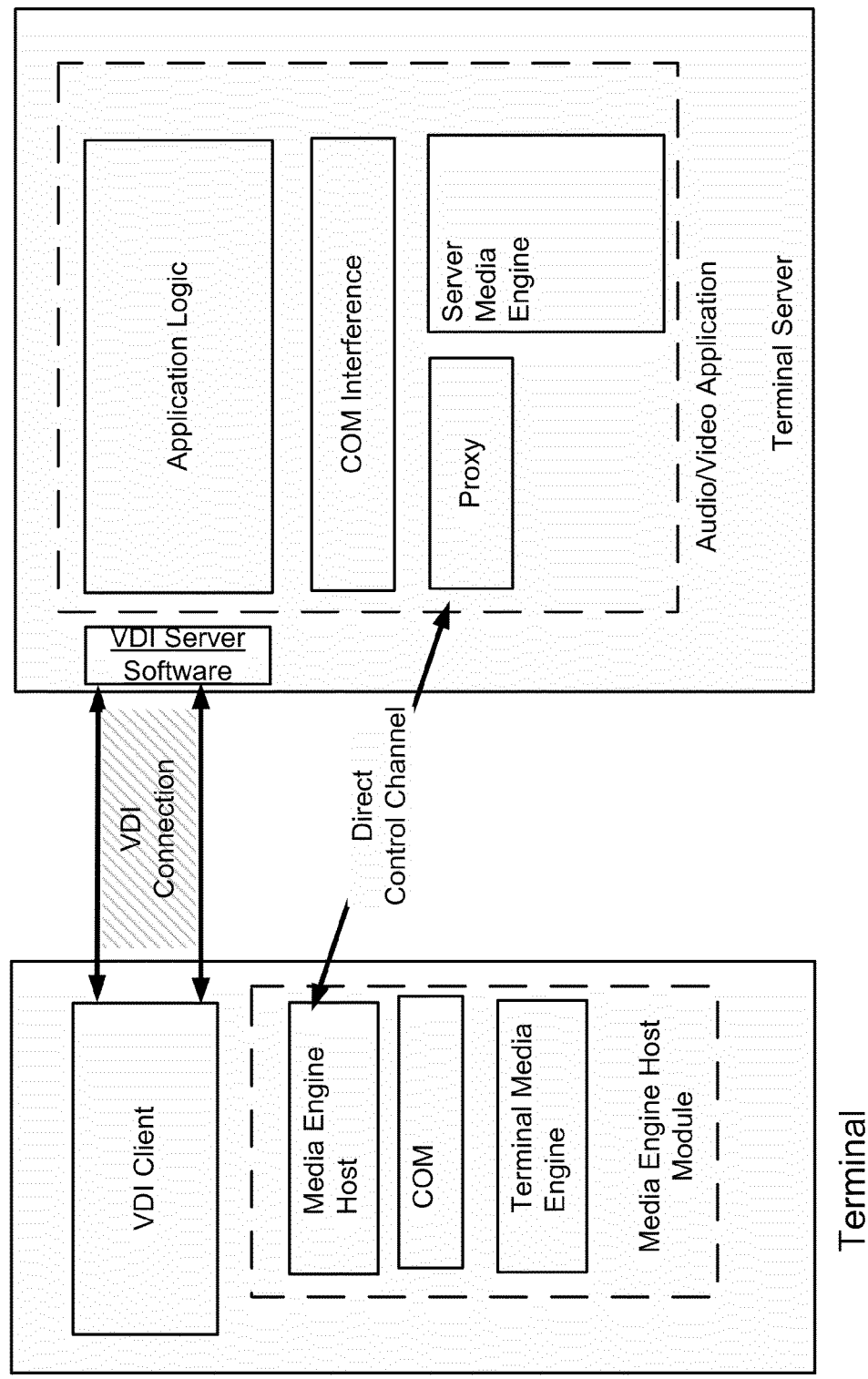
FIG. 21 depicts another exemplary architecture of partitioned media engine modules integrated with Virtual Desktop Infrastructure.

FIG. 21 depicts yet another exemplary architecture of partitioned media engine modules integrated with Virtual Desktop Infrastructure. This exemplary architecture is very similar to the architecture in FIG. 20 with the following difference: rather than deploying the terminal media engine as a plug-in to the VDI client it is deployed as a separate module that runs side-by-side with the VDI client rather than as a plug-in. This architecture is advantageous for VDI technologies that do not support a plug-in architecture for the VDI client. Moreover, this architecture provides separation between the media engine and the VDI client such that the VDI client is protected from any failure of the Media Engine and the Media Engine is protected from any failures of the VDI client.

Figure 22:
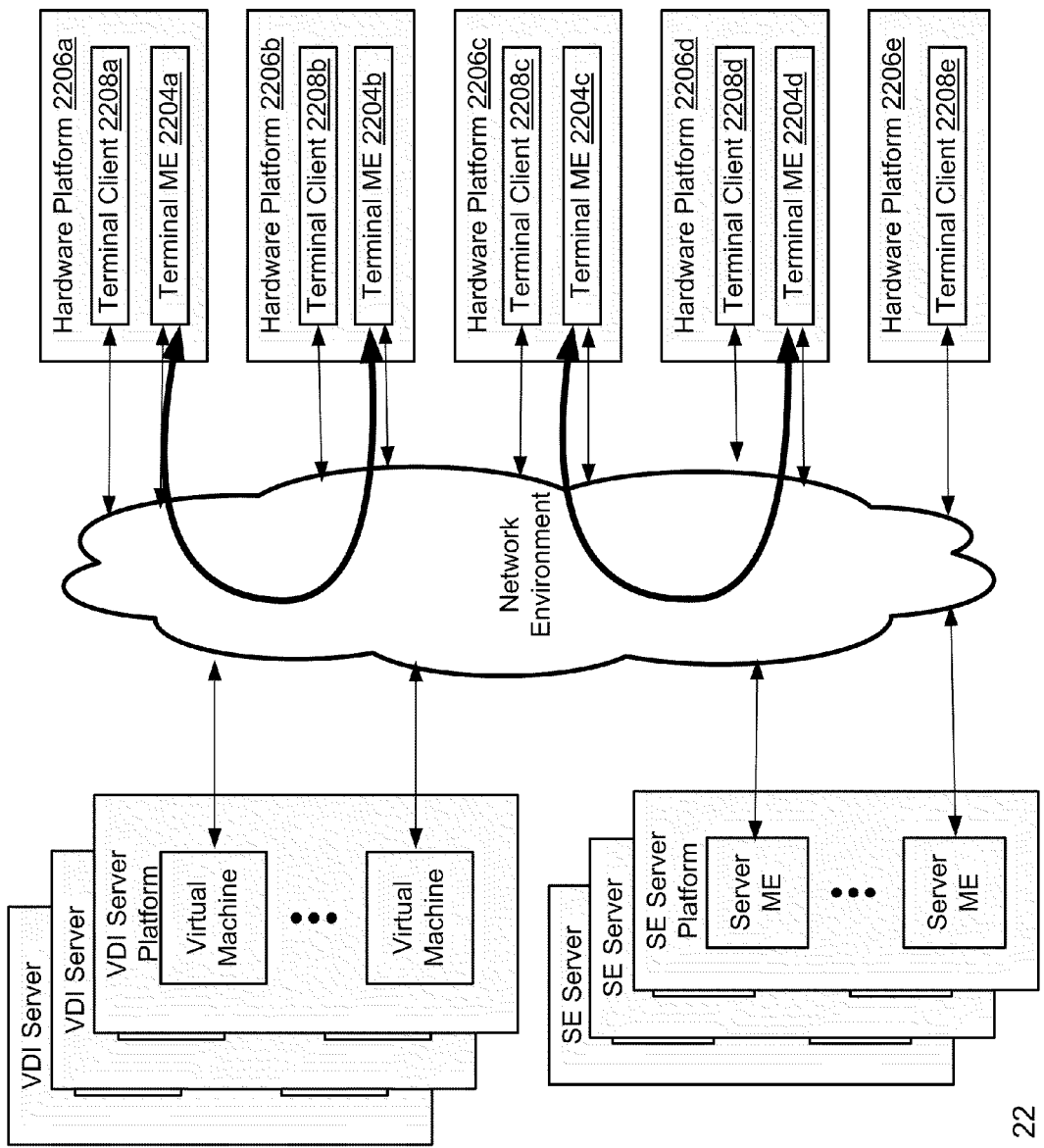
FIG. 22 illustrates an alternative exemplary arrangement similar to that of FIG. 8 but wherein server ME instances do not execute on virtual machines but rather on a special server.

FIG. 22 illustrates an alternative exemplary arrangement similar to that of FIG. 8 but wherein server ME instances do not execute on virtual machines but rather on a special server.

Figure 23:
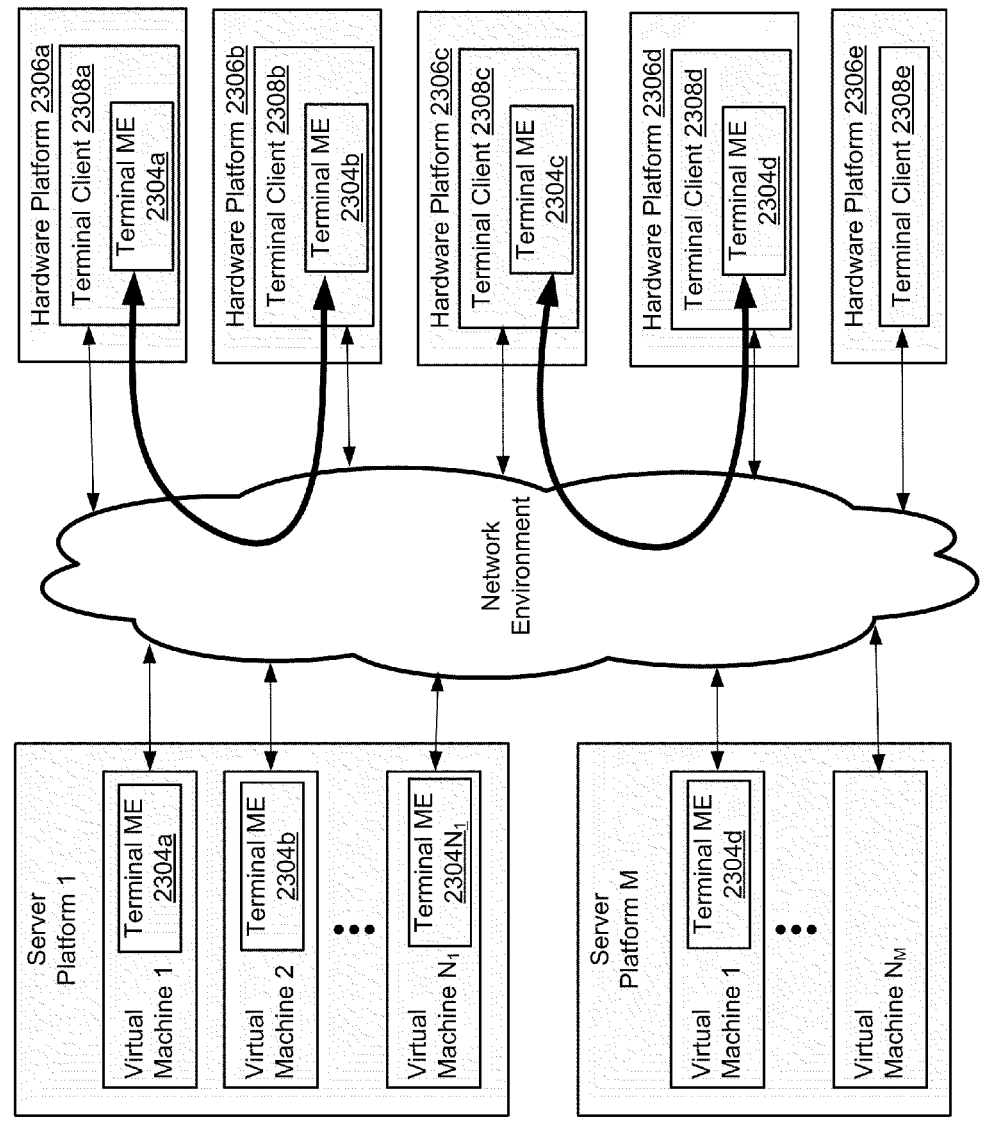
FIG. 23 illustrates another alternative exemplary arrangement similar to that of FIG. 8 but wherein terminal ME instances execute within terminal clients (rather than parallel to them).

FIG. 23 illustrates another alternative exemplary arrangement similar to that of FIG. 8 but wherein terminal ME instances execute within terminal clients (rather than parallel to them).

Figure 24:
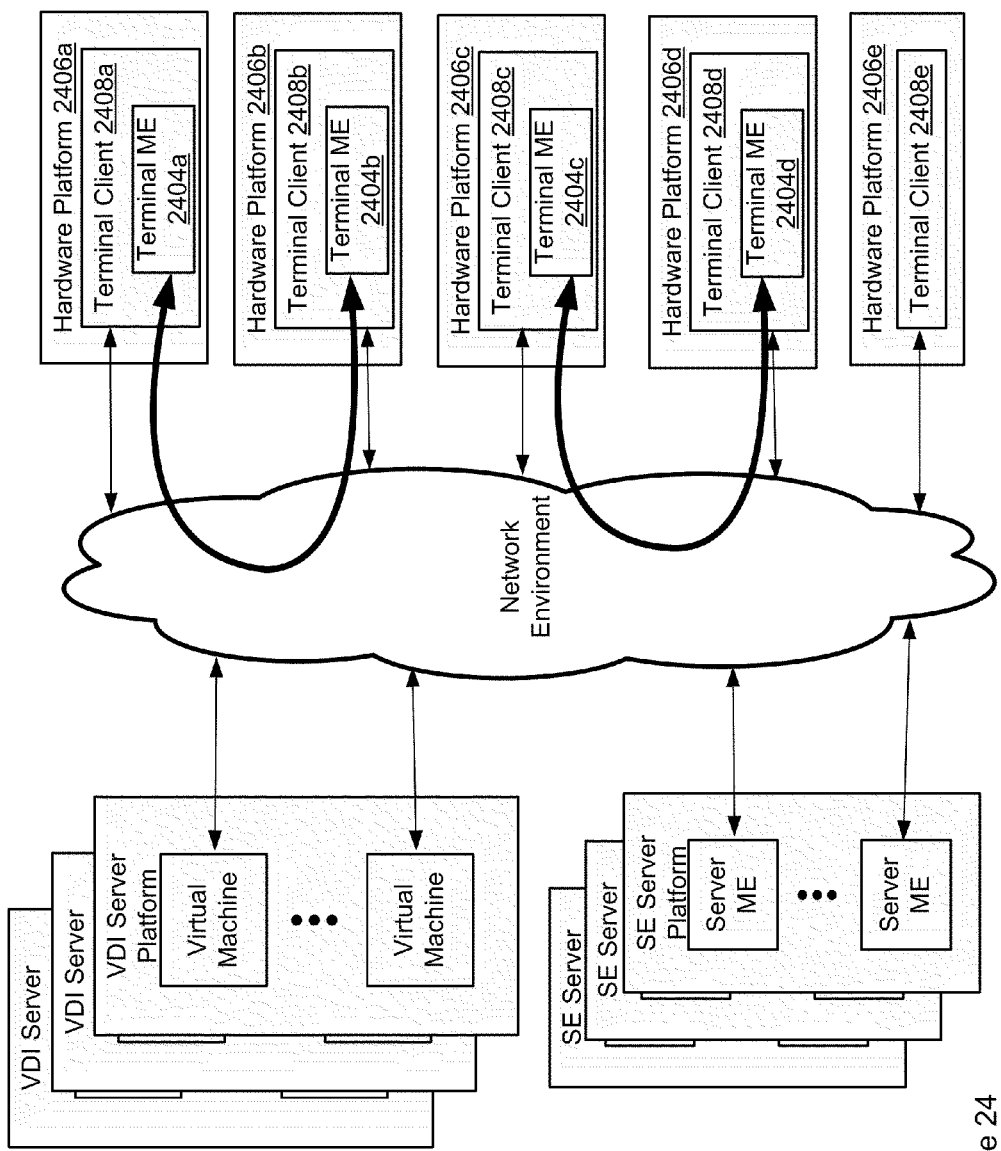
FIG. 24 illustrates yet another alternative exemplary arrangement combining the server side modifications of FIG. 22 and the terminal side modifications of FIG. 23.

FIG. 24 illustrates yet another alternative exemplary arrangement combining the server side modifications of FIG. 22 and the terminal side modifications of FIG. 23.

Figure 25:
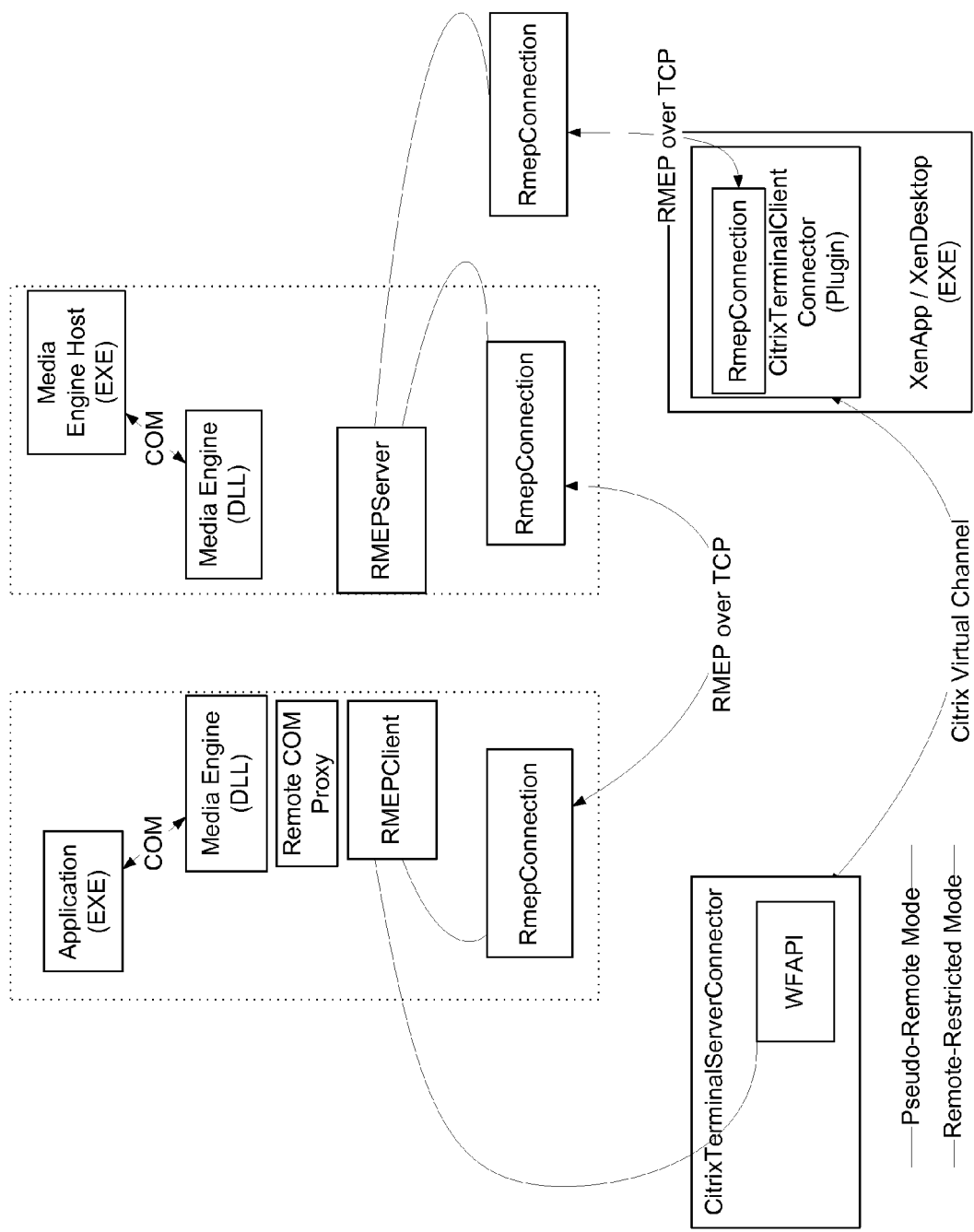
FIG. 25 is a block diagram illustrating an exemplary system architecture for enabling multimedia conferencing in a virtual desktop infrastructure environment.

FIG. 25 shows another exemplary architecture that combines elements from the previous architectures. In this architecture, the Media Engine is deployed as a separate module that runs side-by-side with the VDI client rather than as a plug-in. Rather than using a direct connection between the proxy module and the terminal media engine, a Virtual Channel is established through the VDI connection. This architecture provides separation of the media engine and the VDI client such that the VDI client is protected from any failures of the Media Engine and the Media Engine is protected from any failures of the VDI client. However, this architecture leverages the existing connection between the VDI client and the VDI server, thereby avoiding potential connectivity problems (e.g. introduced by firewalls or routing policies) between non-VDI software modules running on the terminal and the server.

In an embodiment, the remote channel between partitioned media engine modules may comprise the following software modules:

- A Remote Media Engine Protocol implementation library
- A Remote COM Proxy module, implemented as a class library inside Media Engine, will implement the interface proxy functionality for "remote" interfaces, translating between COM method calls and notifications, and RMEP messages, and satisfying property requests out of the local property cache.
- A Terminal Server Connector module, also implemented as one or several class libraries inside Media Engine, will use the APIs provided by remote terminal server software to detect remote terminal sessions, establish connectivity with the code running on the terminal client, and provide the server-side part of the communication channel for RMEP messaging.
- A Terminal Client Connector module may be implemented as separate binaries (DLL), or linked into the Media Engine Host executable (see below). The responsibility of this code would be to provide a link with the terminal client application, receive and process connection requests, activate the Media Engine Host process, and provide the terminal-side part of the RMEP communication channel.
- A Media Engine Host executable (EXE) will provide an isolated process environment for running the client-side Media Engine instance. It will translate RMEP messages into COM calls, and also allow Media Engine to run in a more controlled environment outside and independently of the terminal client process, set process priority, load and unload additional DLLs, etc.

Other variations are possible and are provided for by the invention.

Regarding such exchanges between the GUI portion of the application and the TE, many implementations are possible and some of these are affected by the deployment details and/or provisioning outcomes:

The exemplary partition above with the SE running on the virtual machine will operate on any of the configurations depicted in FIGS. 8 and 23, as well as variations on these and combinations, and these configurations will operate in any one or more of the configurations depicted in FIGS. 2-3, 4a-4b, 5a-5e, 6 as well as any variations upon these and combinations, may, for example, carry this information over the virtual channel depicted in FIG. 17 (or alternative carry this information over another channel distinct from the virtual channel depicted in FIG. 17); and The exemplary partition above with the SE running outside the virtual machine will operate on any of the configurations depicted in FIGS. 22 and 24, as well as variations on these and combinations, and these configurations will operate in any one or more of the configurations depicted in FIGS. 2-3, 4a-4b, 5a-5e, 6 as well as any variations upon these and combinations, may, for example, carry this information over another channel distinct from the virtual channel depicted in FIG. 17.

8. Approaches to Communication Protocol for Partitioned Media Engine Implementations This section describes an exemplary software design for an exemplary Remote Media Engine Protocol (RMEP) that can be used to extend a real-time interactive application comprising a media engine across a VDI connection so that the portion of the media engine (TE) executing on the terminal platform can be controlled and interact with the portion of media engine (SE) executing on the terminal platform and/or the GUI portion and other operational portions of the application.

In several places in this exemplary embodiment will provide aspects and elements particular to collaboration applications (for example, "call"), however these are provided merely an example and are readily omitted or replaced with analogous (for example, "session," query," "calculate," "update," etc.) or alternate operations that may be relevant to other types of applications.

In an exemplary embodiment, RMEP is implemented as a library sitting from the Remote COM Proxy/Media Engine Host layer through the terminal transportation layer. The Remote COM Proxy module implements the interface proxy functionality for remote interfaces. In an embodiment, this "local proxy and remote implementation" functionality may be based on the media engine API. In particular, RMEP will be based on the media engine API, with protocol requests, responses and notifications generally having a one-to-one correspondence with API method calls, return values, and notification events: Using the RMEP client's APIs, the Remote Proxy module translates the COM method calls into RMEP messages for requests, responses and notifications. Each COM method from the Remote COM Proxy has a corresponding RMEP method in the RMEP Client layer;

There will be two notable exceptions to this approach for protocol design:

- RMEP will include the necessary support for connection establishment, initial provisioning and session management. These features are not applicable to the API itself.
- RMEP messages will carry additional data values to ensure efficient, bulk data transmission. For example, messages corresponding to call state events will include the full set of call status variables after the state change. The proxy implementation of RMEP will cache this information and use it to respond to property requests locally, rather than by making a remote protocol call.

The Terminal Server Connector (TSC) and the Terminal Client Connector (TCC) represent the virtual transportation layer. The RMEP message is the data format and is exchanged between the client server modules.

In review of above, the reader is again referred to FIG. 25, which depicts an exemplary block diagram illustrating an exemplary system architecture provided for by the invention for enabling multimedia conferencing in a virtual desktop infrastructure environment.

8.1 Syntax

In an exemplary embodiment, each RMEP frame consists of a header, the payload, and a trailer. In such embodiments, the header and trailer are each represented using ASCII characters and terminated with a CRLF pair (0x0a 0x0d). Between the header and the trailer is the payload, consisting of zero or more bytes. An exemplary ABNF for the frame is:

| | |
|---|---|
| frame | = header payload trailer |
| header | = keyword *attribute CRLF |
| payload | = *OCTET |
| trailer | = *CRLF |
| keyword | = "REQUEST" / "REPLY" / "NOTIFY" / "FAULT" |
| attribute | = "MsgId" COLON request_name / |

```
                    "CSeq" COLON 1 *DIGIT /
                    "PayloadSize" COLON 1 *DIGIT /
                    "ContentType COLON content_type
request_name      = "ICalls_CreateNewCall" / "ICall_Invite" /
                    "ICall_Hangup" /
                    more
content_type      = "json" / "xml"
COLON             = :
more              = {additional data}
```

8.1.1 Frame Header

In an exemplary embodiment, the frame header consists of a keyword followed by a bunch of "name:value" attributes separated by a single space character (decimal code 32, " "). The frame must start with a keyword which is one of "REQUEST", "REPLY", "NOTIFY", "FAULT", otherwise it is considered to be an invalid RMEP message.

In an exemplary embodiment, there are header attributes specifying message id, command sequence number, payload size, payload content type, and framing information. Exemplary header attributes are listed in the table below:

| Attribute Name (ASCII characters) | Value (ASCII characters) | Required |
|---|---|---|
| MsgId | ICalls_CreateNewCall/ICall_Invite ... | Yes |
| CSeq | 1 | Yes (Not apply to NOTIFY) |
| PayloadSize | 32 | Yes |
| ContentType | application/json application/xml | Yes |

Further exemplary features may include:
- When receiving a request message with keyword REQUEST, the system returns a response message with keyword REPLY or an error message with keyword FAULT;
- The MsgId attribute may be a pre-defined request or notification name. (see Section 8.1);
- The CSeq (Command Sequence) attribute may be arranged to be a non-negative integer. A CSeq attribute in a response matches the CSeq in the request;
- There may be no CSeq attribute provided for NOTIFY messages;
- The PayloadSize attribute is a non-negative integer and specifies the number of bytes in the payload;
- The ContentType attribute may be a predefined string such as "application/json" or "application/xml" which specifies the payload message type (for example, payload message type json).
- The last 2 bytes of the header may be the CRLF (0x0d 0x0a).

8.1.2 Frame Payload

In an exemplary embodiment, the ContentType attribute in the header represents the encoding/decoding payload type. The size of the payload is also in the PayloadSize attributes from the header. Either JSON or XML message is supported.

8.1.3 Frame Trailer

In an exemplary embodiment, the frame trailer consists of 0 or more CRLF pairs. In an embodiment, when a received frame comprises characters immediately following the payload that do not correspond to a trailer, it is considered a bad frame.

8.2 Examples

In an exemplary embodiment for a collaboration application, the following example shows an application sending a request to create a new call (note that both header and trailer end with a CRLF pair):

```
Request message:
    REQUEST MsgId:ICalls_CreateNewCalll CSeq:1  PayloadSize:56
    ContentType:application/json
    {RemoteUrl: sip:joe@172.16.11.74,RemoteDisplayName: Joe}
Response message:
    REPLY MsgId:    ICalls_CreateNewCalll    CSeq:1
    PayloadSize:6
    ContentType:application/json
    {S_OK}
```

It is noted, however, that the new call request operation is provided merely an example and are readily omitted or replaced with analogous (for example, "session," query," "calculate," "update," etc.) or alternate operations that may be relevant to other types of applications.

In an exemplary embodiment, the following example is a remote property update containing two frames.

```
NOTIFY      MsgId:PropertyUpdate PayloadSize:120
ContentType:application/xml
<Properties>
    <Call>
        <Count>1</Count>
        <IsNewCallAloowed>true</IsNewCallAllowed>
        <ReasonCode>3</ReasonCode>
    </Call>
    <Networking>
        <State>0</State>
            <ReasonCode>0</ReasonCode>
            <SIPPort>5060</SIPPort>
    </Networking>
<Properties>
```

9. RMEP Client Functionality

This section describes exemplary aspects of RMTP client functionality.

9.1 One-on-One COM Interface Correspondence

RMEP Client provides interfaces based on the Remote Media Engine COM APIs, with protocol requests, responses and notifications. Each method in the Remote COM Proxy has a corresponding RMEP method. Such as the Remote Call Proxy method from ICall "HRESULT Invite( )" has a corresponding mapping method RMEPClient::ICall_Invite( ).

The following lists provide an exemplary collection of RMEP Client methods:

```
Interface: ICALL
    HRESULT ICall_Invite( );
    HRESULT ICall_Answer( );
    HRESULT ICall_Refuse( );
    HRESULT ICall_Hold( );
    HRESULT ICall_Resume( );
    HRESULT ICall_Reinvite( );
```

-continued

```
    HRESULT ICall_Transfer( const std::string& target, const
        std::string& targetDisplayName);
Interface: INetworking
    HRESULT INetworking_SetSIPSettings(const std::string&
        sDisplayName, int sipPort, int sipTransport, int
        maxSIPRequestSizeForUDP);
    HRESULT INetworking_SetSIPUserAgent(const std::string&
sUserAgent);
```

9.2 Caching Remote COM Properties

In an embodiment directed to reduce the overhead of remote protocol call, an exemplary implementation provides for the proxy implementation of the RMEP Client to cache COM properties in those Remote COM Proxies. In an exemplary approach, the RMEP Client layer is responsible for parsing responses and notifications as well as accessing and/or updating the property members of proxy objects. For example if there is a call state change on the remote terminal side, a notification carrying all call properties is received by the RMEP Client and the properties in the RemotCallProxy object are updated.

10. RMEP Connection Establishment Support

In an exemplary embodiment the RMEP provides the necessary support for connection establishment. For Remote Restricted mode (see Section 10.3.2), the RMEP layer passes RMEP message to the underlining connection built by the Terminal Server Connector and the Terminal Client Connector modules. For the Pseudo Remote Mode, a TCP connection is built directly between RMEP Client and Server layer.

10.1 Media Engine Build Version Check

To avoid unnecessary Media Engine build version conflict between the terminal client and terminal server during our internal development, an exemplary embodiment may include a build level and a build number check as part of the connection setup process. For example, the terminal server verifies and matches the build number of the connecting terminal client only if the Terminal Client is a "debug" build (BuildLevel is 'd').

As discussed in greater detail in Section 10.2, a version request is sent first from the terminal server to the terminal client. The terminal client sends back a response containing the supported RMEP Protocol version information as well as the Media Engine build information. When the terminal build level is 'd', then the terminal MediaEngine version matches in all respects viz. we need to compare the MediaEngine's major, minor, patch, level and build. The terminal server bypasses the check if the "Build-Level" is "r" (not "d") and continues the RMEP version negotiation process (see Section 10.2).

As an example, here pertaining to when the terminal server and terminal client are being connected, the terminal server sends a request with its own RMEP protocol version information:

```
REQUEST   MsgId:VersionRequest   CSeq:1   PayloadSize:28
ContentType:application/json
{
    Major: 1,
    Minor: 0
}
```

The terminal client responses with Media Engine build information as well as RMEP protocol information:

```
REPLY   MsgId:   VersionRequest   CSeq:1   PayloadSize:62
ContentType:application/json
{
    MediaEngineVersion: 10.2.99.d.1 [DEBUG]
    Major: 1,
    Minor: 0
}
```

10.2 Protocol Version Negotiation

In an exemplary embodiment a protocol version negotiation is part of the connection setup process. For example, when the RMEP Client and Server are being connected, the RMEP Client first sends a version request with its own version information to the connecting RMEP Server, the RMEP Server either replies its own version or a FAULT response if the version is higher and not supported. The RMEP Client disconnects the connection if the Server's version is too old or uses the lowest version number for the final version.

10.2.1 RMEP Server Version Decision

Figure 26:
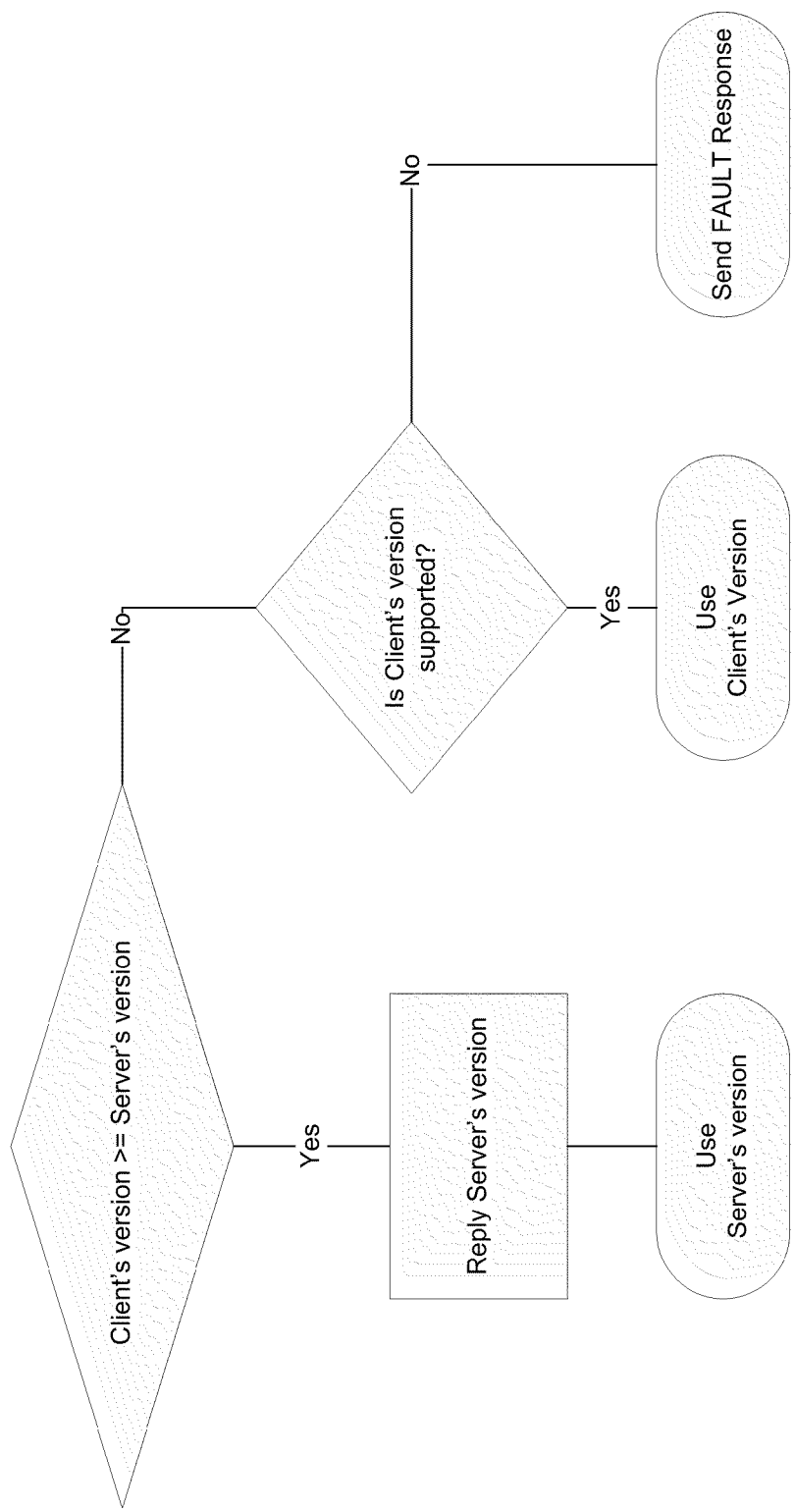
FIG. 26 provides an exemplary block diagram illustrating the RMEP Server version decision tree.

FIG. 26 provides an exemplary block diagram illustrating the RMEP Server version decision tree.

10.2.2 RMEP Client Version Decision

Figure 27:
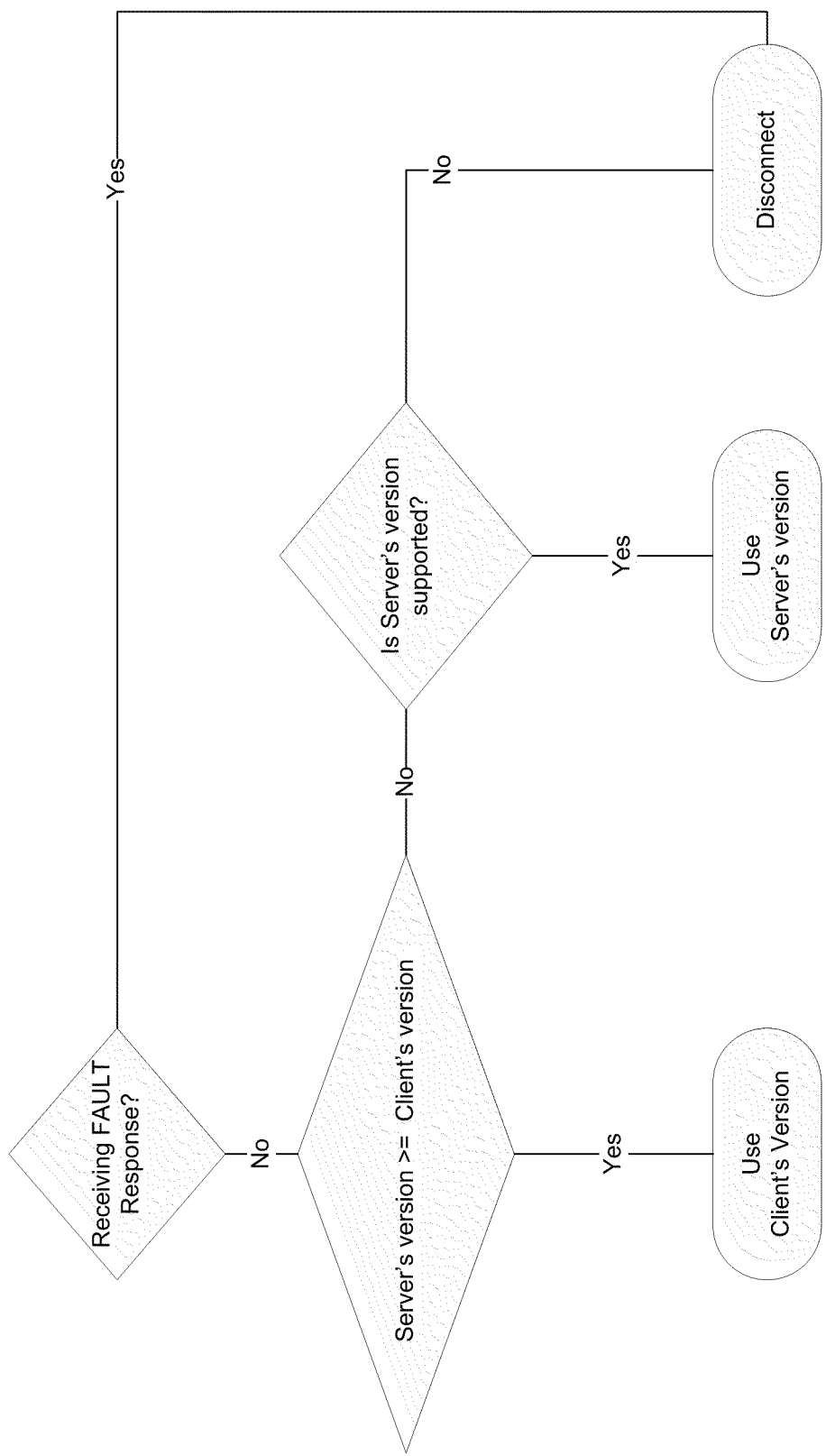
FIG. 27 provides an exemplary block diagram illustrating the RMEP Client version decision tree.

FIG. 27 provides an exemplary block diagram illustrating the RMEP Client version decision tree.

In an exemplary embodiment the RMEP Client and Server modules saves the final version that applies to the connection. Each RMEP version in RMEP Client is associated with a Request Command Set. For example, if the Request Command Set's version is greater than the negotiated version, the whole request set is disabled.

The following example illustrates a case where the final version is 1.0:

```
REQUEST   MsgId:VersionRequest   CSeq:1   PayloadSize:28
ContentType:application/json
{
    Major: 1,
    Minor: 0
}
REPLY   MsgId:   VersionRequest   CSeq:1   PayloadSize:28
ContentType:application/json
{
    MediaEngineVersion: 10.2.99.d.1 [DEBUG]
    Major: 1,
    Minor: 6
}
```

This example illustrates a case where the RMEP Server rejects and disconnects the connection since RMEP server's version is only 1.6.

```
REQUEST   MsgId:VersionRequest   CSeq:1   PayloadSize:28
ContentType:application/json
{
    Major: 2,
    Minor: 0
}
FAULT   MsgId:   VersionRequest   CSeq:1   PayloadSize:27
ContentType:application/json
{Reason: protocol mismatch}
```

10.3 Connection Support

In this section exemplary aspects of connection support are provided.

10.3.1 Static Class Diagram

FIG. 13 illustrates an exemplary class diagram showing an aggregation association between the RMEPClient object and the RMEPConnection object.

10.3.2 Remote Restricted Mode

In an exemplary embodiment operating under the Remote Restricted Mode, the connection is established through TSC and TCC. The RMEP Client creates a TSC object as a connection handler. The TSC layer provides send/receive and callback functions for the RMEP Client through the handler.

In an embodiment, TCC is implemented a separated process.

10.3.3 Pseudo-Remote Mode

In an exemplary embodiment operating the Pseudo Remote Mode, there is no TSC and TCC involved. The RMEP Client spawns the Media Engine Host process on the same machine and also passes the application host and port as command-line parameters using Windows CreateProcess system call. The spawned Media Engine Host application realizes it is under the Pseudo-Remote mode, and the RMEP Server creates a connection to the RMEP Client using the RMEPConnection object as its connection handler for the TCP connection.

10.3.4 Keep Alive Support

In an exemplary embodiment the RMEP Client keeps sending KEEP-ALIVE request to REMP Server. The RMEP Server echoes a response back. For example:

```
REQUEST    MsgId:KEEP-ALIVE    CSeq:67    PayloadSize:0
ContentType:application/json
REPLY      MsgId:KEEP-ALIVE    CSeq:67    PayloadSize:14
ContentType:application/json
{KeepAlive:OK}
```

10.3.5 Threading

In an exemplary embodiment the RMEP server uses the same dispatcher thread which is used for receiving requests to notify Media Engine Host for the request processing. The Media Engine Host needs to return the dispatcher as soon as possible (no blocking is allowed).

11. RMEP Transactions

In an exemplary embodiment the RMEP Client maintains a list of ongoing transactions to track the status of each sending request and receiving response, and the RMEP Server keeps a list incoming transactions for processing requests. The transaction layer of RMEP reports any problem regarding to the underneath connection, missing response or timeout related events.

11.1 Class Diagram

FIG. 14 illustrates an exemplary class diagram showing the RMEP Client maintaining a list of ongoing transactions to track the status of each sending request and receiving response, and the RMEP server keeping a list of incoming transactions.

11.2 Transaction State

In an exemplary embodiment the states for RMEP Client transaction may be defined and arranged as listed below:

IDLE->TRYING->COMPLETED
IDLE: Initial state.
TRYING: The transaction starts.
COMPLETED: Received the response.

In an exemplary embodiment the states for a RMEP Server transaction may be defined and arranged as listed below:

IDLE -> TRYING->COMPLETED
IDLE: Initial state.
TRYING: The transaction starts.
COMPLETED: Transmitted the final response.

11.3 Transaction Call Backs

In an exemplary embodiment the RMEP parser parses the receiving RMEP message and creates an either RMEP Client or Server transaction. The RMEP MsgID and CSeq attributes are the key matching a new or existing transaction.

In an exemplary embodiment OnRequest( ) and OnResponse( ) is provided for following (an) event processing step(s).

In an exemplary embodiment error handling callbacks such as OnTimeout, OnDisconnected( ) may also be provided.

12. Approaches to Deploying Two-Component Partitioned Media Engines

Figure 28:
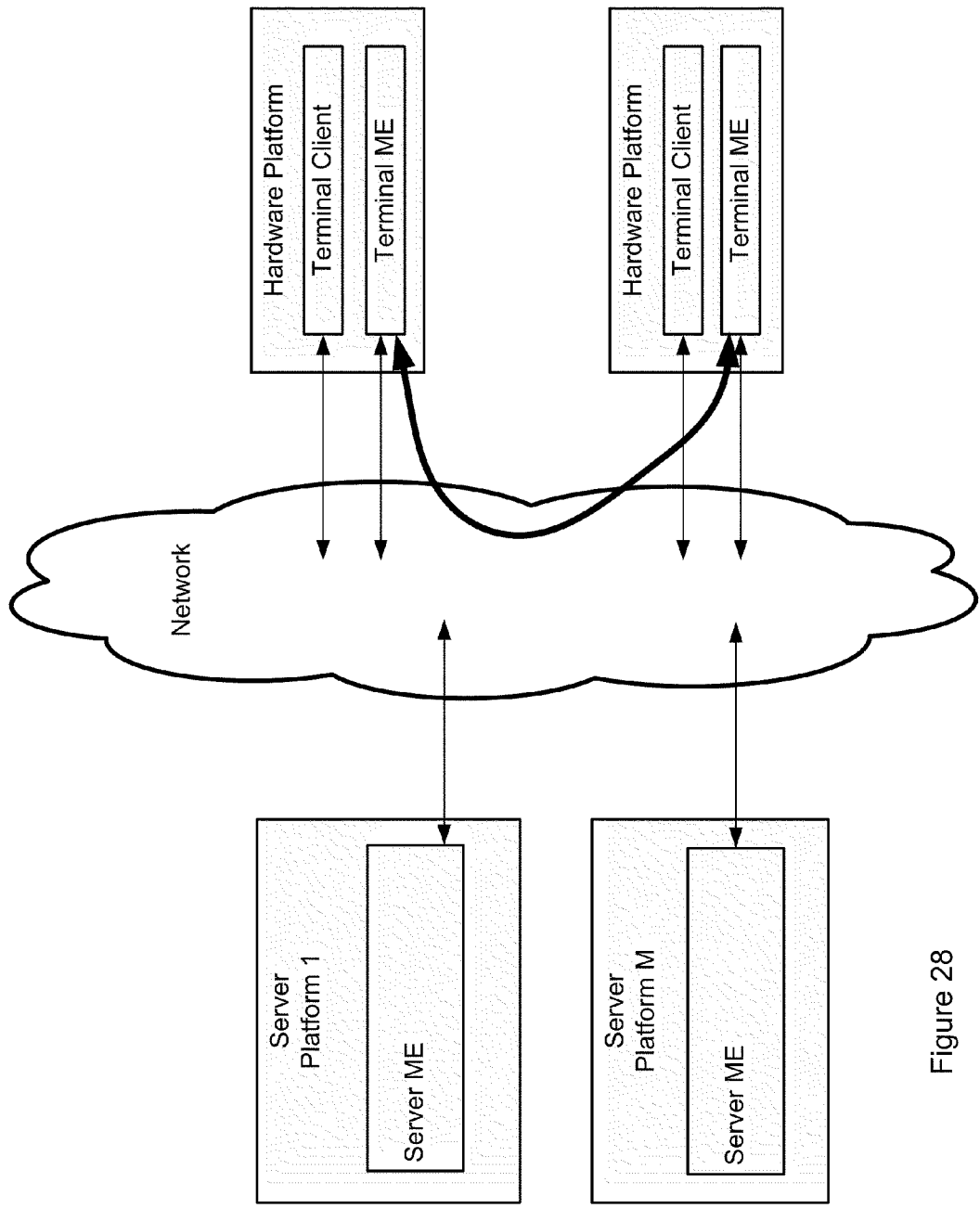
FIG. 28 illustrates an alternative embodiment similar to that of FIG. 8 but wherein each server ME instance runs on a dedicated server rather than on a virtual machine in the server.

Attention is now directed to exemplary approaches to deploying two-component partitioned media engines, beginning with a review of the previously presented exemplary arrangements depicted in FIGS. 8 and 22-24, and another example alternative embodiment depicted in FIG. 28.

FIG. 8 illustrates an exemplary deployment of a two-component partitioned media engine wherein each server ME instance runs in a virtual machine on the server platform. Each server ME instance is coupled with a terminal ME instance executing on the corresponding terminal platform but not within the terminal client session.

FIG. 22 illustrates an alternative exemplary arrangement similar to that of FIG. 8 but wherein server ME instances do not execute on virtual machines but rather on a special server.

FIG. 23 illustrates another alternative exemplary arrangement similar to that of FIG. 8 but wherein terminal ME instances execute within terminal clients (rather than parallel to them).

FIG. 24 illustrates yet another alternative exemplary arrangement combining the server side modifications of FIG. 22 and the terminal side modifications of FIG. 23.

FIG. 28 illustrates an alternative embodiment similar to that of FIG. 8 but wherein each server ME instance runs on a dedicated server rather than on a virtual machine in the server.

Various embodiment of the inventive concept provide for additional variations that are possible as would be apparent to persons of skilled in the art. These are provided for by the invention.

Various embodiment of the inventive concept further provide for two or more the various exemplary embodiments depicted in FIGS. 8 and 22-24, as well as any variations on them, to be implemented in co-existing combination. These are provided for by the invention.

Various embodiment of the inventive concept further provide for two or more the various exemplary embodiments depicted in FIGS. 8 and 22-24, as well as any variations on them, to be implemented in interworking combination. These are provided for by the invention.

Various embodiment of the inventive concept further provide for any of the arrangements of FIGS. 8 and 22-24, as well as any variations on them, to be implemented in any one or more of the configurations depicted in FIGS. 2-3, 4a-4b, 5a-5e, 6 as well as any variations upon these and combinations. These are provided for by the invention.

It is explicitly noted that the exemplary partition above with the SE running on the virtual machine will operate on any of the configurations depicted in FIGS. 8 and 23, as well as variations on these and combinations, and these configurations will operate in any one or more of the configurations depicted in FIGS. 2-3, 4a-4b, 5a-5e, 6 as well as any variations upon these and combinations. The full range of these many possibilities and there natural extensions are anticipated and provided for by the invention.

Additionally, it is explicitly noted the exemplary partition above with the SE running outside the virtual machine will operate on any of the configurations depicted in FIGS. 22 and 24, as well as variations on these and combinations, and these configurations will operate in any one or more of the configurations depicted in FIGS. 2-3, 4a-4b, 5a-5e, 6 as well as any variations upon these and combinations. The full range of these many possibilities and there natural extensions are anticipated and provided for by the invention.

13. Exemplary Implementations

This section provides examples showing how the present invention can address the challenges of delivering real-time media interactive collaboration applications in stand alone as well as an extremely wide range of VDI and VAI arrangements that are easily administered. In general the examples are based on the following concepts:

- A Media Engine is implemented with auto-dividing capabilities such as those described in Section 14;
- As possible, the software may be implemented so as to additionally auto-configure lower-level details responsive to the terminal platform it is executing on;
- When in stand-alone mode (i.e., in an environment such as FIG. 1), a single instance of the Media Engine;
- When in VDI/VIA mode (i.e., in an environment such as FIG. 2 and the many variations subsequently discussed):
  - The real-time high-bandwidth high-CPU-usage components of the Media Engine may be deployed in a Media Engine instance on the remote terminal device (rather than executing on a VDI server);
  - A protocol, such as the exemplary Remote Media Engine Protocol (RMEP) described in Section 11, extends the Media Engine interface across a VDI connection and allows terminal-side instance of the Media Engine to be controlled remotely by the application across a VDI channel.

In one or more embodiments of the invention, there may be multiple implementations of the Terminal Server Connector and Terminal Client Connector modules for example, different versions for CITRIX®, HP®, and "pseudo-remote" modes of operation. Various degrees of specific remote terminal platform functionality may be encapsulated in these modules as advantageous and/or as possible.

In one or more embodiments of the invention, an exemplary Media Engine embodiment may comprise two modes, "Auto" and "Restricted" based on two different COM ClassIDs. In such an embodiment:

- the Media Engine Host application running on the Terminal Client always starts the MediaEngine in the "Restricted" mode, which has restricted media engine functionalities like lack of Address Book, Call Logging etc; and
- the Media Engine started in "Auto" mode will detect the mode automatically which could be local, pseudo-remote, CITRIX® or HP®. We will use a Deployment-Mode registry key to specify if Media Engine needs to run in pseudo-remote mode, which will be used for testing the Remote Terminal internally.

[HKEY_CURRENT_USER\Software\Avistar\MediaEngine]
"DeploymentMode"="remote"

In one or more embodiments of the invention, CITRIX® or HP® sessions may be identified via detection by their respective APIs. In such an embodiment, the Media Engine may run in local mode if it cannot detect a pseudo-remote, CITRIX® or HP® mode.

In one or more embodiments of the invention, the CITRIX® Terminal Client Connector may be realized as a Virtual Channel Driver DLL. In an exemplary embodiment, the "pseudo-remote" TCC will be linked into the Media Engine Host executable.

Figure 29:
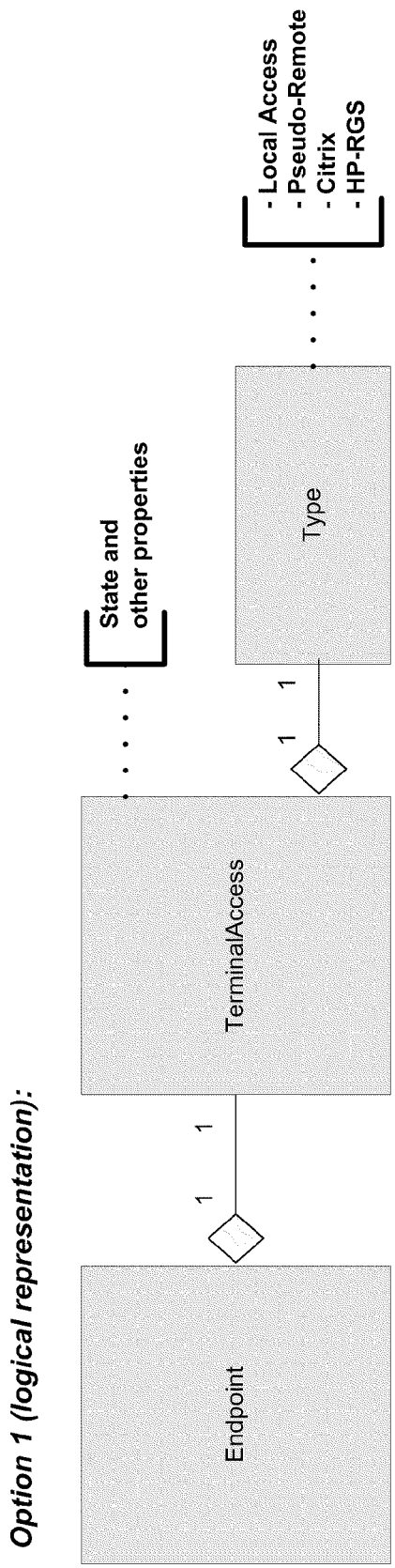
FIG. 29 depicts an exemplary logical representation of terminal access type handling as provided for by the invention.
Figure 30:
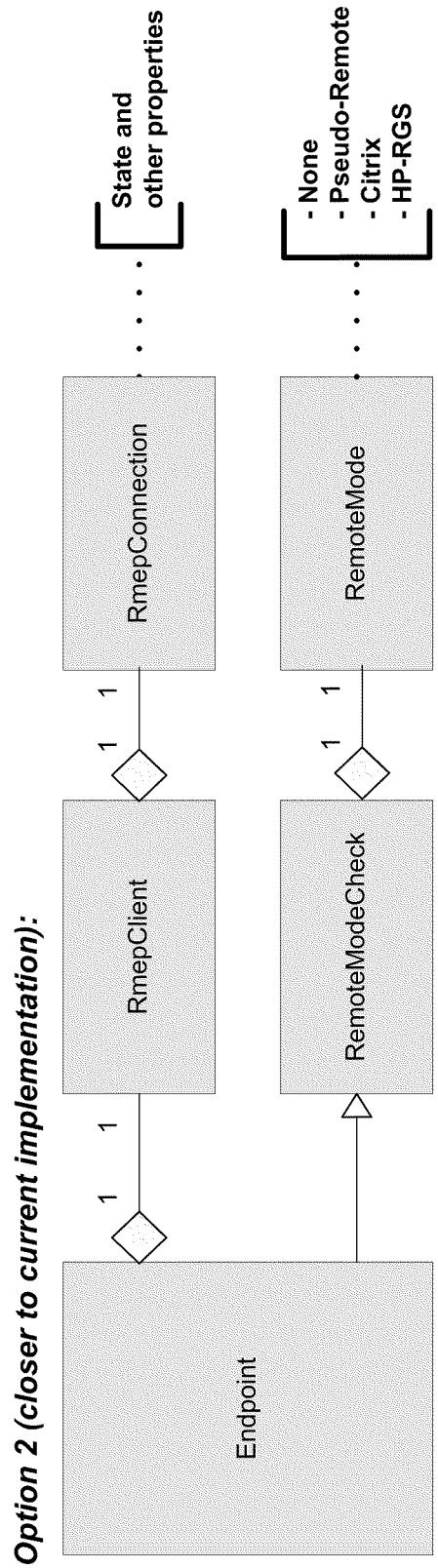
FIG. 30 depicts an exemplary implementation of terminal access type handling as provided for by the invention.

In one or more embodiments of the invention, the Terminal Server Connector code should be written to use dynamic rather than static linkage to terminal server API functions. This will allow a single Media Engine binary to work on all systems, whether or not they have the terminal server libraries installed or accessible. FIG. 29 depicts an exemplary logical representation of terminal access type handling as provided for by the invention. FIG. 30 depicts an exemplary implementation of terminal access type handling as provided for by the invention.

Figure 31:
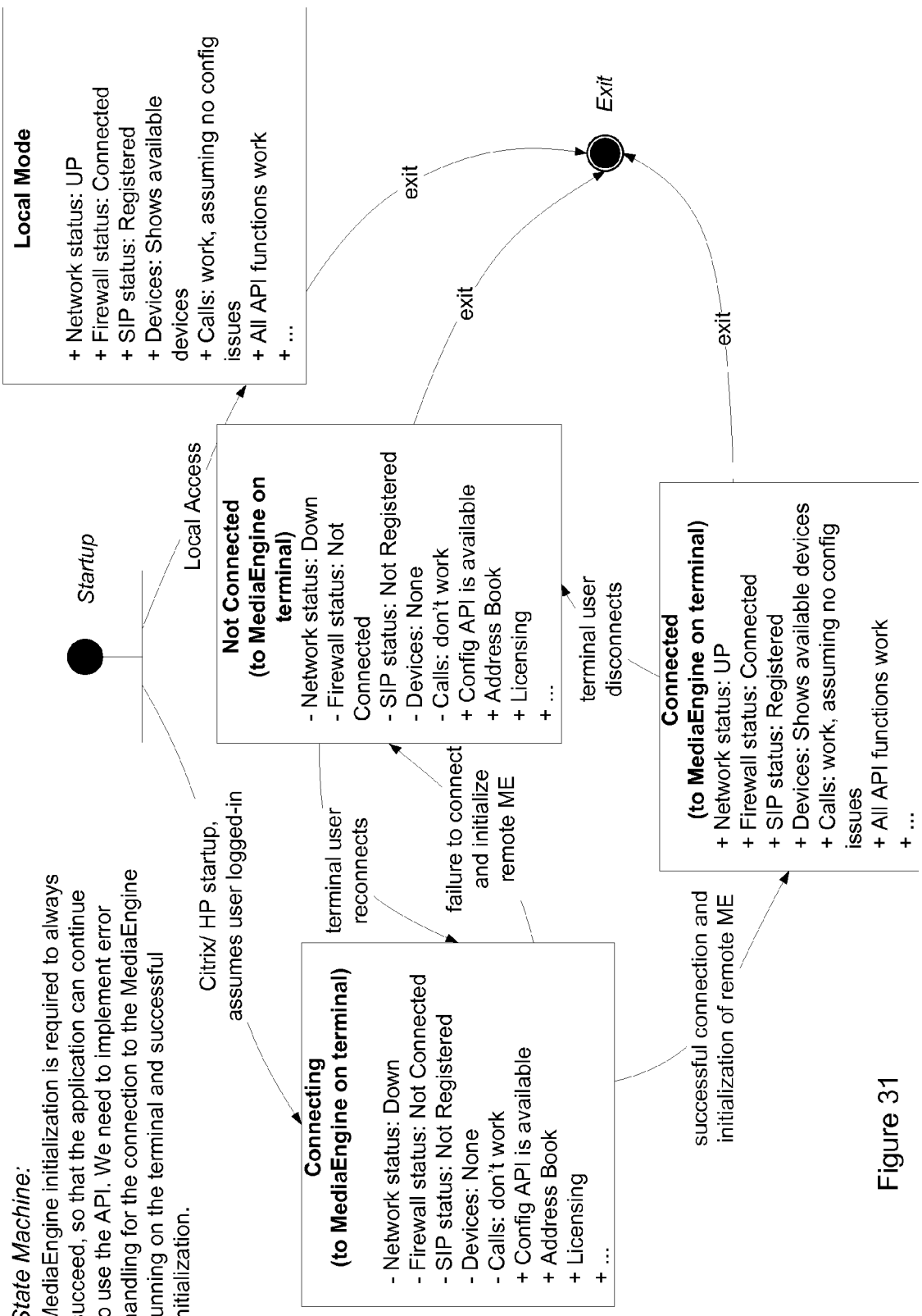
FIG. 31 depicts exemplary media engine initialization handling as provided for by the invention.

FIG. 31 depicts exemplary media engine initialization handling in accordance with one embodiment. For example, in an embodiment, initializing a media engine instance in proxy mode will result in also initializing the C3 Media Engine running on a terminal client. This remote initialization scenario introduces a number of failure conditions that could to be reported through the user interface. As an example, in the event the remote ICA Client does not have a media engine installed, an error must be reported which can be processed by initializing the application to present an error message to the user along with any other implementation desired to track the condition such as logging the event to a file.

Figure 32:
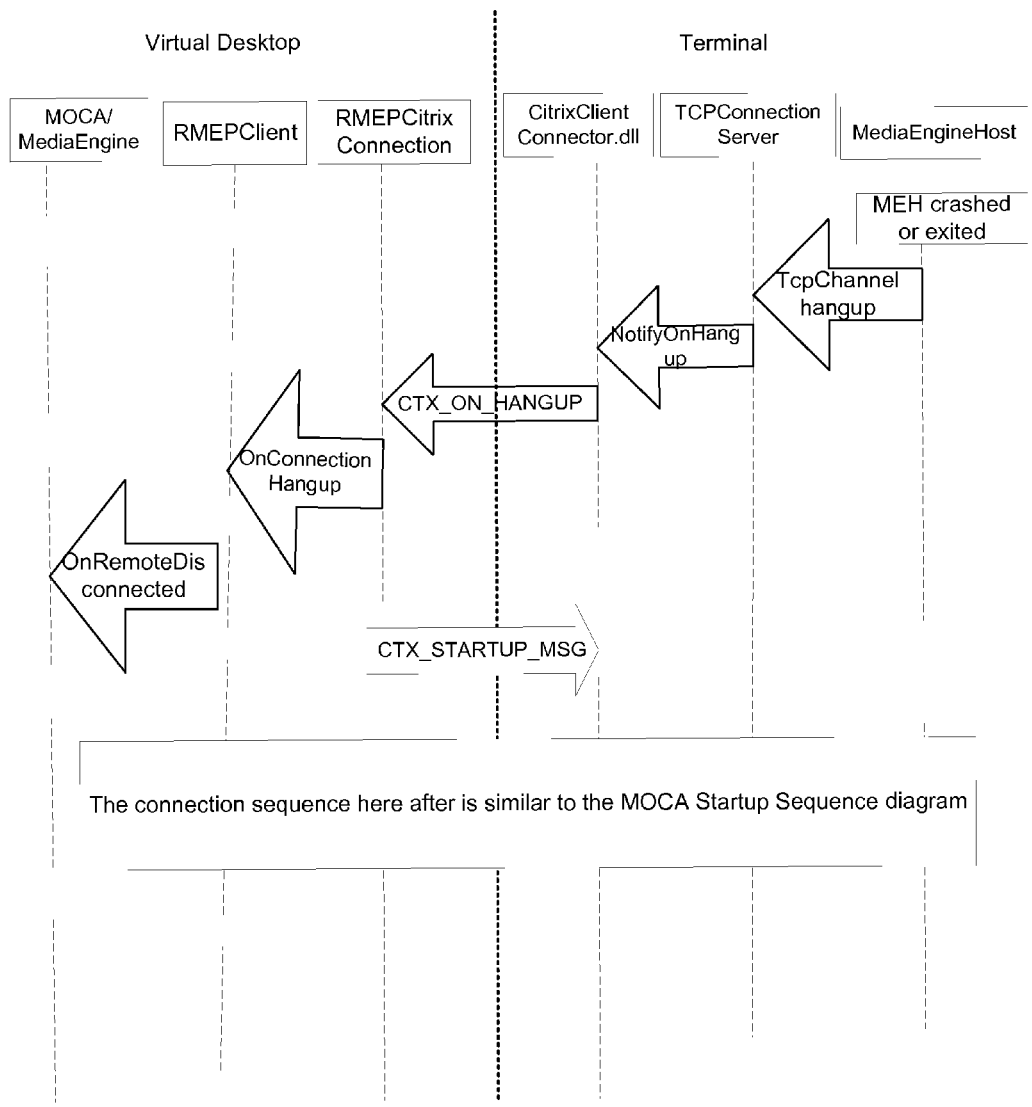
FIG. 32 depicts an exemplary media engine auto-recovery sequence as provided for by the invention.

FIG. 32 depicts an exemplary media engine auto-recovery sequence as provided for by the invention.

Using this general framework or variations upon it, exemplary embodiments of the invention directed to the following vendor VDI and VAI offerings are considered:

CITRIX®
HP®
WYSE® "thin client" terminals
MICROSOFT® OCS

These discussions are provided below.

13.1 CITRIX®

The following nomenclature is introduced for discussing exemplary implementations software embodiments on servers:

Parent Application: the application that needs to run on CITRIX®. In an exemplary embodiment, the same Parent Application software will support both VDI and fat client deployments.

Media Engine in Proxy Mode: In an embodiment, this is the Media Engine extended with a "proxy" mode that allows it to send requests to a remote instance of Media Engine across the ICA channel. In an embodiment, the resulting arrangement implements the server-side of the RMEP protocol.

The following nomenclature is introduced for discussing exemplary implementations software embodiments on remote terminals:

Media Engine Host: In an embodiment, this is the executable that hosts C3 Media Engine on the remote terminal. It is responsible for instantiating the C3 Media Engine COM object and it waits for connections from the AVISTAR® CITRIX® Client Plug-In. Media Engine Host also implements the client-side portion of the Remote Media Engine Protocol.

Media Engine for Terminals: In an embodiment, is a Media Engine optimized for thin terminals which typically have lower CPU capabilities than traditional PCs.

ICA Client Plug-In: In an embodiment, this is software that plugs into the ICA client software and creates a Virtual Channel across the ICA protocol. This virtual channel is used to relay messages between the Media Engine Host and the Parent Application running on the CITRIX® server.

These can be used to construct exemplary embodiment architectures wherein a remote terminal Media Engine plugs into application software running on the server using the same interfaces as those of the standard Media Engine, but all interface requests are relayed to the client-based Media Engine module using a connection manager protocol such as the CITRIX® ICA protocol:

In one or more embodiments of the invention, the remote terminal Media Engine transmits compressed video directly from the user terminal and avoids sending uncompressed video over the network. This makes the solution work in WAN environments and allows scaled deployments in LAN environments.

In an embodiment, the remote terminal Media Engine routes audio/video directly between clients over UDP and bypasses TCP-based VDI protocols entirely, thereby allowing voice and video traffic to take advantage of underlying QoS infrastructure.

In an embodiment, the remote terminal Media Engine relegates audio/video compression and decompression from the CITRIX® server to the user device, thereby significantly increasing the scalability of the solution.

In one or more embodiments of the invention, all functionality related to managing collaboration application calls and associated media streams are deployed on the terminal while non media-related functionality execute on the CITRIX® server to preserve the benefits of centralized application delivery. For example, the address book of a collaboration application can, in an embodiment, be implemented as a standalone piece of code that should run on the server rather than on the desktop.

Figure 33:
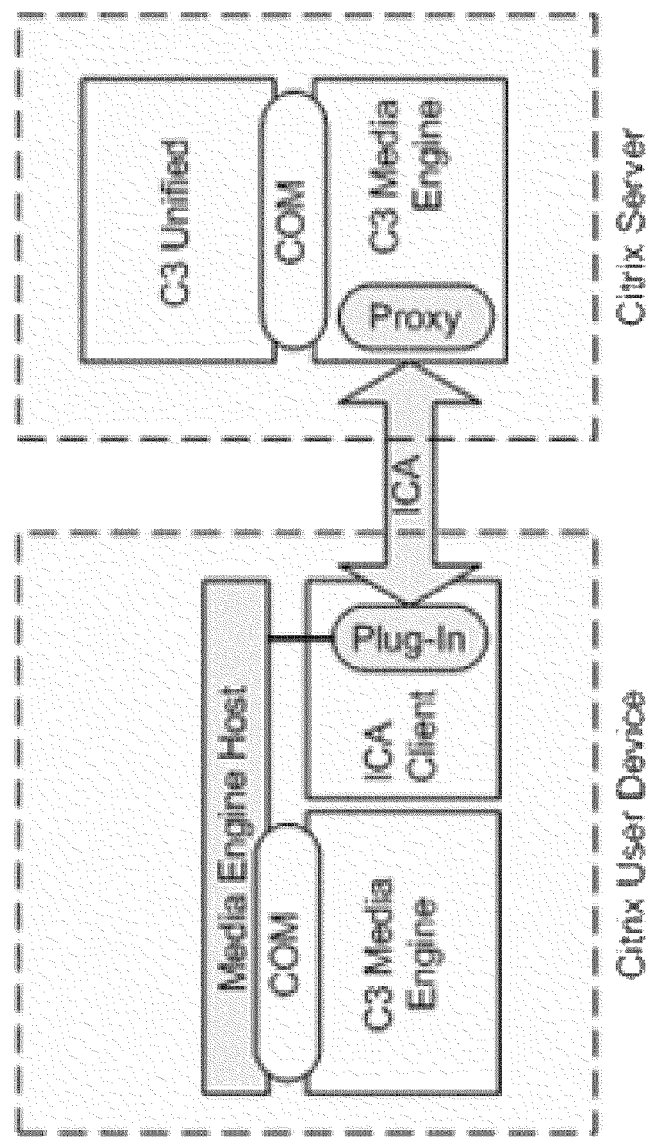
FIG. 33 depicts a general exemplary arrangement delivering the solutions provided by the invention to CITRIX® environments.

FIG. 33 shows a general exemplary arrangement delivering the solutions provided by the invention to CITRIX® environments. More specifically, CITRIX® provides a broad variety of mechanisms for delivering applications and desktops. These mechanisms are largely based on two product approaches:

XenApp
XenDesktop

13.1.1 XenApp Deployments

With XenApp, users use ICA client software to connect to a XenApp server running on WINDOWS® Server 2003 or WINDOWS® Server 2008 to access applications on that server or the entire server desktop. Leveraging Terminal Services (on WINDOWS® 2003) or Remote Desktop Services (on Windows 2008), XenApp allows different users to connect to the same server at the same time. In a typical deployment, a single XenApp server can support up to 500 users. CITRIX® typically refers to XenApp-based deployments as Hosted Shared Apps or Hosted Shared Desktops.

13.1.1.1 Hosted Shared Apps

Single XenApp Server

Figure 34:
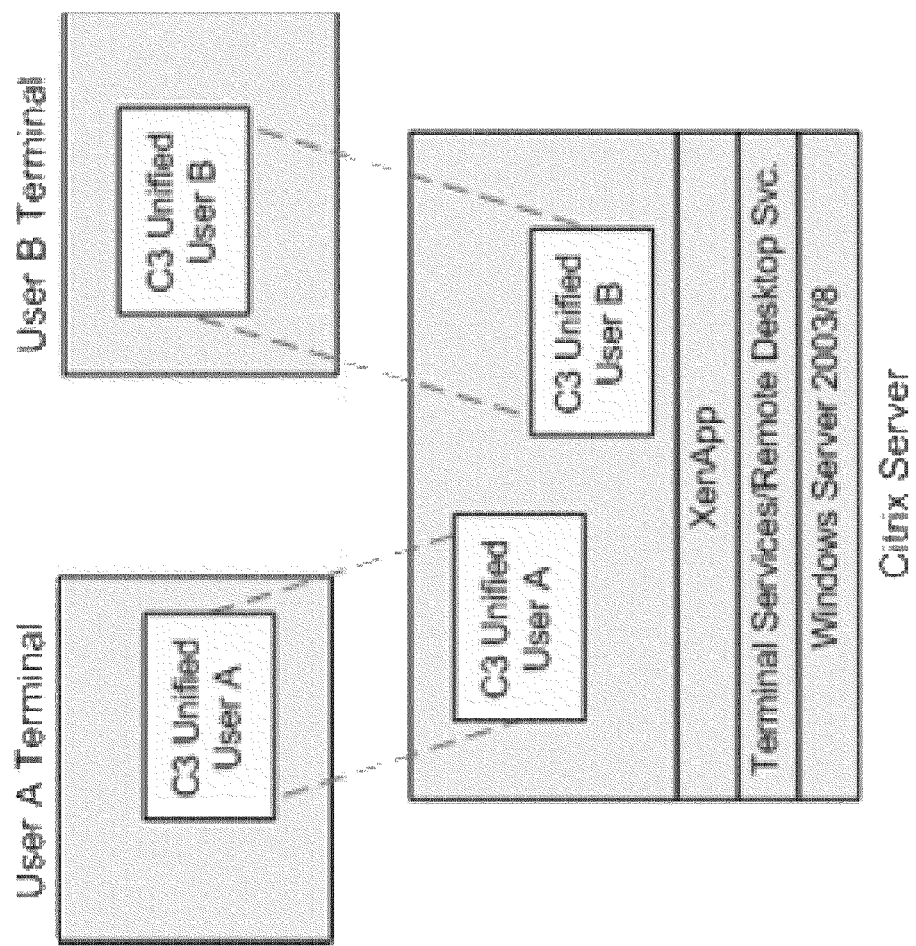
FIG. 34 depicts a representation of an exemplary CITRIX® XenApp deployment wherein all users in a connect to the same XenApp server.

This is the simplest scenario. Here all users in a XenApp deployment connect to the same XenApp server, as shown in FIG. 34. XenApp deployments create a number of potential implications. As stated before, all users connected to a XenApp server share the same underlying server. As a result, multiple users may run the same application on that server at the same time. In order to support XenApp, applications must be designed to support running multiple instances of that application on the same machine at the same time. Potential areas of concern related to this architecture and addressed by the invention include the following:

Port conflicts: multiple application instances trying to use the same IP ports;
Access to registry: multiple application instances sharing the same registry hive;
Access to configuration files: multiple application instances sharing the same configuration files;
Access to COM objects: multiple application instances instantiating the same COM objects;
Access to data files: multiple application instances accessing the same data files;
Access to log files: multiple application instances writing to the same log files.

13.1.1.2 Hosted Shared Desktops

Single XenApp Server

From a deployment point-of-view, this scenario is almost identical to the Hosted Shared Apps scenario, except that the entire server desktop is accessed rather than individual applications. This results in a user experience that is similar to XenDesktop (described later) although the desktop is shared with other users (hence the term Hosted Shared Desktops) rather than dedicated to a specific user.

13.1.1.3 Hosted Shared Apps and Desktops

Multiple XenApp Servers

Since a typical XenApp server supports about 500 users, scaled deployments require multiple XenApp servers. CITRIX® organizes XenApp servers in a server farm. Load balancing infrastructure is used to distribute the users among the set of available XenApp servers in a farm. Note that in a typical deployment, XenApp servers are virtualized.

Deploying multiple servers introduces a number of issues, since there is no guarantee that a user will connect to the same server every single time. To ensure that users have an identical experience independent of which XenApp server they connect to, all XenApp servers must have identical software images (i.e. they must run the same OS, have the same applications installed, have identical configuration information, etc.)

To avoid the management hassles associated with trying to maintain identical software images on different machines, CITRIX® allows servers to boot from virtual disks (vDisk) provided by a Provisioning Server (PVS) across the network. Multiple XenApp servers can boot from the same vDisk which ensures identical images for those servers. Provisioning Server provides tools that allow administrators to create and manage vDisks. The vDisks can be configured in three different modes:

Standard vDisks are effectively read-only: all server writes to vDisk are stored in a unique local change file (the write cache) that is destroyed upon each server reboot.

Private vDisks support read/write operation: each server has a dedicated vDisk image configured in a read/write fashion. All changes to the vDisk are propagated back to the Provisioning Server and become part of the vDisk image. This makes it impossible to share vDisks between different servers, eliminating most of the benefits of vDisks.

Differential vDisks are a hybrid of standard and private vDisks: each server stores vDisk writes into a unique local change file that survives server reboots, allowing servers to keep configuration changes. However, these changes are discarded whenever the base vDisk is modified on the Provisioning Server.

Figure 35:
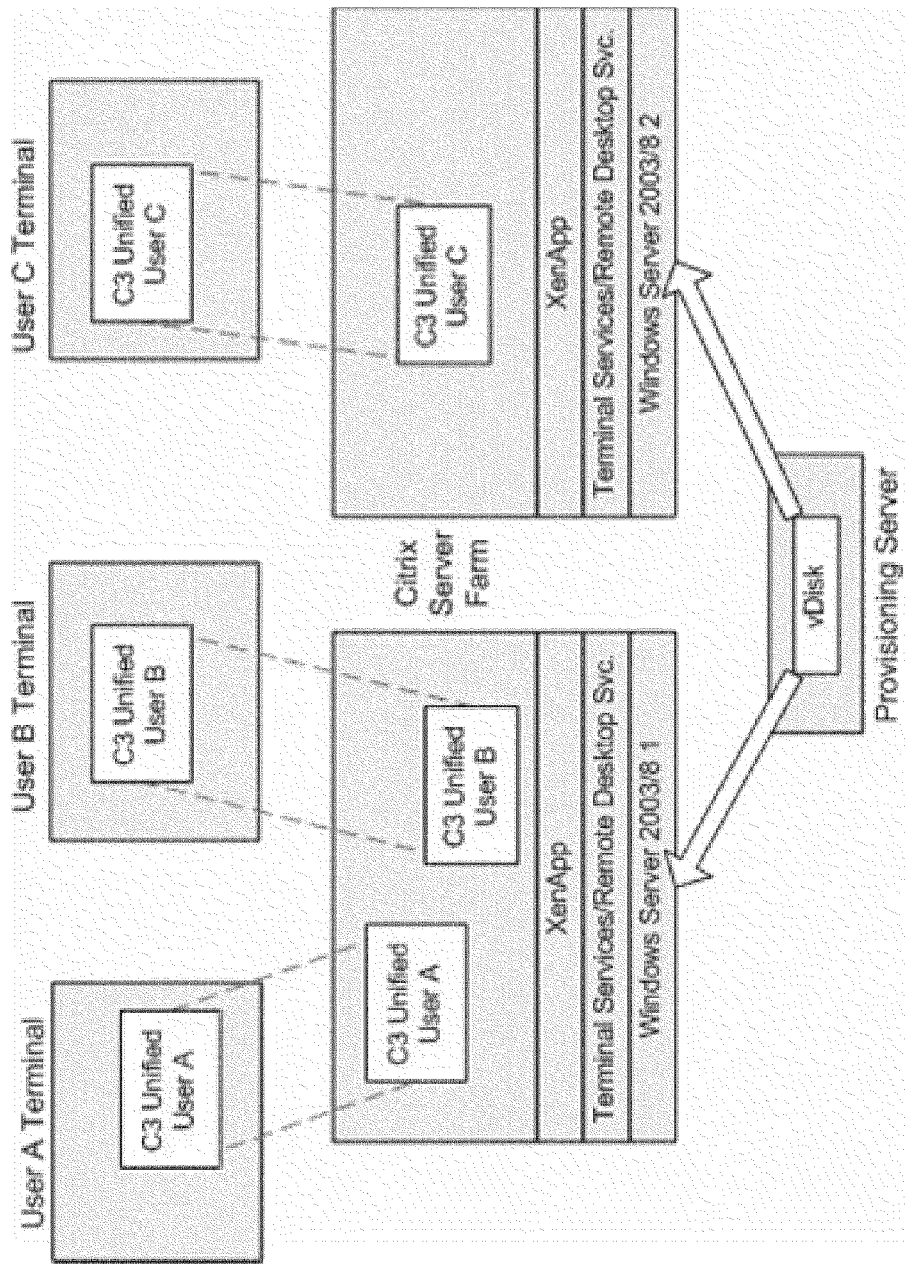
FIG. 35 depicts an exemplary CITRIX® Best Practice using Standard vDisks to effectively disallowing write operations to the base image.

CITRIX® Best Practice is to use Standard vDisks, effectively disallowing write operations to the base image. This configuration is shown in FIG. 35.

For Hosted Shared Apps using multiple XenApp servers with Standard vDisks, this has the following implications:

Persistent user data (such as user-specific configuration settings, user preferences, applications-specific data, etc.) must be stored in the user's Profile or on network disks that store user-specific data (typically SANs are used to make user data available to all XenApp servers in a farm). Moreover, users need to be set up with Roaming Profiles to make sure their profiles follow them no matter which server they log into.

Application-generated files (such as log files, audit logs, call detail records) that need to survive server reboots cannot be stored locally on the server, since server reboots will restore the standard vDisk image, thereby erasing all previously written data.

13.1.2 XenDesktop Deployments

To avoid many of the challenges associated with sharing applications and desktops on the same server using XenApp, CITRIX® introduced XenDesktop as an alternative technology. With XenDesktop, users use ICA client software to connect to an entire desktop (physical or virtual) that is dedicated to that individual for the duration of the session.

In one or more embodiments of the invention, as far as software applications are concerned, this deployment is similar to running on a dedicated desktop at the user's desk, except that the desktop is located in a data center and accessed remotely using the ICA protocol. As a result, applications typically do not need to be certified to be "XenDesktop Ready".

CITRIX® typically refers to XenDesktop-based deployments as Hosted Desktops (as opposed to the Hosted Shared Desktops provided by XenApp). These scenarios are explored further in the remainder of this section.

13.1.2.1 Hosted VM-Based Desktops

Figure 36:
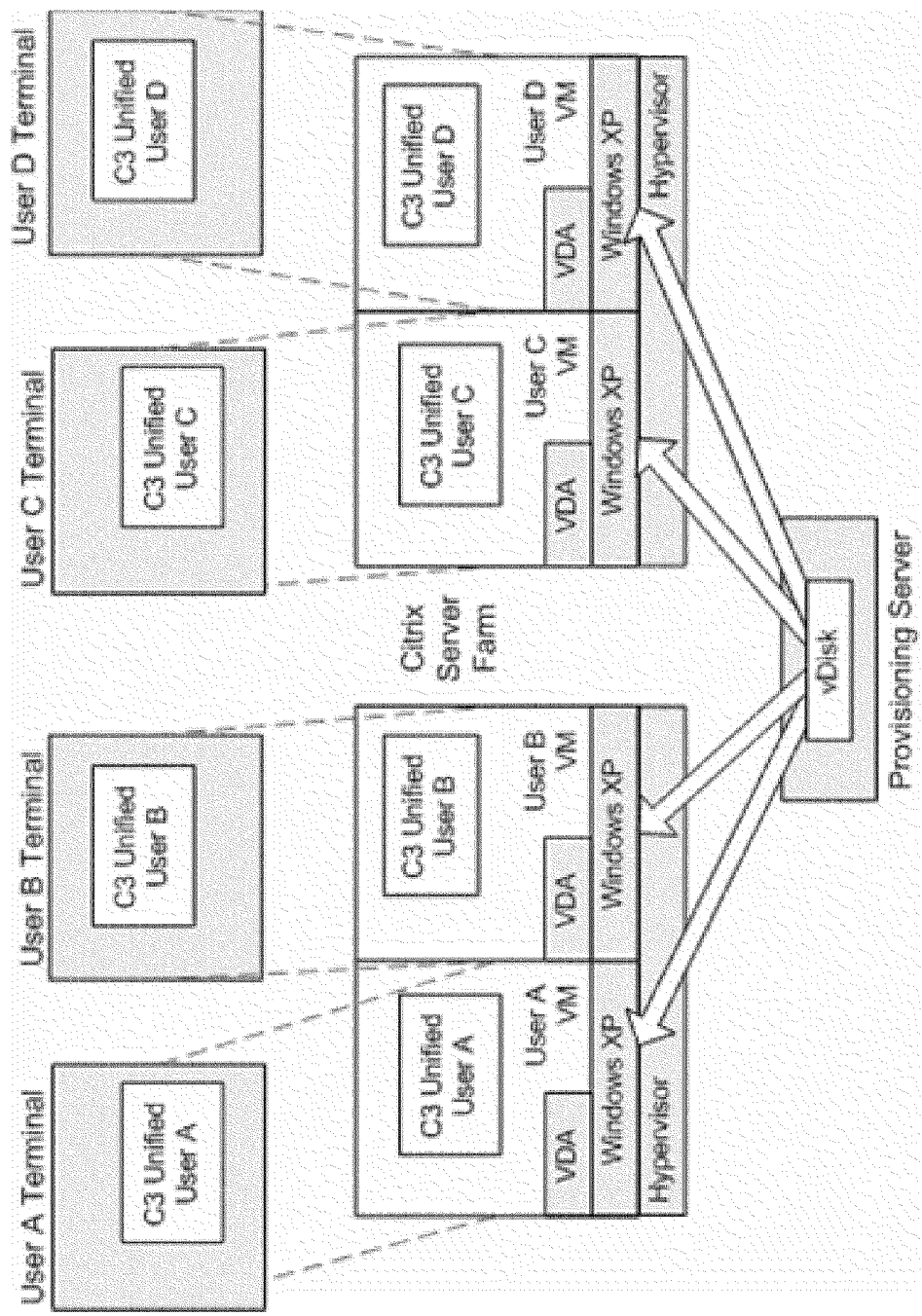
FIG. 36 depicts an exemplary XenDesktop arrangement which is structured to avoid all the problems associated with running multiple instances of an application running on the same machine at the same time.

In the Hosted VM-Based Desktop scenario, each user's desktop runs in its own virtual machine, enabling multiple users to share a single physical server while running their environments in isolation from one-another. As compared to XenApp shared desktops, this solution affords each user the more personalized Windows desktop experience that is typically needed by office workers. More importantly, by assigning dedicated desktop to each user, XenDesktop avoids all the problems associated with running multiple instances of an application running on the same machine at the same time. This scenario is shown in FIG. 36.

In a typical deployment, a single physical server can support about 50 simultaneous virtual desktops, so the scalability of this solution is not quite as good as XenApp. Moreover, XenDesktop requires management of each user's desktop, whereas XenApp is limited to managing just the server images. Provisioning Server is typically used to allow all users in the same group to use the same vDisk image, which simplifies desktop management. As with XenApp, Standard vDisk is the recommended scenario. This means that XenDesktop deployment scenarios impose all the same requirements on application-specific data as the Multiple XenApp Server scenarios.

13.1.2.2 Hosted Blade PC Desktops

This scenario is exactly like VM-based desktops, but running on dedicated hardware instead. As a result, there is one user per hosted blade PC. This scenario imposes the fewest restrictions, but it is not very commonly used because of scalability limitations.

13.1.3 Mixed XenDesktop/XenApp Deployments

Figure 37:
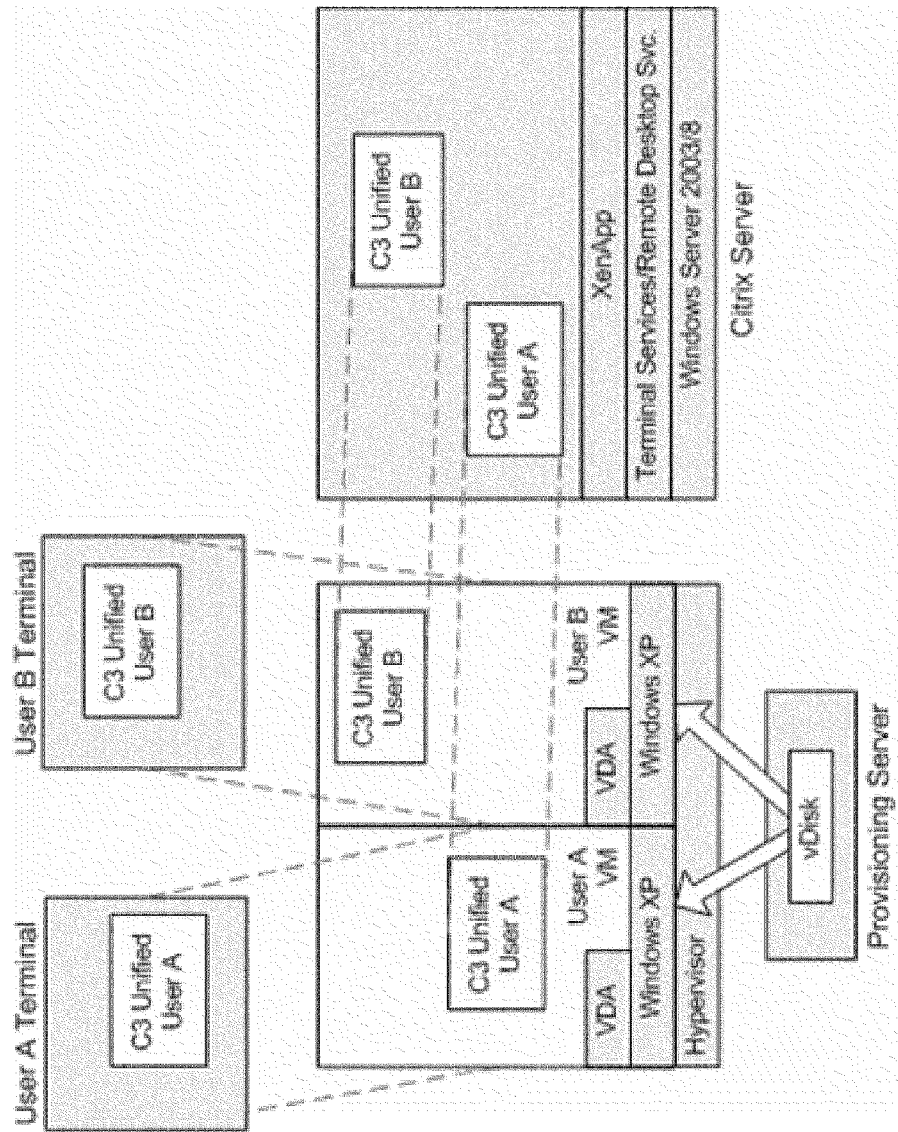
FIG. 37 depicts a representation of a "Virtual Apps to Hosted Desktops" arrangement comprising a combination of XenApp and XenDesktop scenarios.

This scenario, shown in FIG. 37 is often referred to as Virtual Apps to Hosted Desktops, and is a combination of the XenApp and XenDesktop scenarios described above. In this scenario, CITRIX® is configured to:

Deliver hosted desktops (VM or blade) to users. These hosted desktops are typically configured with applications that are common to all users, allowing administrators to manage a very small number of vDisks for hosted desktops.

Deliver hosted applications into these hosted desktops. This allows administrators to deliver applications selectively to specific groups of users without having to create separate vDisks for each group of users.

This is the most common Citrix deployment scenario since it combines the scalability and management benefits of XenApp with the personalization and isolation benefits of XenDesktop. However, it is also the most complex scenario. From a technical point-of-view, applications delivered through this mechanism incur a double ICA hop, since users access their hosted desktops across one ICA link, while those desktops access hosted shared applications across a second ICA link. Consequently, while the overall solution should be designed with this scenario in mind, mixed XenApp/XenDesktop deployments do not need to be supported in the first release of C3 Integrator—CITRIX® Edition.

13.1.4 Streamed Applications and Desktops

This is a model of application and desktop virtualization that does not involve the ICA protocol, but rather relies on "network boot" concepts that provide a local desktop experience to the end-user but allows centralized management of the desktop. Again, Provisioning Server in the datacenter is used to stream the desktop to users' physical PCs when they boot up.

Given that this deployment scenario does not involve the ICA protocol, it is outside the scope of this document. However, given that Avistar will need to operate correctly in Standard vDisk environments to support the various ICA-based deployment scenarios, it is expected that virtualization scenarios based on streaming "will just work."

13.2 VMware

In an embodiment, a VMware VDI implementation may be implemented in ways similar to the CITRIX® implementation. Some VMware-specific adaptations provided for by the invention include:
  Differences in window management and window geometry updating to remote terminal clients;
  VMware View software to access Windows applications running on VMware servers from VMware View clients;
  Adaptation of the RMEP protocol to VMware's PCoIP protocol.

13.3 HP

In an embodiment, an HP VDI implementation may be implemented in ways similar to the CITRIX® implementation. Some HP specific adaptations provided for by the invention include:
  Differences in window management and window geometry updating to remote terminal clients;
  RGS software to access Windows applications running on RGS Blade Servers from HP RGS Terminals;
  Leveraging of RGS support for "collaboration" vs. "regular" modes of remote desktop access.

13.4 WYSE®

The intention for supporting virtual desktop sessions using CITRIX®, HP®, or other commercial solutions is for the application to be as hardware independent as for any workstation deployment. In that respect, there should be no need to state specific requirements related to particular thin client terminal model any more than such requirements would be necessary for development of an application intended to run under Windows.

WYSE® sells a number of thin client devices as summarized in the following table. There are four basic models based on 4 different CPU families, resulting in four different performance profiles. For each of these models, different operating environments are supported.

| | Processor | | | |
| --- | --- | --- | --- | --- |
| | AMD Geode GX 366 MHZ | VIA 1 GHz | Via C7 Eden- 800 MHz | 1 GHz AMD Sempron |
| WYSE ® ThinOS | S10 | | V10 | |
| WINDOWS ® CE | S30 | C30LE | V30 | |
| LINUX ® | S50 | | V50 | R50 |
| WINDOWS ® XPe | | C90LE | V90 | R90 |

Only the high-end R class terminals are capable of supporting 30 fps video. Although WYSW® terminals are available with multiple embedded software choices (WYSE®ThinOS, WINDOWS® CE, LINUX®, WINDOWS® XPe, WINDOWS® Embedded Standard), the most predominant platform appears to be WINDOWS® XPe (WINDOWS® XP embedded).

Various embodiments of the inventive concept further provide for operation using such WYSE® "thin client" terminals.

13.5 MICROSOFT® OCS

Various embodiments of the inventive concept further provide for full audio and video support for OCS on CITRIX® to present users with a simple launch of the software from OCS and to embed the software within the OCS look and feel. An example of the user experience may be similar to that shown earlier in FIG. 15.

Launching the application direct from within the MICROSOFT® OSC (MOC) client using menu extensions within MOC with the Contacts List extended with an option to start an audio/video conference provided by the invention with the selected contact(s). No additional presence or directory subsystem need be provided since all presence and contact information is entirely managed through and obtained from MICROSOFT® OCS.

Figure 38:
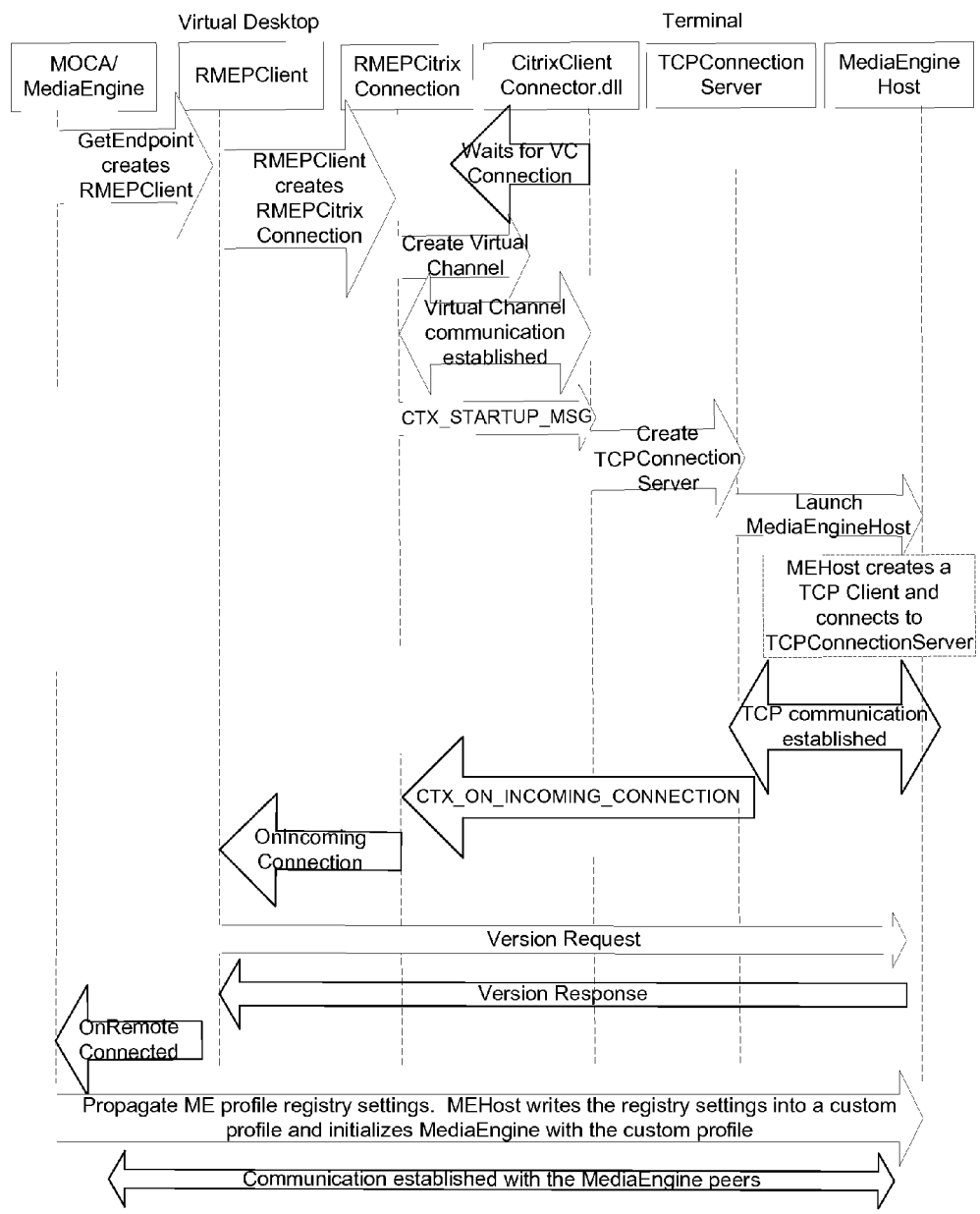
FIG. 38 depicts an exemplary MOCA startup sequence as provided for by the invention.

FIG. 38 depicts an exemplary MOCA startup sequence as provided for by the invention.

Figure 39:
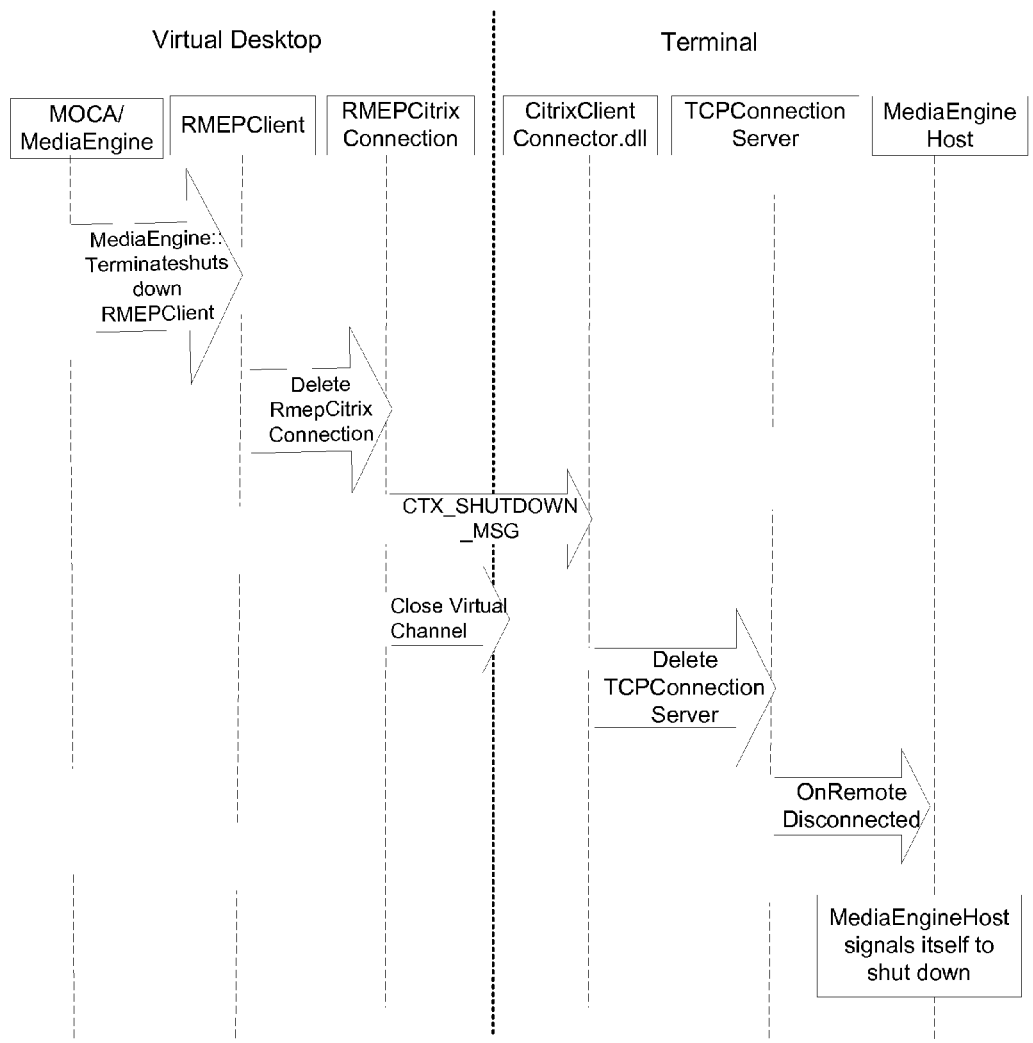
FIG. 39 depicts an exemplary MOCA exit sequence as provided for by the invention.

FIG. 39 depicts an exemplary MOCA exit sequence as provided for by the invention.

In one or more embodiments of the invention, server-based integration is based on Remote Call Control (RCC). When Office Communicator is configured for Remote Call Control MOC users will continue to use the existing MOC GUIs to place calls, but rather than using the built-in MOC A/V IP clients, calls are placed using the media engine. This provides the end-user with an experience that is as close as possible to the end-user experience provided by MOC. Note that if RCC is already in use for other applications (e.g. to integrate with PBX infrastructure), MICROSOFT® OCS Server Plug-Ins are used to mimic a Remote Call Control experience.

The invention also allows users to take advantage of all MICROSOFT® OCS functionality—including voice and video chat—even in CITRIX® environments.

In addition to calling integration through RCC and Action Menu extensions, various embodiments of the invention also provide the following additional integration points:
  Multiple available presence states to show when a user can be reached via the solution;
  The application GUI controls can be provided in a custom tab;
  Seamless and immediate access to any other types of A/V endpoint within customers' voice and video networks.

Figure 40A:
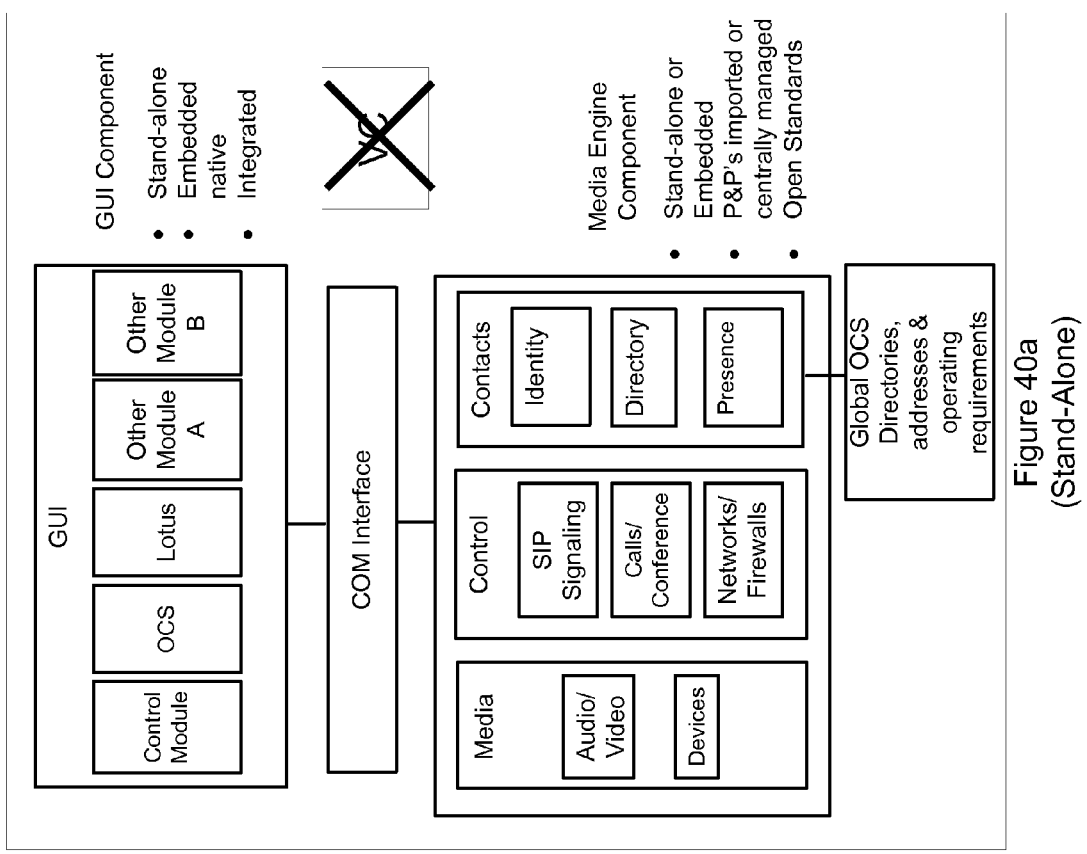
FIGS. 40a-40e depict various configurations of a common article or instance of software as provided for by the invention.
Figure 40C:
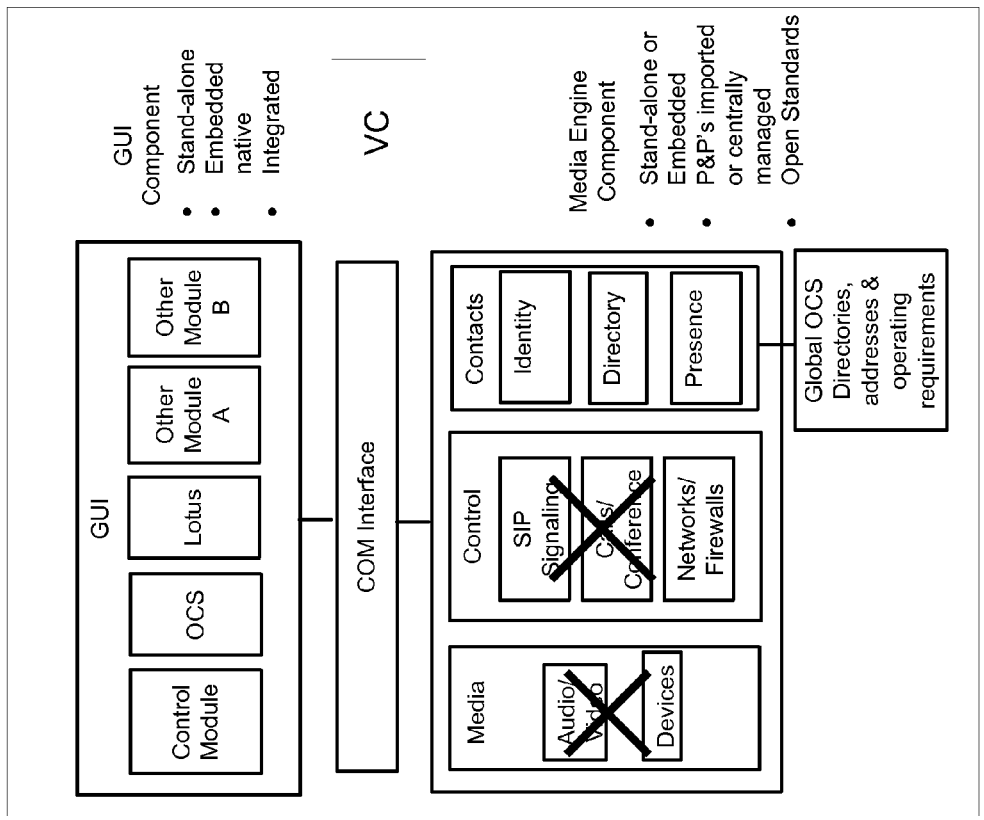
Figure 40B:
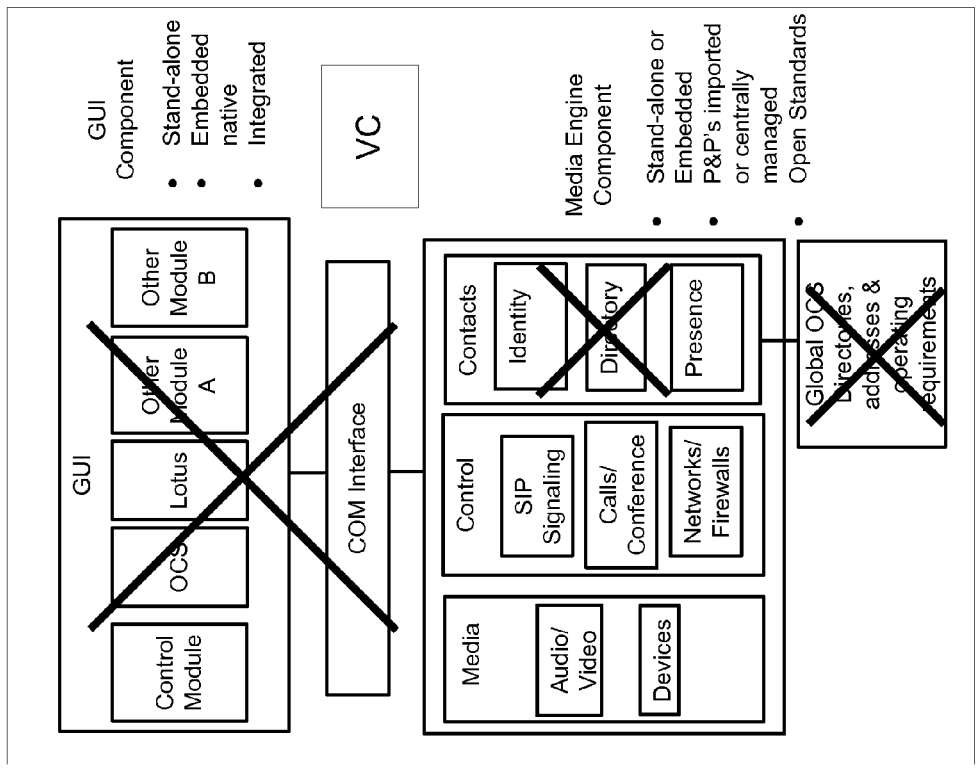
Figure 40E:
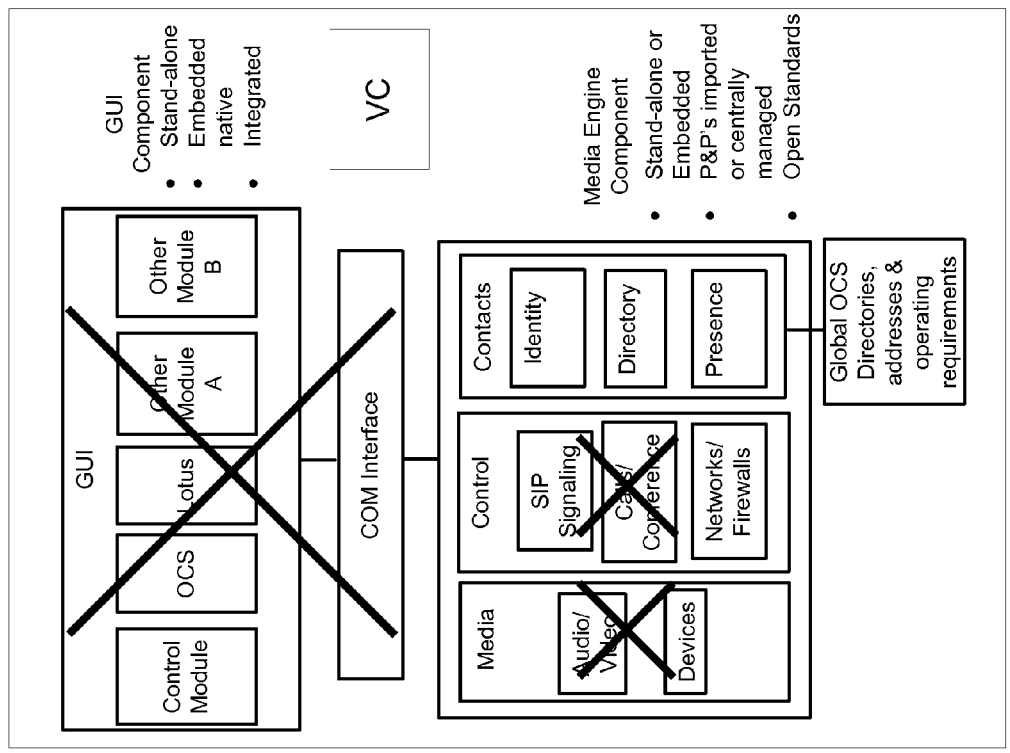
Figure 40D:
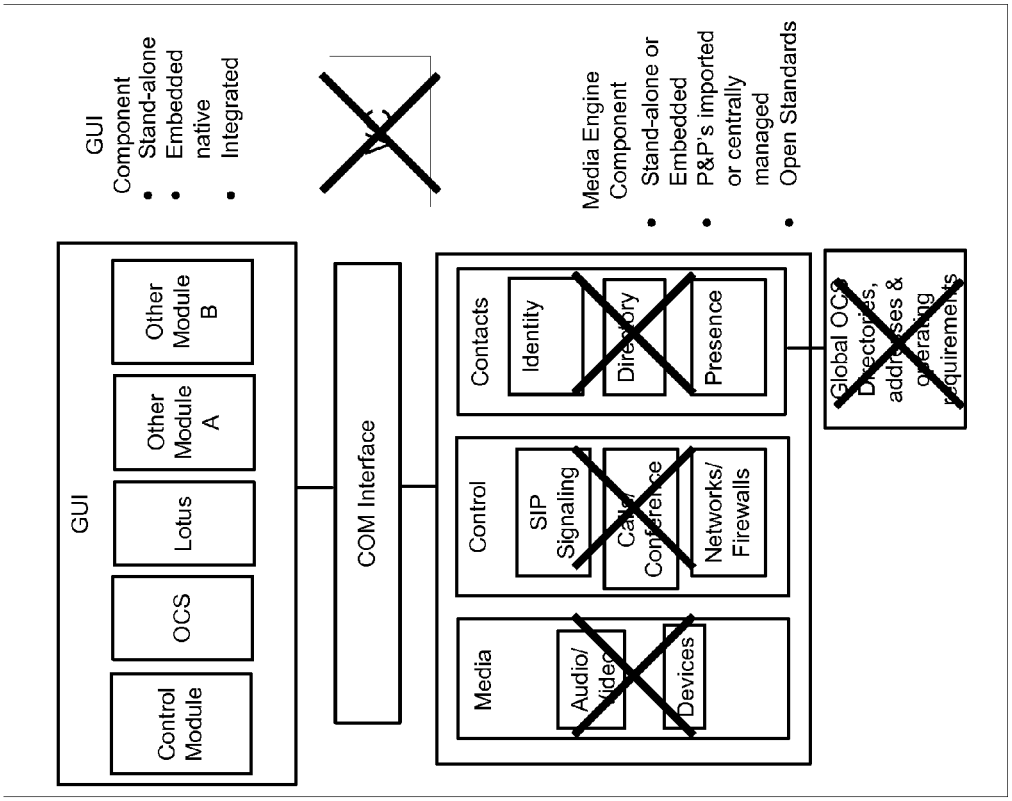

14. Auto-Dividing Two-Component Partitioned Media Engine According to Execution Platform Referring to the exemplary architecture of a contemporary high-functionality real-time interactive collaboration application, various adaptations must be made for the various platforms and cases described thus far. For example:
  When the exemplary FIG. 15-16 application executes solely on a traditional stand-alone computer such as that suggested in FIG. 1, the media engine does not need to be partitioned and further done not require a virtual channel driver, and as such can operate as depicted in FIG. 16. This case is represented in FIG. 40a wherein the full FIG. 16 architecture is implemented but a possible virtual channel driver is not (depicted by the "X" crossout over the VC element);
  For the portion of the exemplary FIGS. 15-16 application executing on a VDI terminal, be it executing in parallel to the terminal client (as in FIGS. 8 and 22) or within the terminal client (as in FIGS. 23 and 24), the GUI component, COM interface, contacts element, and associated external elements are not implemented and the virtual channel driver is implemented. This case is represented in FIG. 40*b* depicting corresponding "X" cross-outs over the unimplemented elements and the virtual channel driver depicted with no "X" cross-out;

For the portion of the exemplary FIG. 15-16 application executing on a traditional VDI virtual machine server session (as in FIGS. 8 and 23), the media and control elements are not and the virtual channel driver is implemented. This case is represented in FIG. 40*c* depicting corresponding "X" cross-outs over the unimplemented elements and the virtual channel driver depicted with no "X" cross-out;

For the portion of the exemplary FIGS. 15-16 application executing on a simplified VDI virtual machine server session (as in FIGS. 22 and 24), the media, control, contacts, outside utilities and virtual channel driver elements are not implemented and the virtual channel driver is implemented. This case is represented in FIG. 40*d* depicting corresponding "X" cross-outs over the unimplemented elements;

For the portion of the exemplary FIGS. 15-16 application executing on a SE server, (as in FIGS. 22 and 24), the GUI component, COM interface, media element, and control elements are not implemented and the virtual channel driver is implemented. This case is represented in FIG. 40*e* depicting corresponding "X" cross-outs over the unimplemented elements and the virtual channel driver depicted with no "X" cross-out.

In one or more embodiments of the invention, a single media engine article of software is deployed as a general-purpose SIP voice and video engine with the goal of being integrated with a variety of other technologies. In such embodiment or variations upon it, the media engine has the following characteristics:

Functionality is delivered entirely through APIs. The GUI to these features is provided on top of APIs directly by the embedding application, or existing GUIs are customized to fit the look-and-feel of the embedding application;

Audio support includes one or more of G.711, G.722, G.722.1c, and AAC-LC for audio calls from 3 kHz to 14 kHz (ultra-wideband);

Video support includes one or more of H.264, H.263+, and H.263 for video with rates ranging from 128 kb/s to 2048 kb/s. Video is encoded at up to 30 fps (depending on the webcam used);

The Avistar C3 Media Engine includes HD support. Supported video resolutions:
HD 720P (1280×720 pixels)
4CIF resolution (704×576 pixels)
VGA resolution (640×480 pixels)
400×244 pixels
CIF resolution (352×288 pixels) or SIF (352×240)
QCIF resolution (176×144 pixels) or QSIF (176×120)

Video is transmitted over RTP;

daptive jitter buffer, packet loss concealment, call rate adaptation, and other techniques are used to preserve quality of service;

Standards-based firewall traversal (using STUN, TURN, and ICE) are provided.

Figure 41A:
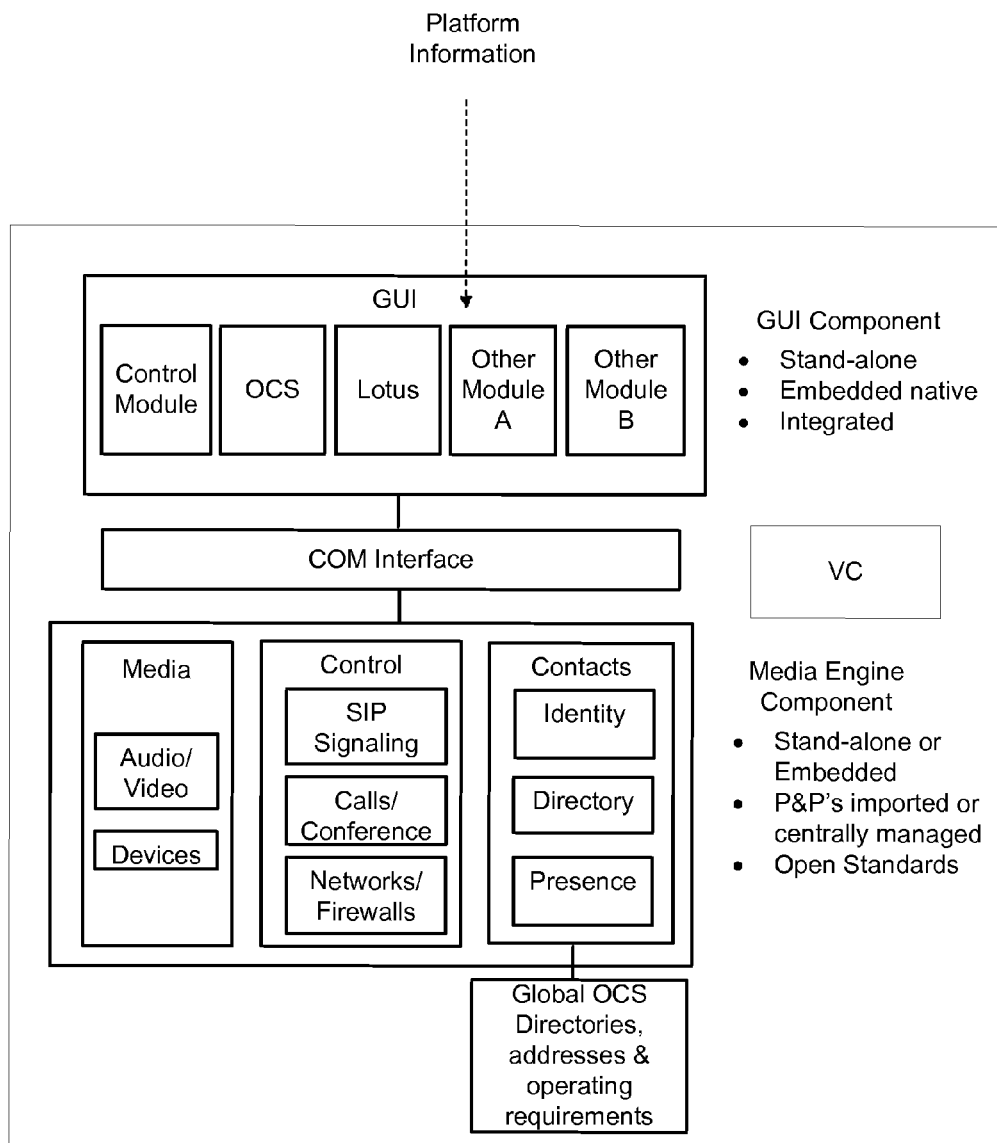
FIGS. 41a-41c depict various information inputs used to configure the common article or instance of software as provided for by the invention.

In an embodiment, a common article of software automatically configures itself at installation, or at a later time, so as to implement selected elements and not implement other elements according to automatically-provided platform information. This is illustrated in FIG. 41*a*. Examples of automatic configuration based on platform information includes:

Choice of target system load level for dedicated desktops, virtual desktops, shared-use systems or remote terminals;

Choice of video resolutions and frame rates based on available CPU, GPU or DSP resources or video camera capabilities;

Choice of the audio sampling frequency to create the right tradeoff between system load and audio quality;

Availability of certain quality enhancement algorithms, such as video noise filtering or acoustic echo cancellation, based on available hardware and computing resources.

Figure 41B:
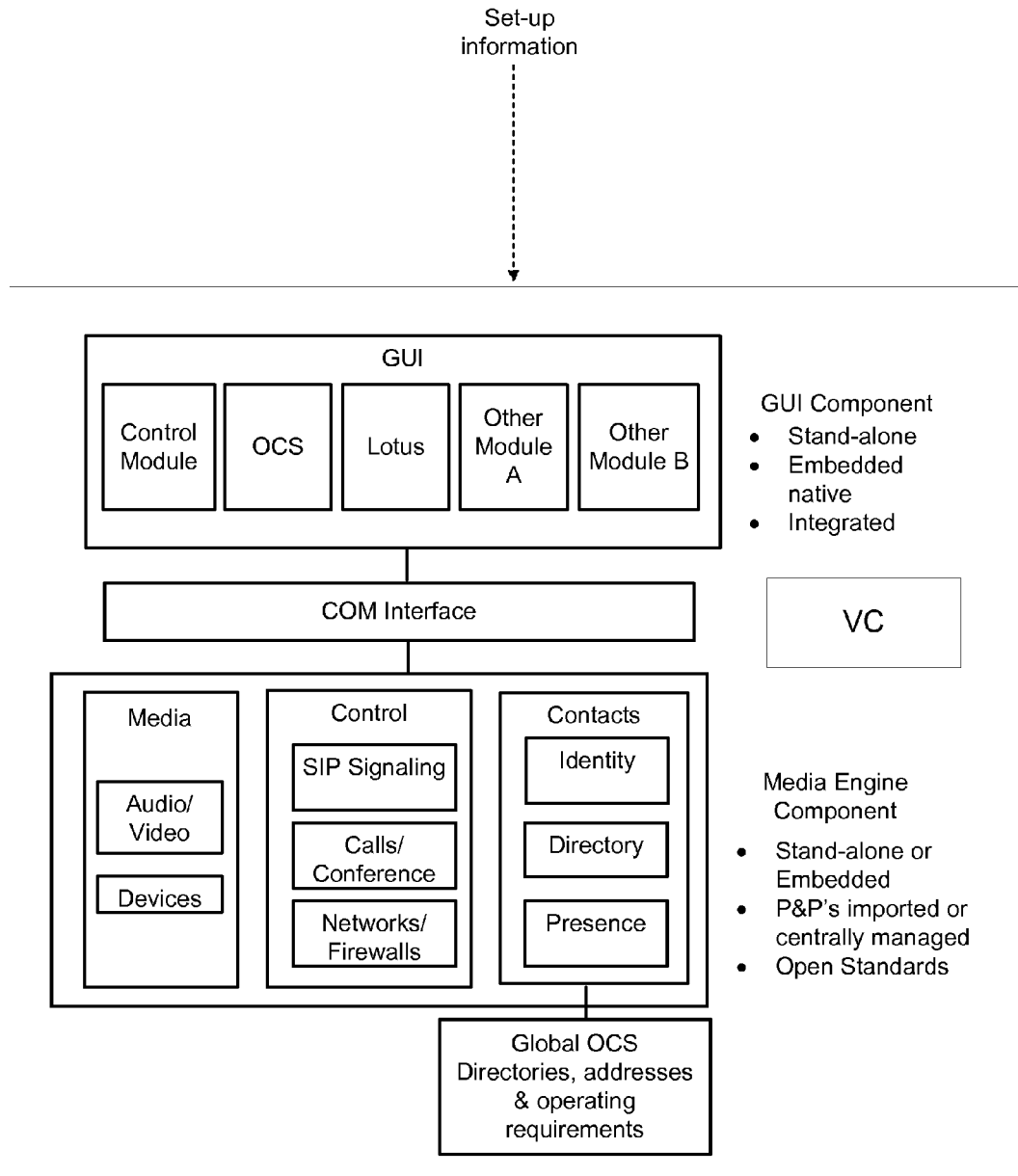

In one or more embodiments of the invention, a common article of software may automatically configure itself at installation, or at a later time, so as to implement selected elements and not implement other elements according to administrator-provided set-up information. This is illustrated in FIG. 41*b*. Examples of automatic configuration based on administrative information may include:

Features enabled or disabled based on per-terminal licensing, for different terminals used to access the same set of systems or applications;

Features enabled or disabled based on per-application licensing, for different applications using the same partitioned article of software;

Features enabled or disabled based on end user entitlement, for different users accessing the same system, application, or terminal.

Figure 41C:
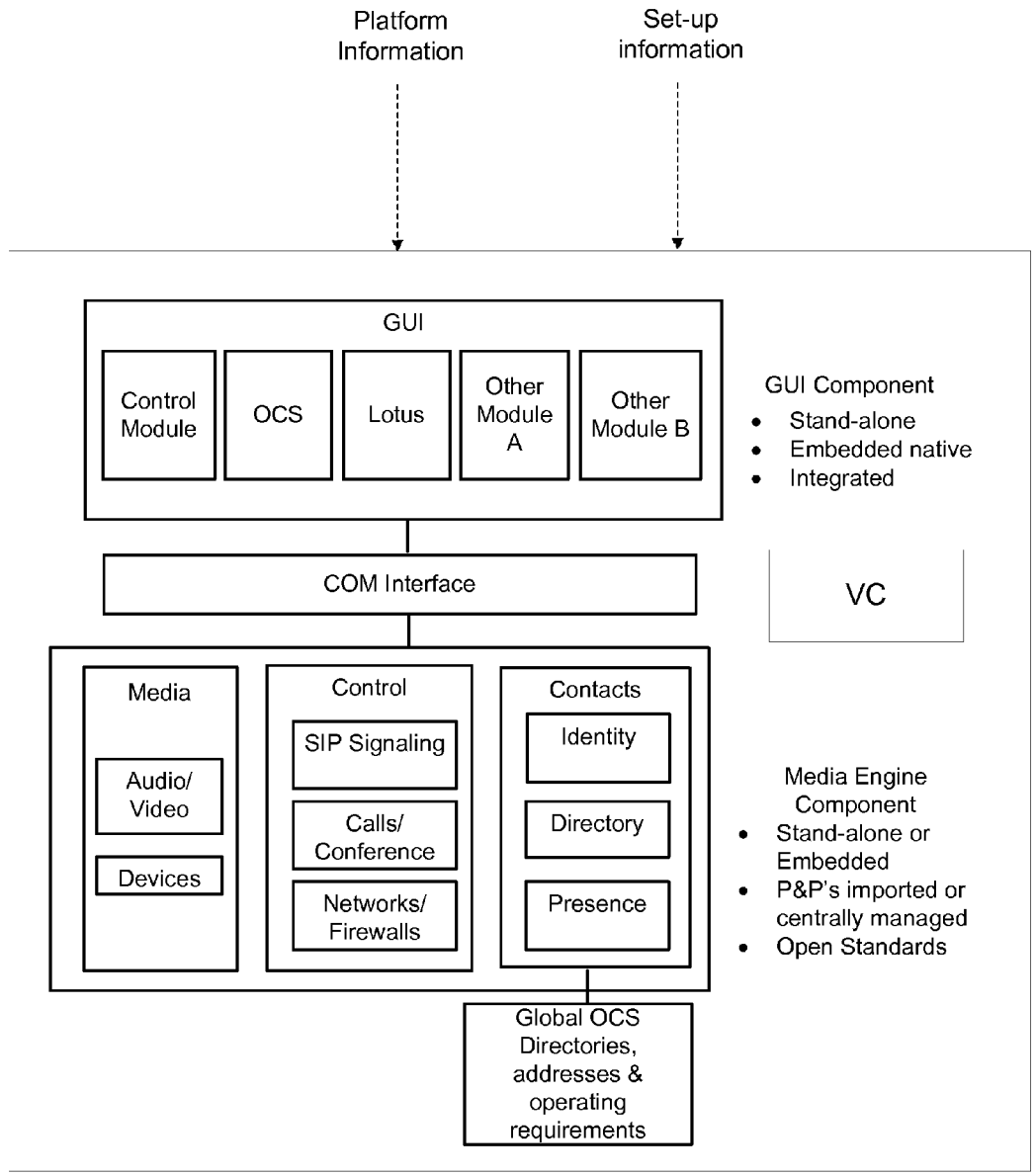

In an embodiment, a common article of software may automatically configure itself at installation, or at a later time, so as to implement selected elements and not implement other elements according to both automatically-provided platform information and administrator-provided set-up information. This is illustrated in FIG. 41*c*.

15. Approaches to Multi-Component Partitioned Media Engine Software Implementation Throughout Sections 4-14, the partition of the media engine into two sections, a first portion best suited for execution at the terminal platform and a second best suited for execution at the server platform within VDI and VAI architectures, as presented in detail. Such a two-way partition has a strong advantage for the current state of server hardware and software, desktop computing terminal hardware, application software, and administration environments such as the VDI and VAI architectures that have been considered. The added capability to allow a single article of such software to auto-divide, auto-configure, and/or set-up configure so as to best match the underlying platform, networking, and distributed processing environment and/or other directives provides considerable ease of installation, administration, version minimization, and other important value.

As mentioned earlier, these principles and approaches need not be limited to a two-component partition. In particular, in one or more embodiments of the invention, a number of other rapidly evolving trends currently in place are excellent candidates for eventually being well-served by a multi-component partition, and further for these to be rendered from article of such software to auto-divide, auto-configure, and/or set-up configure so as to best match the underlying platform, networking, and distributed processing environment and/or other directives. These trends include:

Multi-core computing platforms (for example, media engines may execute on one or more cores at high utilization with affecting processes on other cores);

The rise of the extra computer power for Graphical Processing Units (GPUs) and forays into their use in general computing;

General and specialized (for example compression, decompression) DSPs;

Network distributed processing server architectures for mash-ups;

Need for network based support of modest-CPU mobile devices.

Various embodiments of the inventive concept further provide for multi-component partitions of a single article of software.

Various embodiments of the inventive concept further provide for the multi-component partitions to be rendered from article of such software by any one or more of:

an auto-divide operation;
an auto-configure operation; and/or
a set-up configure operation, so as to best match the underlying platform, networking, and distributed processing environment and/or other directives.

Various embodiments of the inventive concept further provide for terminal session software elements of such arrangement to be radically dissimilar. For example:

In a remote medicine system one terminal session software element may be specially configured specially for interfacing with a patient and associated real-time physiological medical measurement instruments, another configured specially for interfacing with an analyzing physician, and perhaps a third configured specially for a specialized facility device such as an MRI machine in a room that the patient has been brought to;

In a telemetry situation for manufacturing plant operations or environmental monitoring, various terminal session software elements may operate in 2-way modes for interfacing with machine sensors, environment sensors, operating personal, field observers, etc.

In the exemplary two-component partitions of Sections 4-14 the partition was not explicitly organized as either a peer or hierarchical partition (although it could be structured in some such manner should that be advantageous). However, many of the motivating trends listed at the beginning of this section may in some circumstances lead themselves to a more organized peer or hierarchical partition.

As examples of usage, a terminal platform may be found upon installation or provisioning to comprise any one or more of:

Multicore CPU;
GPU;
General and specialized (for example compression, decompression) DSPs;
Presence of classes of peripherals (for example, webcam, headset, sensor interface); and/or
Special properties of peripherals (for example, webcam may include video compression).

Figure 42:
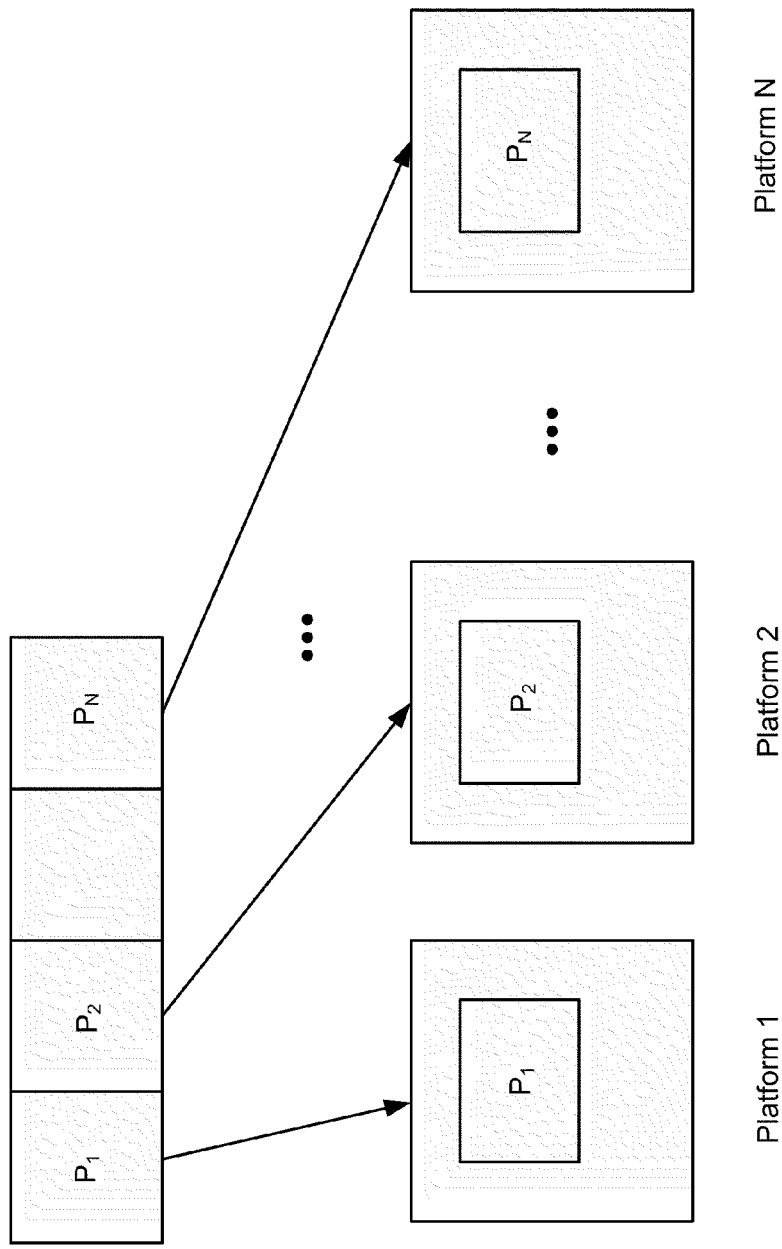
FIG. 42 depicts an exemplary peer-partition of a common article or instance of software that would otherwise execute unpartitioned on a single desktop platform such as that depicted in FIG. 1.
Figure 44:
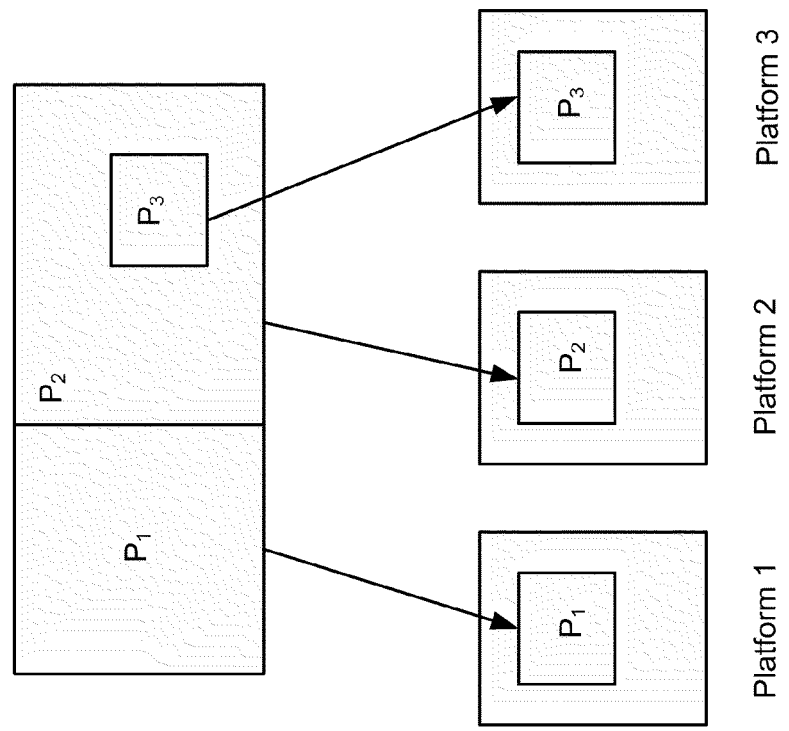
FIG. 44 depicts an exemplary mixed-partition (i.e., partially peer-partitioned, partially hierarchical-partitioned) of a common article or instance of software that would otherwise execute unpartitioned on a single desktop platform such as that depicted in FIG. 1.
Figure 43:
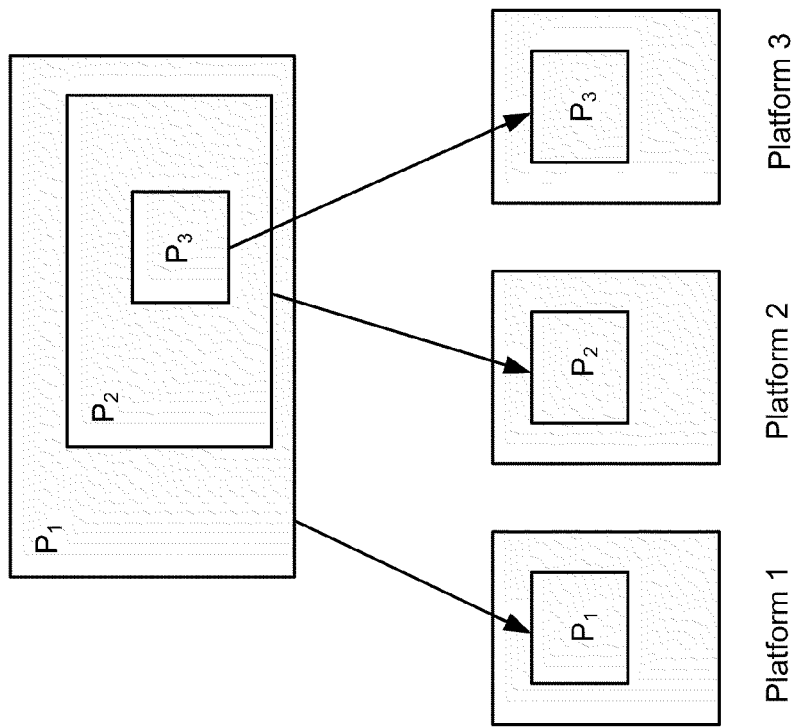
FIG. 43 depicts an exemplary hierarchical-partition of a common article or instance of software that would otherwise execute unpartitioned on a single desktop platform such as that depicted in FIG. 1.

By way of example:

FIG. 42 depicts an exemplary peer-partition of a common article of software that would otherwise execute unpartitioned on a single desktop platform such as that depicted in FIG. 1;

FIG. 43 depicts an exemplary hierarchical-partition of a common article of software that would otherwise execute unpartitioned on a single desktop platform such as that depicted in FIG. 1;

FIG. 44 depicts an exemplary mixed-partition (i.e., partially peer-partitioned, partially hierarchical-partitioned) of a common article of software that would otherwise execute unpartitioned on a single desktop platform such as that depicted in FIG. 1.

Other combinations and variations that are clear to one skilled in the art are anticipated and provided for by the embodiments of the invention.

Various embodiments of the inventive concept also provide for automatic or administered peer-partition of a common article of software so as to best match the underlying platform, networking, and distributed processing environment and/or other directives.

Various embodiments of the inventive concept additionally provide for automatic or administered partition of a common article of software so as to best match the underlying platform, networking, and distributed processing environment and/or other directives.

Various embodiments of the inventive concept further provide for automatic or administered mixed-partition of a common article of software so as to best match the underlying platform, networking, and distributed processing environment and/or other directives.

As an example of some of the aforedescribed automatic partition possibilities, consider some exemplary cases wherein the endpoint device operating as a VDI-client terminal may in some cases interface with peripheral or internal media devices that may or may not additionally include one or more of compression and/or decompression capabilities. In the figures to follow, the audio/video media element of the inventive article of 2-way A/V software at the endpoint device is further structurally segregated into four components:

Video compression;
Audio compression;
Video decompression; and
Audio decompression.

Figure 45:
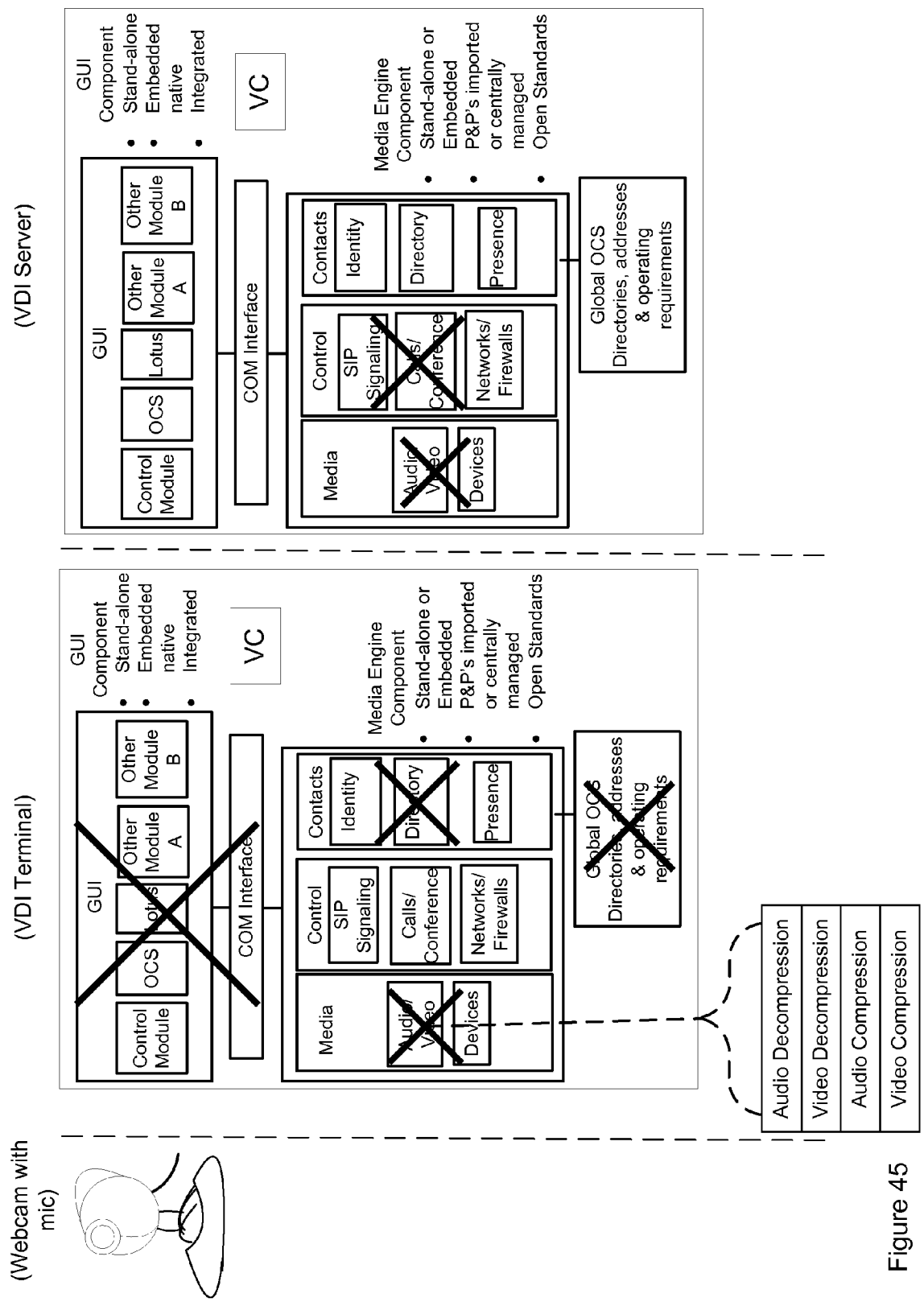
FIG. 45 depicts an exemplary arrangement wherein an external webcam with internal microphone is made available to at an endpoint device operating as a VDI-client terminal, and wherein one instance of the inventive article or instance of software is installed on the endpoint device and another instance of the same article or instance of software is installed on the associated server. The same software architecture is relevant if the webcam and microphone are integrated into a computer monitor.
Figure 46:
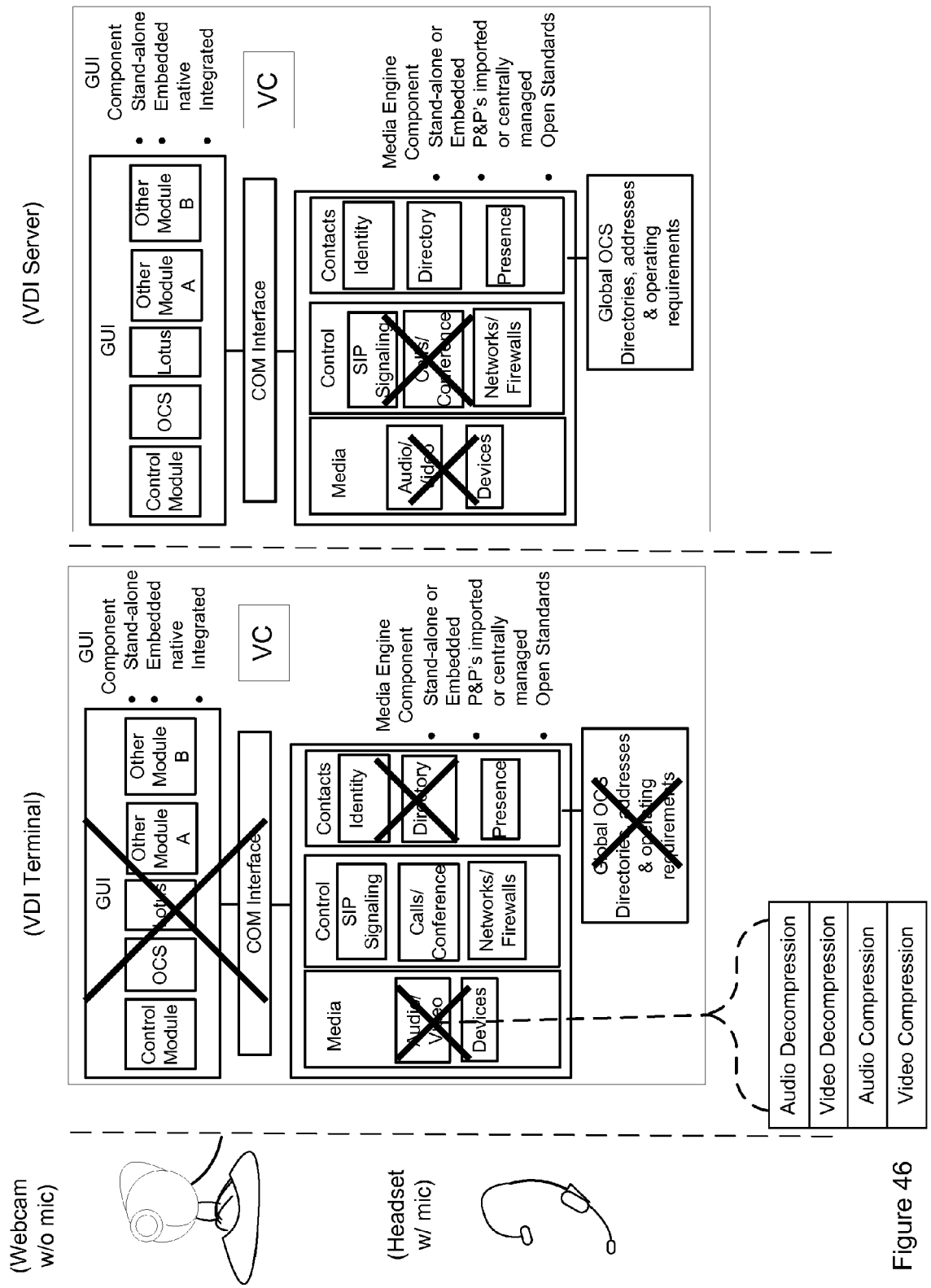
FIG. 46 depicts an exemplary arrangement wherein an external webcam without a microphone used together with a headset are made available to at an endpoint device operating as a VDI-client terminal, and wherein one instance of the inventive article or instance of software is installed on the endpoint device and another instance of the same article or instance of software is installed on the associated server.
Figure 47:
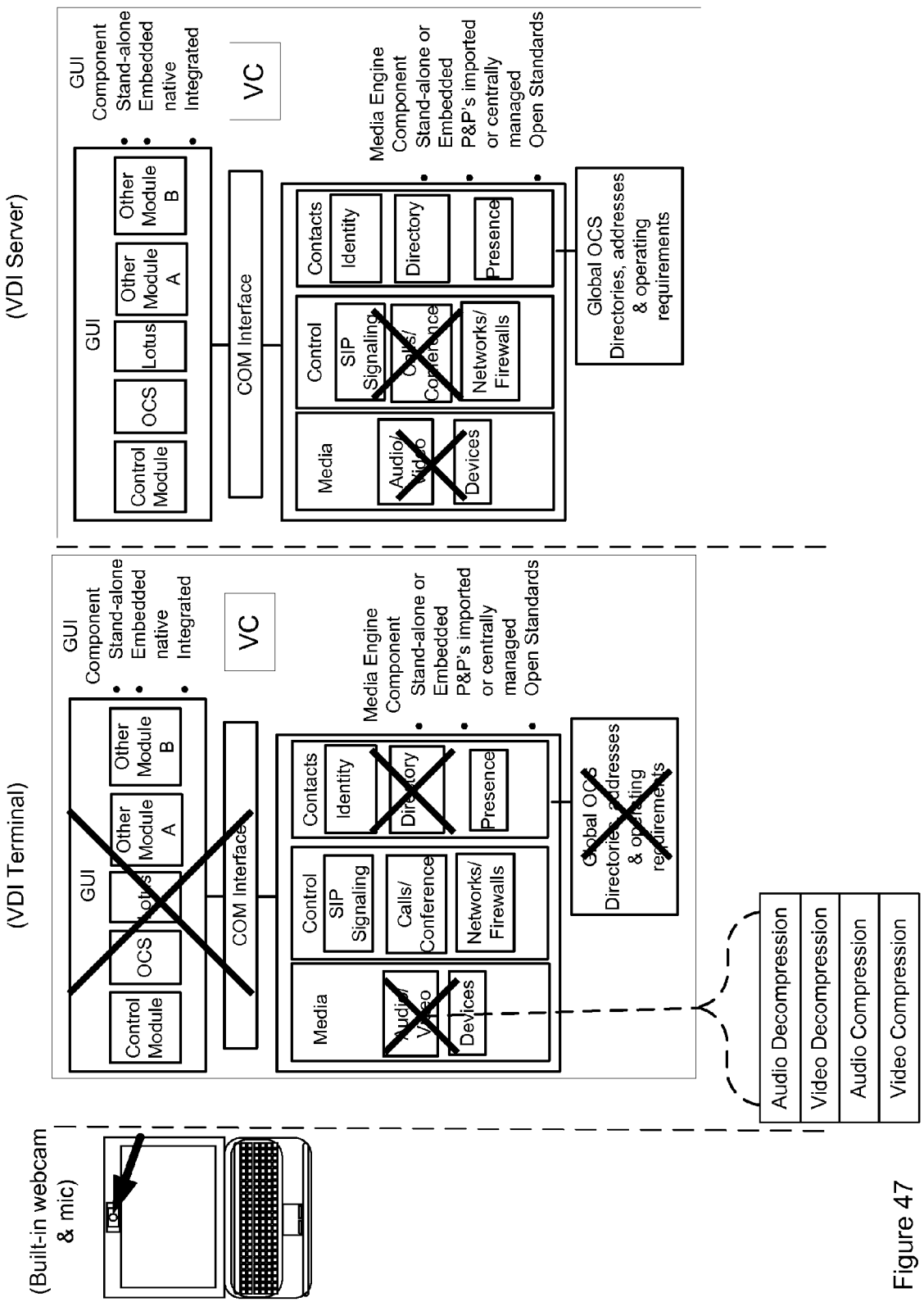
FIG. 47 depicts an exemplary arrangement wherein a built-in webcam and microphone are made available to at an endpoint device operating as a VDI-client terminal, and wherein one instance of the inventive article or instance of software is installed on the endpoint device and another instance of the same article or instance of software is installed on the associated server. Here the endpoint device may be a laptop computer (as depicted), tablet computer, etc. comprising an internal microphone and internal speaker as well as internal audio compression and internal audio decompression.

To begin, consider the possible endpoint device cases wherein (1) an external webcam with internal microphone or (2) an external webcam without a microphone together with a headset or (3) a built-in webcam and microphone are made available to at an endpoint device operating as a VDI-client terminal, and wherein one instance of an inventive article of 2-way A/V software is installed on the endpoint device and another instance of the same article of 2-way A/V software is installed on the associated server. This overall situation (and many possible variations) is represented by FIGS. 45-47. The general situation regarding the auto partitioning was considered earlier, for example in conjunction with FIGS. 40b-40c and FIGS. 40d-40e. Although the arrangement of FIGS. 45-47 depicts the particular client/server automatic partition outcome associated with FIGS. 40b-40c, it is to be understood that wide allowances for other client/server automatic partition outcomes, such as the client/server automatic partition outcome associated with FIGS. 40d-40e, are implied, anticipated, and provided for by the invention.

More specifically:

FIG. 45 depicts an exemplary arrangement wherein an external webcam with internal microphone is made available to at an endpoint device operating as a VDI-client terminal, and wherein one instance of the inventive article of software is installed on the endpoint device and another instance of the same article of software is installed on the associated server. The same software architecture is relevant if the webcam and mic are integrated into a computer monitor.

FIG. 46 depicts an exemplary arrangement wherein an external webcam without a microphone used together with a headset are made available to at an endpoint device operating as a VDI-client terminal, and wherein one instance of the inventive article of software is installed on the endpoint device and another instance of the same article of software is installed on the associated server.

FIG. 47 depicts an exemplary arrangement wherein a built-in webcam and microphone are made available to at an endpoint device operating as a VDI-client terminal, and wherein one instance of the inventive article of software is installed on the endpoint device and another instance of the same article of software is installed on the associated server. Here the endpoint device may be a laptop computer (as depicted), tablet computer, etc. comprises an internal microphone and internal speaker as well as internal audio compression and internal audio decompression.

Next to be considered are exemplary variations wherein the webcam and/or headset include media compression/decompression capabilities that could be exploited so as to offload media CPU loading at the endpoint device operating as a VDI-client terminal.

Figure 48:
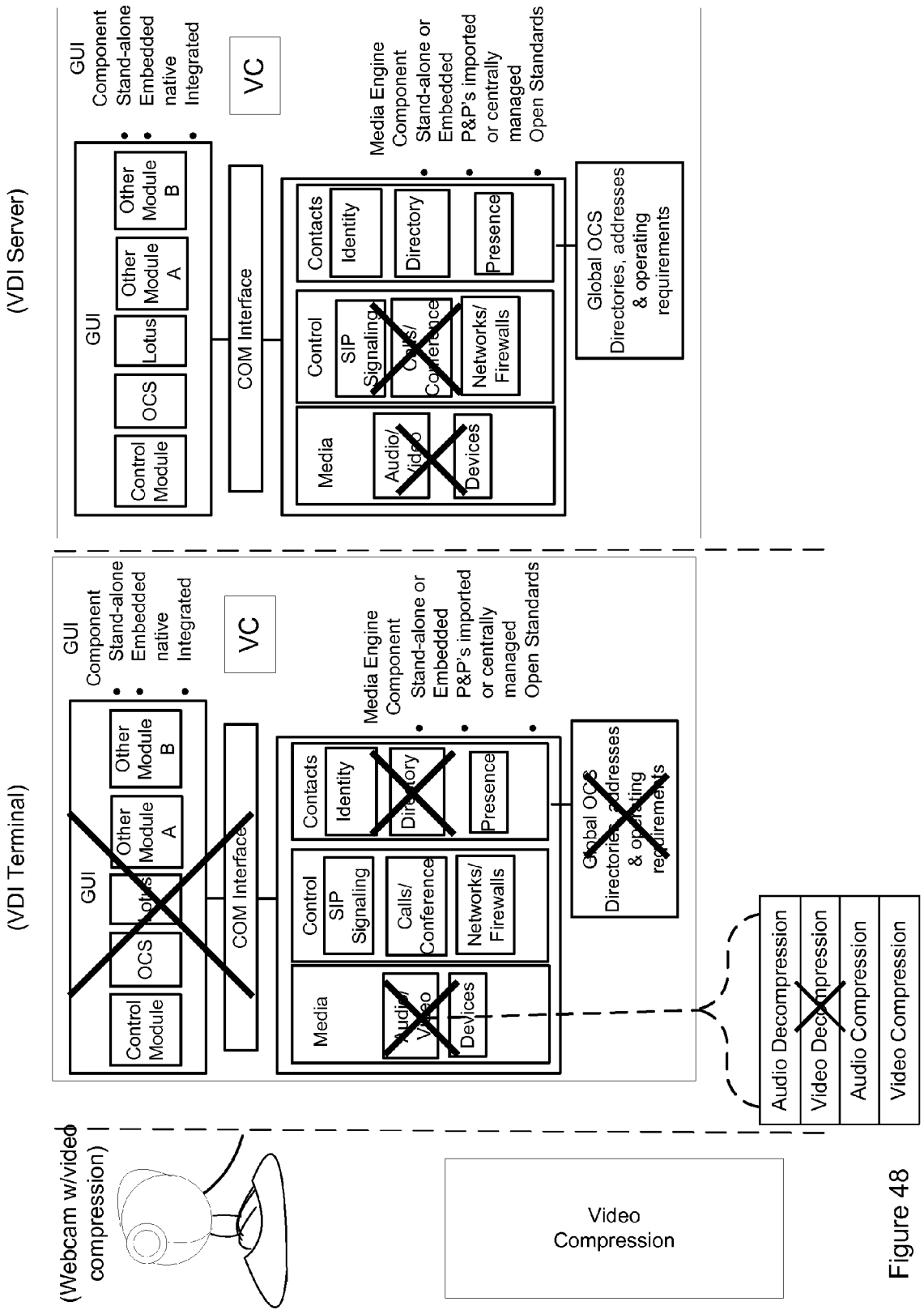
FIG. 48 depicts in more detail wherein a peripheral webcam further comprises internal video compression. The same software architecture is relevant if the webcam and internal video compression are integrated into a computer monitor.

FIG. 48 depicts in more detail wherein a peripheral webcam further comprises internal video compression. Under the circumstance wherein the inventive article of software detects that the webcam comprises internal video compression, the invention provides for the video compression element within the inventive article of 2-way A/V software the endpoint device not be enabled/initialized.

Figure 49:
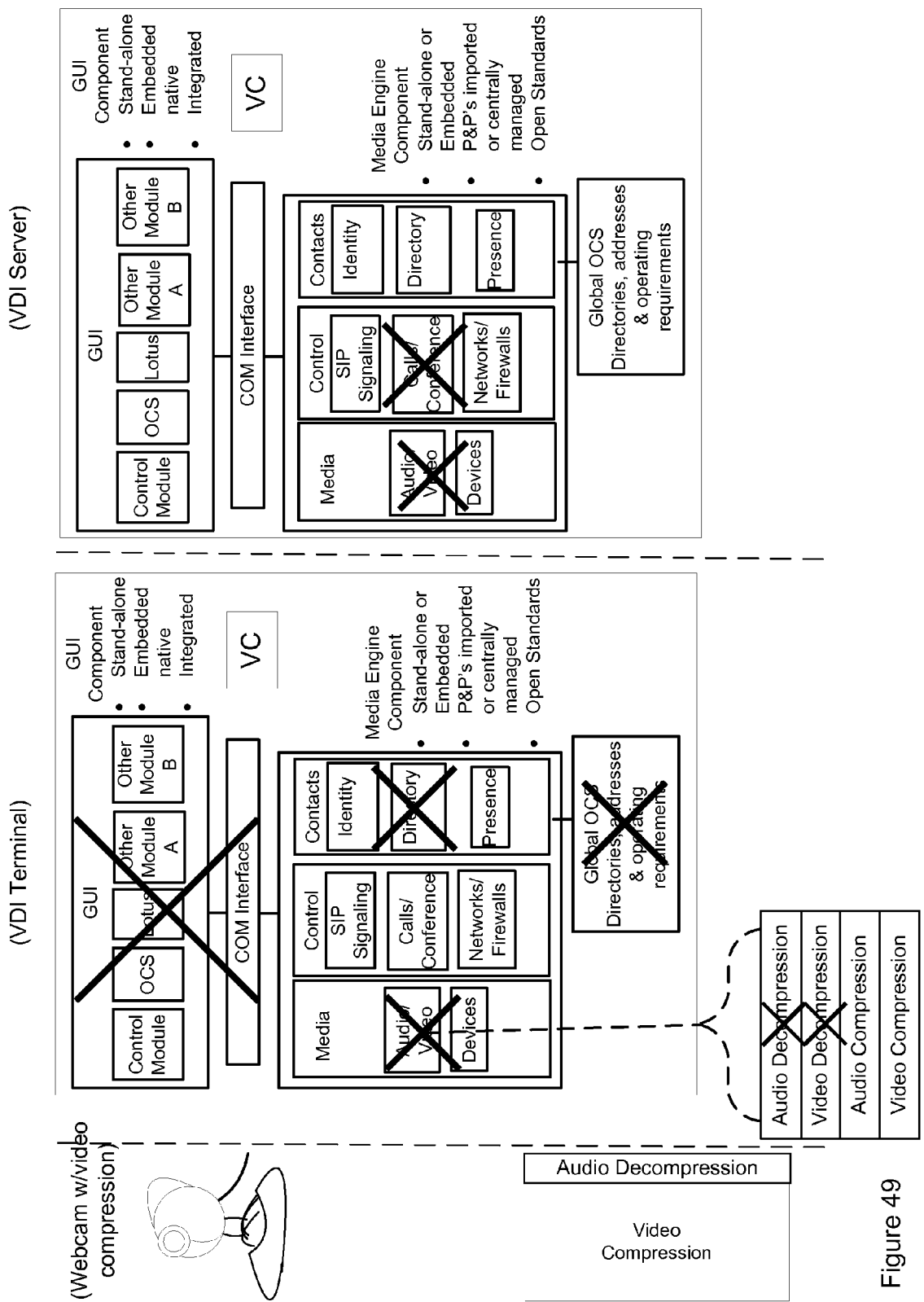
FIG. 49 depicts an exemplary variation on the situation depicted in FIG. 48 wherein a webcam further comprises both an internal microphone and internal audio compression. The same software architecture is relevant if the webcam, microphone, internal video compression, and internal audio compression are integrated into a computer monitor.

FIG. 49 shows an exemplary variation on the situation depicted in FIG. 48 wherein a webcam further comprises both an internal microphone and internal audio compression. Under this circumstance (wherein the inventive article of software detects that the webcam comprises both internal video compression and internal audio compression), the invention provides for both the video compression element and audio compression element within the inventive article of 2-way A/V software the endpoint device not be enabled/initialized. It is noted that such an arrangement may not be practical in situations wherein received audio is reproduced by an acoustically proximate speaker and 2-way audio echo cancelling is employed. However, such a situation may be advantageous in some settings, for example in the case of using the inventive article of 2-way A/V software for creating an A/V recording or a 1-way A/V "webcast" broadcast. The endpoint device may comprise a laptop computer, tablet computer, or computer monitor comprising an internal microphone and internal speaker as well as internal audio compression and internal audio decompression. For example, an internal audio card in a laptop or tablet computer can provide internal audio compression, and internal audio decompression. Under this circumstance the invention provides for both the audio compression element and audio decompression element within the inventive article of 2-way A/V software the endpoint device not be enabled/initialized.

Additionally, various embodiments of the inventive concept also provide for automatic partition of a common article of software responsive to dynamic needs. For example, in an internet browsing setting, various types of mash-up configurations and other web-page situations may trigger automatic partition of a common article of software as may be advantageous for performance.

In one or more embodiments of the invention, software partitions may form more complicated set and graph partitions than the simple exemplary cases suggested in FIGS. 42-44. This is possible even in the simplest two-section partitioning.

In one or more embodiments of the invention, a single terminal platform may be used to access more than one server platform of the same kind, or of different kinds, at the same time. For such configurations, the same software partitions may participate simultaneously in a hierarchical arrangement for client-server interaction purposes, and peer arrangement for the purposes of enabling optimal performance on a single terminal. One possible embodiment of this simultaneous multi-partitioning uses system synchronization primitives and interprocess communication to coordinate access to limited resources on the terminal.

In one or more embodiments of the invention, software versioning is another important aspect of partitioning. An article or instance of software that evolves in time may result in partitions belonging to different versions of software interacting at a given moment. Factors contributing to this include various hardware limitations (e.g. read-only permanent executable code storage) or software policies (e.g., software configuration controls). The RMEP session above illustrates one possible embodiment of a multi-version compatibility mechanism. Other possible mechanisms include automatic updates of software partitions; automatic repartitioning to provide the best feature set given software version limitations; available feature set queries and negotiations.

16. Description of Exemplary Computer Hardware Platform

Figure 50:
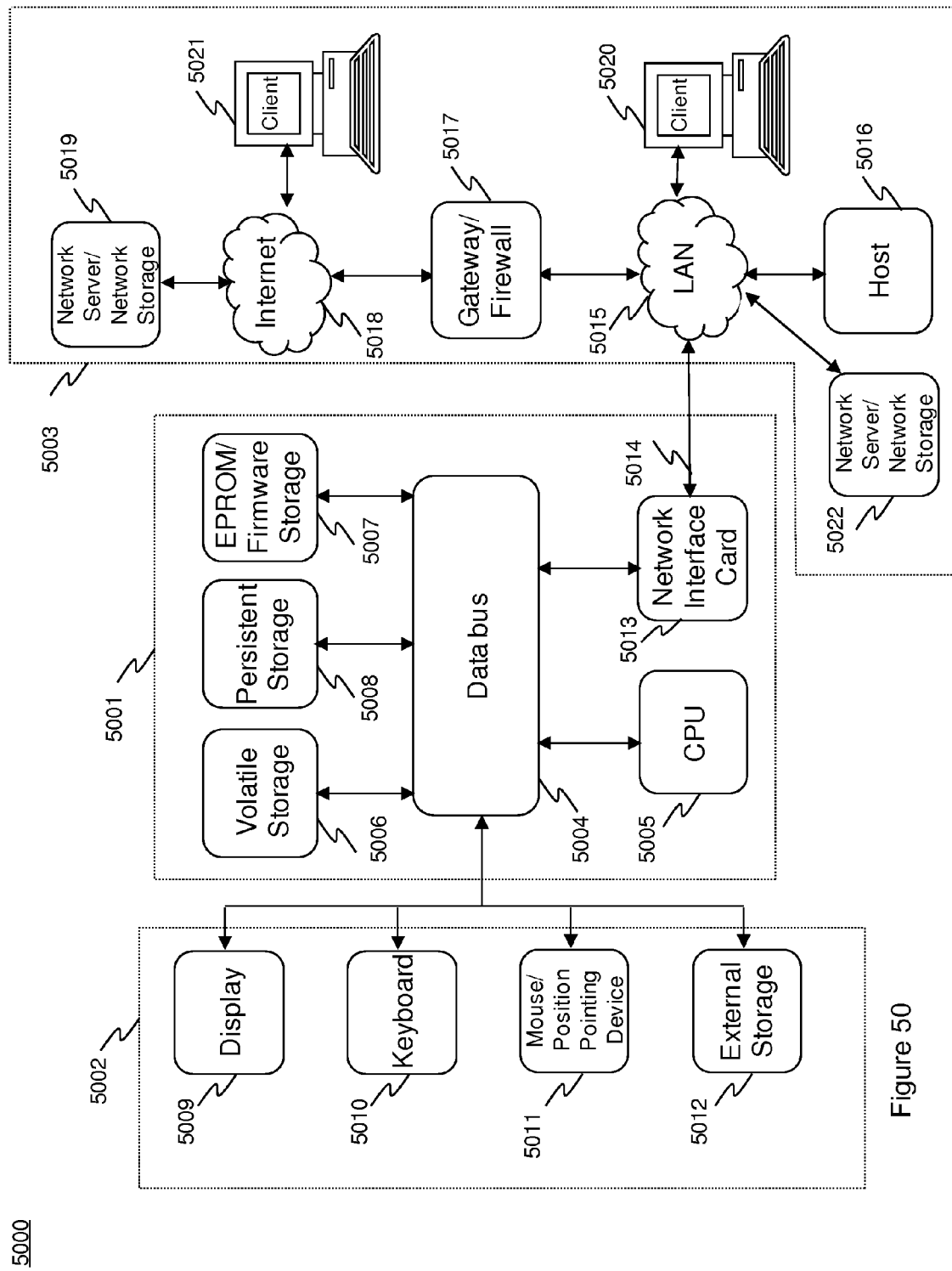
FIG. 50 illustrates an exemplary embodiment of a computer/server hardware platform upon and in the context which the inventive system may be implemented.

FIG. 50 is a block diagram that illustrates an embodiment of a computer/server system 5000 upon which an embodiment of the inventive methodology may be implemented. The system 5000 includes a computer/server platform 5001, peripheral devices 5002 and network resources 5003.

The computer platform 5001 may include a data bus 5004 or other communication mechanism for communicating information across and among various parts of the computer platform 5001, and a processor 5005 coupled with bus 5004 for processing information and performing other computational and control tasks. Computer platform 5001 also includes a volatile storage 5006, such as a random access memory (RAM) or other dynamic storage device, coupled to bus 5004 for storing various information as well as instructions to be executed by processor 5005. The volatile storage 5006 also may be used for storing temporary variables or other intermediate information during execution of instructions by processor 5005. Computer platform 5001 may further include a read only memory (ROM or EPROM) 5007 or other static storage device coupled to bus 5004 for storing static information and instructions for processor 5005, such as basic input-output system (BIOS), as well as various system configuration parameters. A persistent storage device 5008, such as a magnetic disk, optical disk, or solid-state flash memory device is provided and coupled to bus 5004 for storing information and instructions.

Computer platform 5001 may be coupled via bus 5004 to a display 5009, such as a cathode ray tube (CRT), plasma display, or a liquid crystal display (LCD), for displaying information to a system administrator or user of the computer platform 5001. An input device 5010, including alphanumeric and other keys, is coupled to bus 5004 for communicating information and command selections to processor 5005. Another type of user input device is cursor control device 5011, such as a mouse, a trackball, or cursor direction keys for communicating direction information and command selections to processor 5005 and for controlling cursor movement on display 5009. This input device typically has two degrees of freedom in two axes, a first axis (e.g., x) and a second axis (e.g., y), that allows the device to specify positions in a plane.

An external storage device 5012 may be coupled to the computer platform 5001 via bus 5004 to provide an extra or removable storage capacity for the computer platform 5001. In an embodiment of the computer system 5000, the external removable storage device 5012 may be used to facilitate exchange of data with other computer systems.

The invention is related to the use of computer system 5000 for implementing the techniques described herein. In an embodiment, the inventive system may reside on a machine such as computer platform 5001. According to one embodiment of the invention, the techniques described herein are performed by computer system 5000 in response to processor 5005 executing one or more sequences of one or more instructions contained in the volatile memory 5006. Such instructions may be read into volatile memory 5006 from another computer-readable medium, such as persistent storage device 5008. Execution of the sequences of instructions contained in the volatile memory 5006 causes processor 5005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 5005 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 5008. Volatile media includes dynamic memory, such as volatile storage 5006.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 5005 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 5004. The bus 5004 carries the data to the volatile storage 5006, from which processor 5005 retrieves and executes the instructions. The instructions received by the volatile memory 5006 may optionally be stored on persistent storage device 508 either before or after execution by processor 5005. The instructions may also be downloaded into the computer platform 5001 via Internet using a variety of network data communication protocols well known in the art.

The computer platform 5001 also includes a communication interface, such as network interface card 5013 coupled to the data bus 5004. Communication interface 5013 provides a two-way data communication coupling to a network link 5015 that is coupled to a local network 5015. For example, communication interface 5013 may be an integrated services digital network (ISDN) card or a modem to provide a data communication connection to a corresponding type of telephone line. As another example, communication interface 5013 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 5013 sends and receives electrical, electromagnetic or optical signals that carry digital data streams representing various types of information.

Network link 5013 typically provides data communication through one or more networks to other network resources. For example, network link 5015 may provide a connection through local network 5015 to a host computer 5016, or a network storage/server 5017. Additionally or alternatively, the network link 5013 may connect through gateway/firewall 5017 to the wide-area or global network 5018, such as an Internet. Thus, the computer platform 5001 can access network resources located anywhere on the Internet 5018, such as a remote network storage/server 5019. On the other hand, the computer platform 5001 may also be accessed by clients located anywhere on the local area network 5015 and/or the Internet 5018. The network clients 5020 and 5021 may themselves be implemented based on the computer platform similar to the platform 5001.

Local network 5015 and the Internet 5018 both use electrical, electromagnetic or optical signals that carry digital data streams. The signals through the various networks and the signals on network link 5015 and through communication interface 5013, which carry the digital data to and from computer platform 5001, are exemplary forms of carrier waves transporting the information.

Computer platform 5001 can send messages and receive data, including program code, through the variety of network(s) including Internet 5018 and LAN 5015, network link 5015 and communication interface 5013. In the Internet example, when the system 5001 acts as a network server, it might transmit a requested code or data for an application program running on client(s) 5020 and/or 5021 through Internet 5018, gateway/firewall 5017, local area network 5015 and communication interface 5013. Similarly, it may receive code from other network resources.

The received code may be executed by processor 5005 as it is received, and/or stored in persistent or volatile storage devices 5008 and 5006, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Perl, Shell, PHP, Java, etc.

17. Closing

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Moreover, other implementations of the invention will be apparent to those skilled in the art from consideration of the specification and practice of the invention disclosed herein. Various aspects and/or components of the described embodiments may be used singly or in any combination in the systems and methods for handling and implementation of real-time communications applications and other network-performance sensitive applications in a VDI environment. It is intended that the specification and examples be considered as exemplary only, with a true scope and spirit of the invention being indicated by the following claims.

What is claimed is:

1. A system for providing interactive two-way audio in a desktop virtualization environment, the desktop virtualization environment comprising at least one desktop virtualization server computer and at least one desktop virtualization client endpoint device with an associated microphone element, the system comprising:
    a. at least one instance of server software executing on the desktop virtualization server and providing at least interactive user interface functions to an associated desktop virtualization client endpoint device; and
    b. at least one instance of endpoint software executing on the desktop virtualization client endpoint device comprising a network port, the at least one instance of endpoint software receiving an incoming real-time audio stream from the network port and providing at least real-time and audio playback functions on the desktop virtualization client endpoint device,
    wherein the desktop virtualization server comprises a plurality of virtual machines configured to execute at least one desktop application and wherein at least one of the plurality of virtual machines corresponds to the at least one instance of the server software and the at least one instance of endpoint software;
    wherein a first portion of software associated with managing of the real-time audio stream executes on a virtual machine of the plurality of virtual machines and a second portion of software involved in real-time handling of the real-time audio stream executes on the endpoint device; and
    wherein the at least one desktop virtualization client endpoint is configured to:
    i. accept real-time audio input from a microphone element associated with the desktop virtualization client endpoint; and
    ii. provide an outgoing real-time compressed audio stream to the network port responsive to the real-time audio input from the microphone element,
    wherein the incoming real-time audio stream is provided by a different instance of endpoint software executing on a different desktop virtualization client endpoint device and wherein the outgoing real-time audio stream is provided to a different instance of endpoint software executing on a different desktop virtualization client endpoint device.

2. The system of claim 1 wherein the real-time audio input from the microphone element is a compressed audio stream.

3. The system of claim 1 wherein the real-time audio input from a microphone element is an uncompressed audio stream.

4. The system of claim 3 wherein the instance of endpoint software includes an audio compression algorithm, which performs audio compression to produce the outgoing real-time compressed audio stream.

5. The system of claim 4 wherein the instance of endpoint software is configured such that, should the desktop virtualization client endpoint device comprise a multicore processor, the audio compression algorithm is executed on a specific core of the multicore processor.

6. The system of claim 3 wherein at least one video compression function is provided by the hardware of desktop virtualization client endpoint device, and the instance of endpoint software includes an interface for use in exchanging audio streams with the hardware of the desktop virtualization client endpoint device.

7. The system of claim 1 wherein the instance of endpoint software comprises a audio decompression algorithm.

8. The system of claim 7 wherein at least one video decompression function is provided by the hardware of desktop virtualization client endpoint device, and wherein the instance of endpoint software includes an interface for use in exchanging audio streams with the hardware of the desktop virtualization client endpoint device.

9. A method for providing interactive two-way audio in a desktop virtualization environment, the desktop virtualization environment comprising at least one desktop virtualization server computer and at least one desktop virtualization client endpoint device with an associated microphone element, the method comprising:
    c. providing, using at least one instance of server software executing on the desktop virtualization server, at least interactive user interface functions to an associated desktop virtualization client endpoint device;
    d. receiving, using at least one instance of endpoint software executing on the desktop virtualization client endpoint device comprising a network port, an incoming real-time audio stream from the network port and providing at least real-time and audio playback functions on the desktop virtualization client endpoint device;
    e. accepting, using the at least one desktop virtualization client endpoint, real-time audio input from a microphone element associated with the desktop virtualization client endpoint; and
    f. providing, using the at least one desktop virtualization client endpoint, an outgoing real-time compressed audio stream to the network port responsive to the real-time audio input from the microphone element, wherein the desktop virtualization server comprises a plurality of virtual machines configured to execute at least one desktop application; wherein at least one of the plurality of virtual machines corresponds to the at least one instance of the server software and the at least one instance of endpoint software; and wherein a first portion of software associated with managing of the real-time audio stream executes on a virtual machine of the plurality of virtual machines and a second portion of software involved in real-time handling of the real-time audio stream executes on the endpoint device, wherein the incoming real-time audio stream is provided by a different instance of endpoint software executing on a different desktop virtualization client endpoint device and wherein the outgoing real-time audio stream is provided to a different instance of endpoint software executing on a different desktop virtualization client endpoint device.

10. The method of claim 9 wherein the real-time audio input from the microphone element is a compressed audio stream.

11. The method of claim 9 wherein the real-time audio input from a microphone element is an uncompressed audio stream.

12. The method of claim 11 further comprising executing an audio compression algorithm, which performs audio compression to produce the outgoing real-time compressed audio stream.

13. The method of claim 12 wherein should the desktop virtualization client endpoint device comprise a multicore processor, the audio compression algorithm is executed on a specific core of the multicore processor.

14. The method of claim 9 further comprising providing at least one video compression function by the hardware of the desktop virtualization client endpoint device, wherein the instance of endpoint software includes an interface for use in exchanging audio streams with the hardware of the desktop virtualization client endpoint device.

15. The method of claim 9 wherein the instance of endpoint software comprises a audio decompression algorithm.

16. The method of claim 9 further comprising providing at least one video decompression function by the hardware of desktop virtualization client endpoint device, wherein the instance of endpoint software includes an interface for use in exchanging audio streams with the hardware of the desktop virtualization client endpoint device.

\* \* \* \* \*